(12) United States Patent
Miller et al.

(10) Patent No.: US 12,359,492 B2
(45) Date of Patent: Jul. 15, 2025

(54) METHODS AND APPARATUS FOR PET DOORS

(71) Applicant: Smartec Products LLC, Phoenix, AZ (US)

(72) Inventors: Stephen W. Miller, Scottsdale, AZ (US); David W. White, New River, AZ (US); Eric P. Zemke, Peoria, AZ (US); Michael P. Miller, Cave Creek, AZ (US); Martin L. Diamond, Scottsdale, AZ (US)

(73) Assignee: Smartec Products LLC, Phoenix, AZ (US)

( * ) Notice: Subject to any disclaimer, the term of this patent is extended or adjusted under 35 U.S.C. 154(b) by 0 days.

(21) Appl. No.: 18/803,327

(22) Filed: Aug. 13, 2024

(65) Prior Publication Data

US 2025/0043616 A1    Feb. 6, 2025

Related U.S. Application Data

(63) Continuation-in-part of application No. 17/141,583, filed on Jan. 5, 2021, now Pat. No. 12,060,743, which
(Continued)

(51) Int. Cl.
*A01K 1/03*    (2006.01)
*E05F 15/76*    (2015.01)
(Continued)

(52) U.S. Cl.
CPC ............... *E05F 15/76* (2015.01); *E06B 7/32* (2013.01); *G07C 9/28* (2020.01); *A01K 1/035* (2013.01);
(Continued)

(58) Field of Classification Search
CPC .... A01K 1/035; A01K 27/009; A01K 1/0017; A01K 1/0029; E05F 15/76; E06B 7/32; E05Y 2900/132; G07C 9/28
See application file for complete search history.

(56) References Cited

U.S. PATENT DOCUMENTS 2,758,646 A    8/1956  Johnson
2,960,734 A    11/1960 Collins
(Continued)

FOREIGN PATENT DOCUMENTS

CN    204791217 U    11/2015
EP    2717233 A2     6/2013
(Continued)

OTHER PUBLICATIONS

Excerpt from business plan, Information from Amazon on Pet Doors.
(Continued)

*Primary Examiner* — Ebony E Evans
(74) *Attorney, Agent, or Firm* — Noblitt & Newson, PLLC

(57) ABSTRACT

A pet access control system according to various aspects of the present technology may comprise a door unit interoperable with a security panel holder. The door unit covers a passage through a structure, such as through the wall or door of a building. The door unit may include a connector that may be mounted on a legacy security panel holder or a dedicated mounting system for the door unit. The door unit may operate in conjunction with a pet identification system to automatically identify and grant access only to authorized pets. In various embodiments, the door unit may be controlled remotely, such as via a web browser on a remote computer or an app running on a smartphone.

22 Claims, 52 Drawing Sheets

Related U.S. Application Data is a continuation-in-part of application No. 16/911,071, filed on Jun. 24, 2020, now Pat. No. 10,920,484.

(60) Provisional application No. 62/866,187, filed on Jun. 25, 2019.

(51) Int. Cl.
*E06B 7/32* (2006.01)
*G07C 9/28* (2020.01)
*A01K 1/035* (2006.01)
*A01K 27/00* (2006.01)

(52) U.S. Cl.
CPC ....... *A01K 27/009* (2013.01); *E05Y 2900/132* (2013.01)

(56) References Cited

U.S. PATENT DOCUMENTS

| | | | |
|---|---|---|---|
| 3,918,203 A | 11/1975 | Ellison, Jr. | |
| 3,985,174 A | 10/1976 | Bricker | |
| 4,322,913 A | 4/1982 | Himmer | |
| 5,177,900 A | 1/1993 | Solowiej | |
| 5,634,298 A | 6/1997 | Slopack | |
| 5,872,516 A | 2/1999 | Bonge, Jr. | |
| 5,946,856 A | 9/1999 | Davlantes | |
| 5,992,096 A | 11/1999 | De La Cerda et al. | |
| 6,668,487 B2 | 12/2003 | Vesey | |
| 6,681,524 B1 | 1/2004 | Tillson | |
| 6,944,990 B2 | 9/2005 | Noyes | |
| 6,966,147 B2 | 11/2005 | Solowiej | |
| 7,284,502 B1 | 10/2007 | Dotter | |
| 7,612,667 B2 | 11/2009 | Montague | |
| 7,765,955 B2 | 8/2010 | Brooks | |
| 7,984,695 B1 | 7/2011 | Shaffer | |
| 8,020,519 B2 | 9/2011 | Stamper | |
| 8,276,544 B2 | 10/2012 | Seltzer et al. | |
| 8,464,663 B2 | 6/2013 | Kodat | |
| 8,539,715 B2 | 9/2013 | Hill | |
| 8,854,215 B1 | 10/2014 | Ellis | |
| 8,869,455 B1 * | 10/2014 | McFall | E06B 9/02 52/208 |
| 9,157,269 B2 | 10/2015 | Brown | |
| 9,284,773 B1 * | 3/2016 | Fridley | E05F 13/00 |
| 9,641,620 B2 | 5/2017 | Sweeney et al. | |
| 9,743,643 B1 | 8/2017 | Kaplan et al. | |
| 10,036,195 B2 | 7/2018 | Iglesias Ballester | |
| 10,040,149 B2 | 8/2018 | Simmons | |
| 10,154,649 B2 | 12/2018 | Hill | |
| 10,750,714 B2 | 8/2020 | Stricklin et al. | |
| D897,559 S | 9/2020 | Taylor | |
| D925,064 S | 7/2021 | Yi | |
| D964,598 S | 9/2022 | Xu | |
| D972,167 S | 12/2022 | Chen | |
| 2005/0252622 A1 | 11/2005 | Reid | |
| 2005/0284402 A1 | 12/2005 | Becker | |
| 2007/0175097 A1 | 8/2007 | Thorne | |
| 2007/0204514 A1 | 9/2007 | Grimmett | |
| 2007/0295279 A1 | 12/2007 | Vis et al. | |
| 2008/0072843 A1 | 3/2008 | Malacarne et al. | |
| 2008/0184940 A1 | 8/2008 | Bosserdet | |
| 2010/0116219 A1 | 5/2010 | Noyes | |
| 2010/0282180 A1 | 11/2010 | Moffett-Chaney et al. | |
| 2013/0305609 A1 | 11/2013 | Graves | |
| 2014/0033639 A1 | 2/2014 | Walther | |
| 2017/0328126 A1 | 11/2017 | Bonge, Jr. | |
| 2018/0128043 A1 | 5/2018 | Liu | |
| 2019/0234138 A1 * | 8/2019 | Zacher | E06B 7/32 |
| 2020/0011131 A1 | 1/2020 | Bonge, Jr. | |
| 2020/0347669 A1 * | 11/2020 | Nickerson | E06B 7/32 |

FOREIGN PATENT DOCUMENTS

| | | |
|---|---|---|
| WO | 2013038141 A1 | 3/2013 |
| WO | 2019036646 A1 | 2/2019 |

OTHER PUBLICATIONS

Helminski et al., Smart Doggy Door, The University of Akron, IdeaExchange@UAkron, Spring 2021.

\* cited by examiner

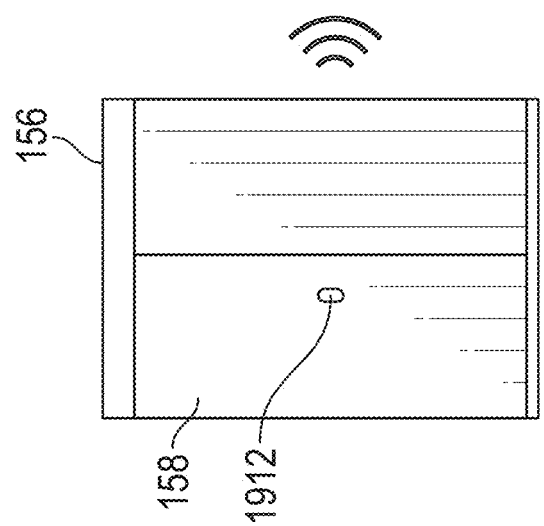
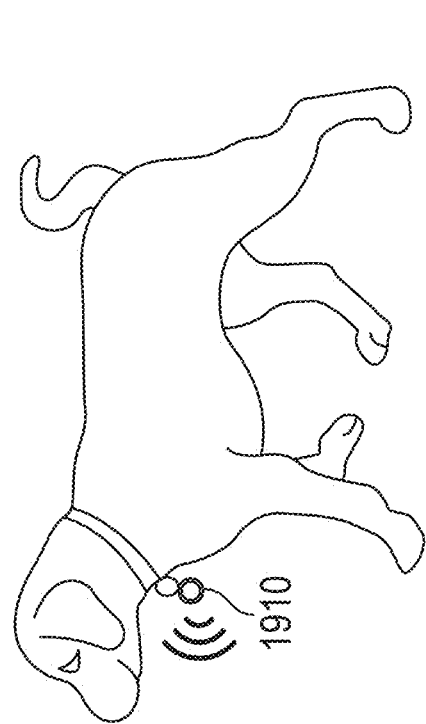
FIG. 19

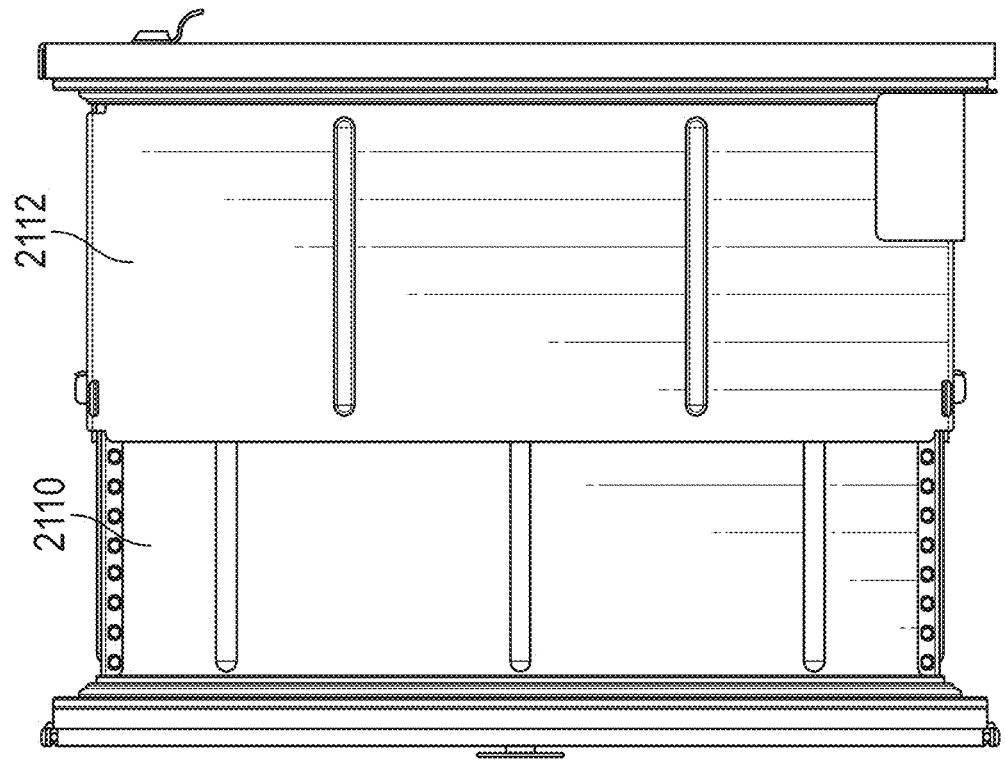
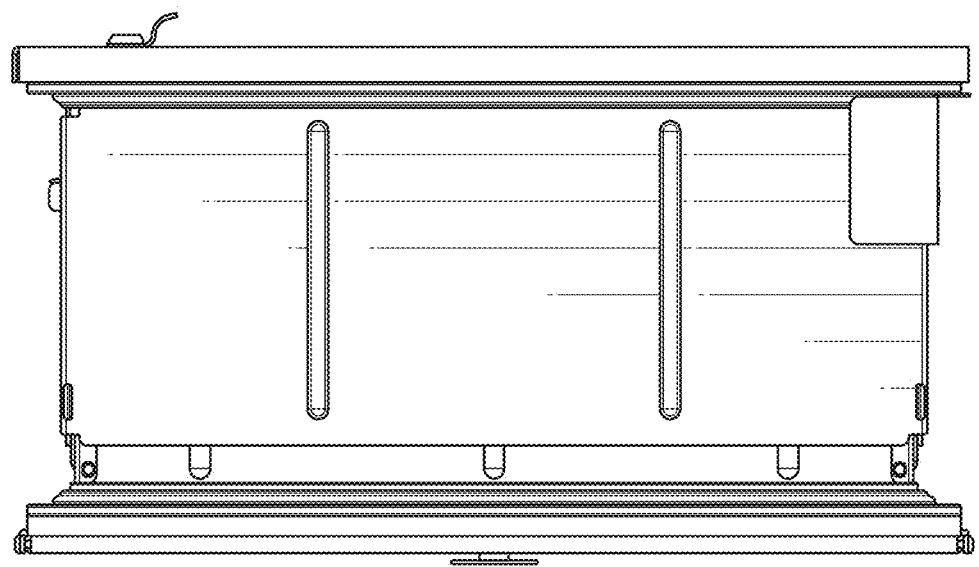
FIG. 21C

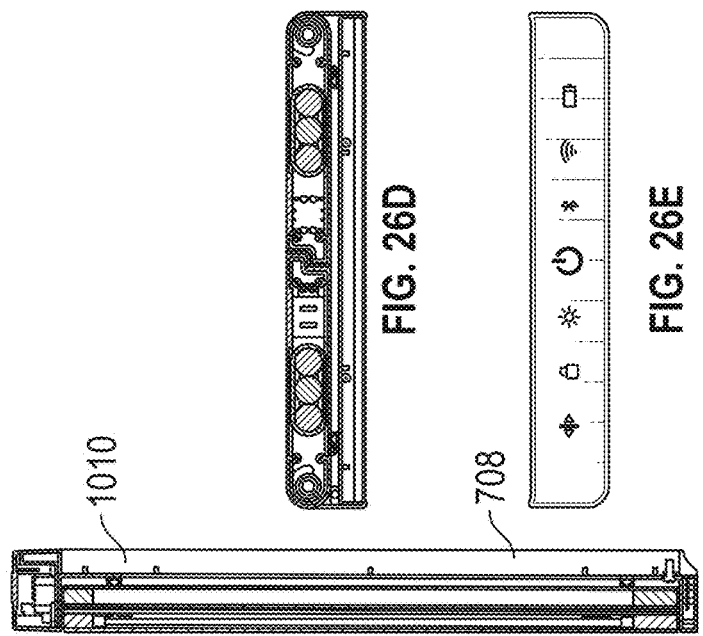
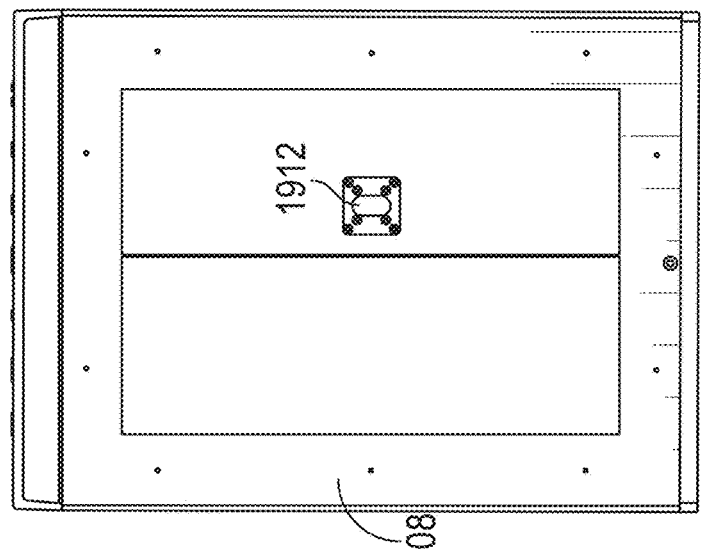
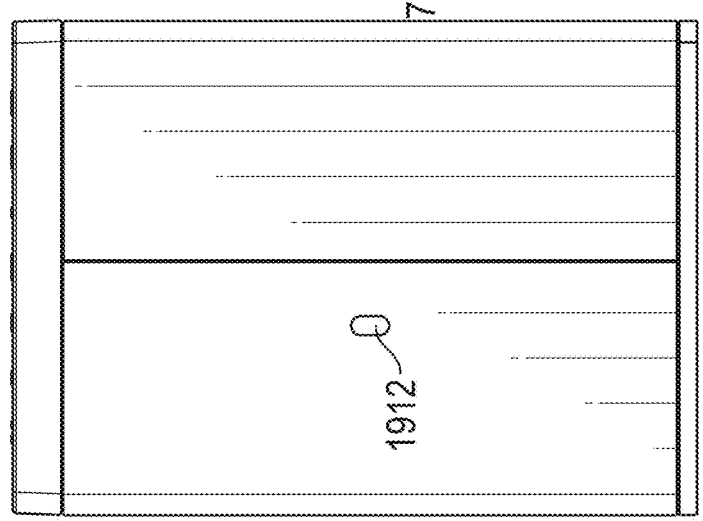

Figures 32A, 32B:
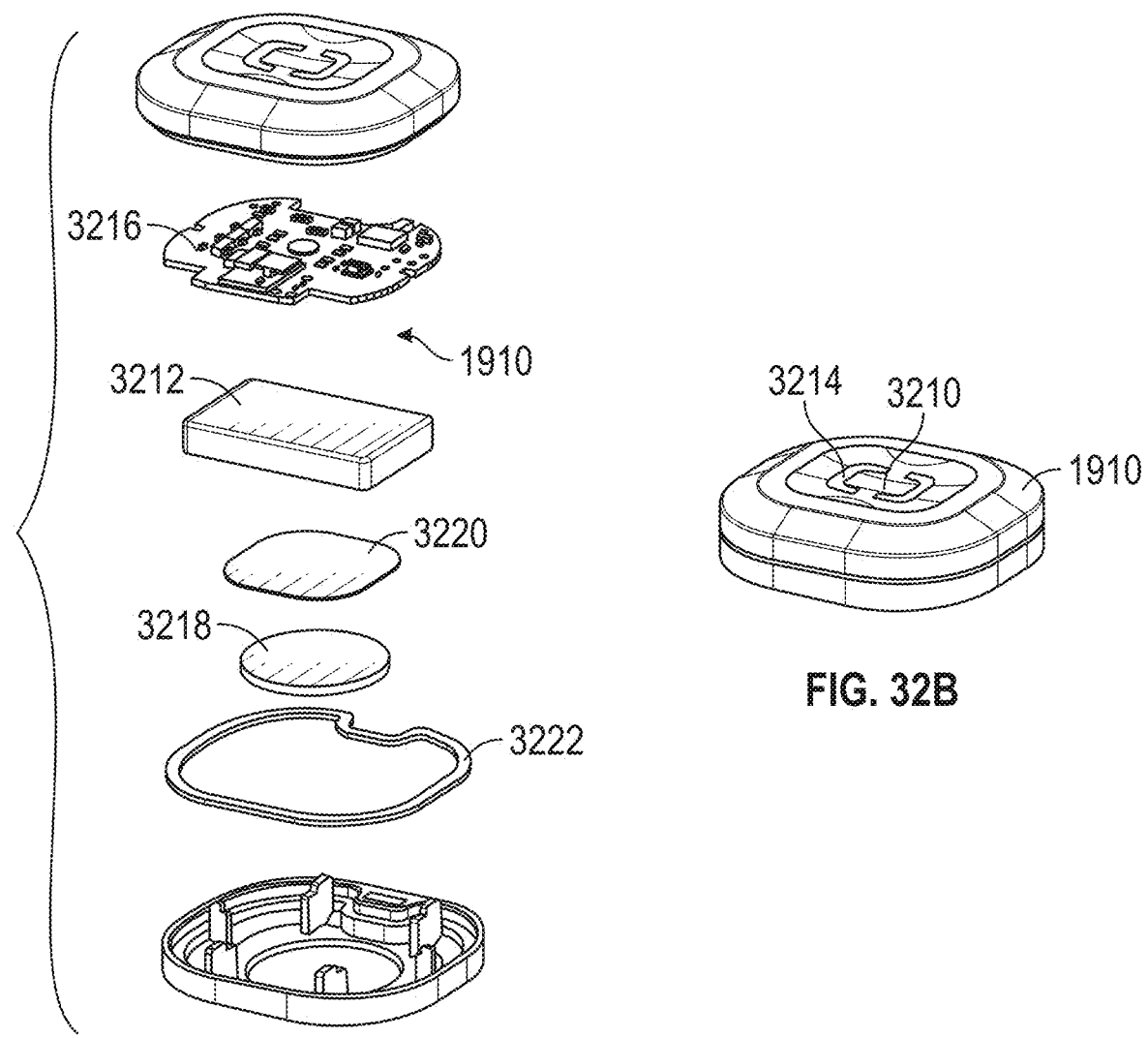

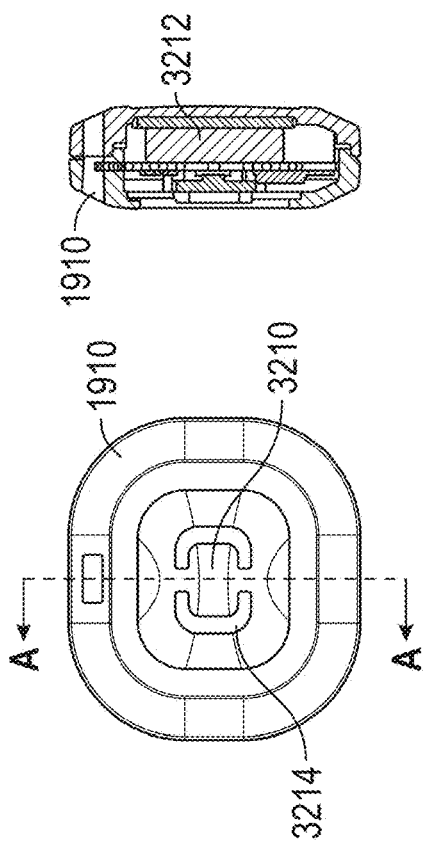
FIG. 32D
FIG. 32H
FIG. 32G
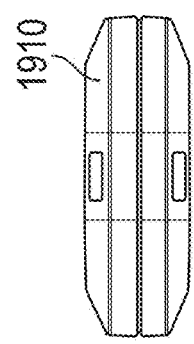
FIG. 32C
FIG. 32F
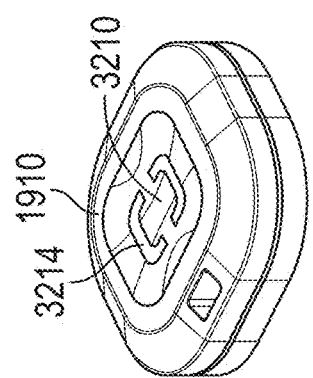
FIG. 32E

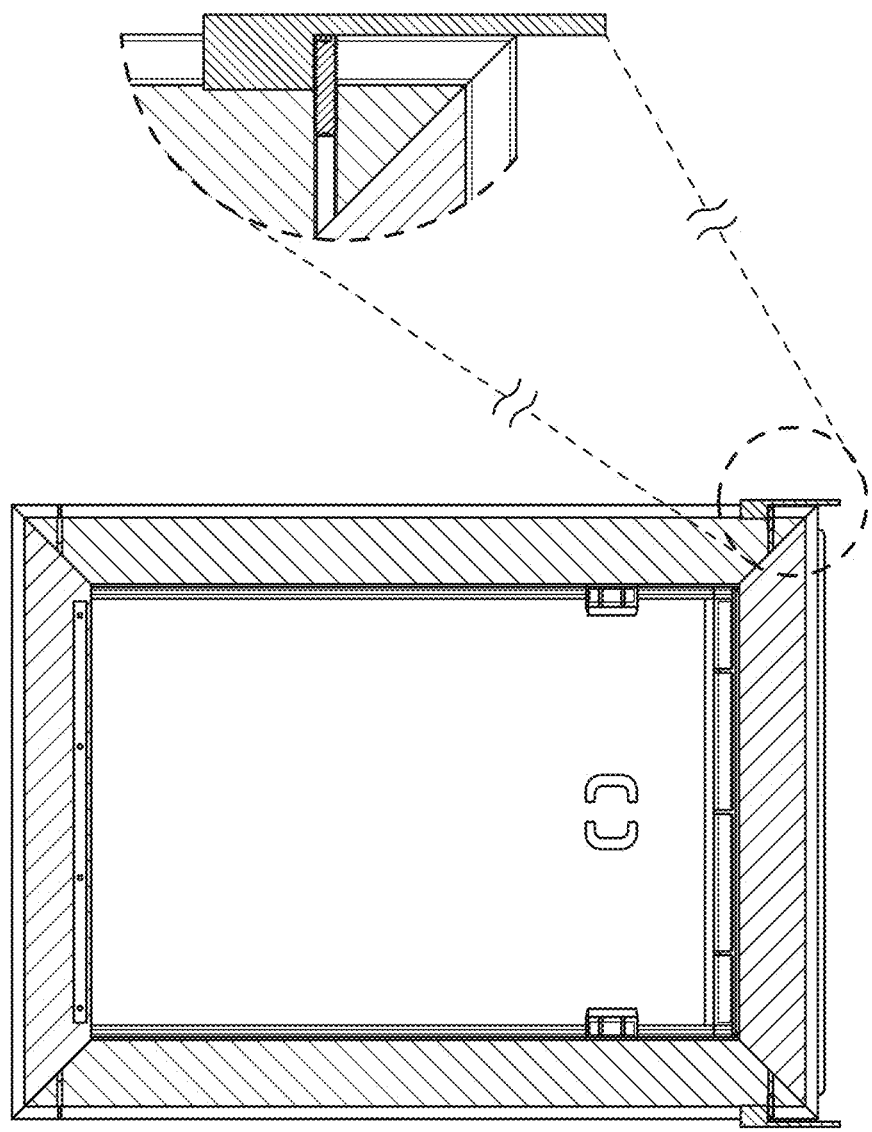
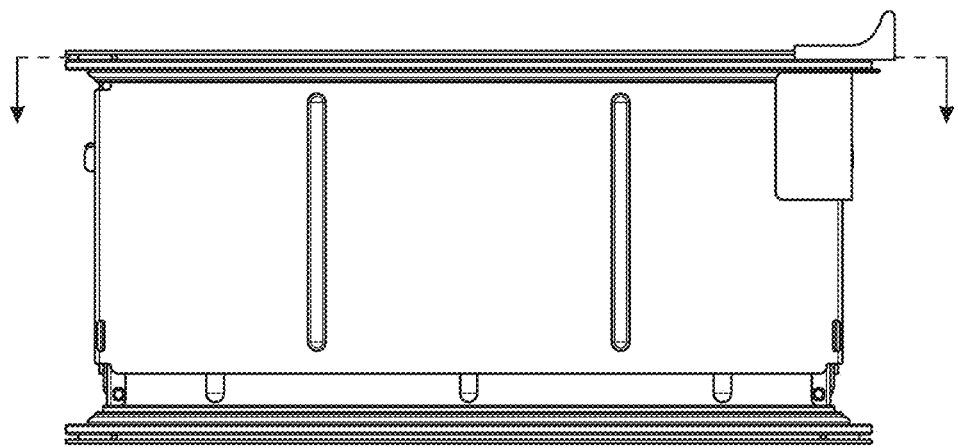
FIG. 34B

METHODS AND APPARATUS FOR PET DOORS

CROSS-REFERENCES TO RELATED APPLICATIONS

This application is a continuation-in-part of U.S. patent application Ser. No. 17/141,583, filed Jan. 5, 2021, which is a continuation-in-part of U.S. patent application Ser. No. 16/911,071, filed Jun. 24, 2020, which claims the benefit of U.S. Provisional Patent Application No. 62/866,187, filed Jun. 25, 2019, and incorporates such disclosures by reference.

BACKGROUND

Pets enrich the lives of families and individuals around the world, providing companionship, love, protection, and entertainment. For many pet owners, nothing is more important than the safety, comfort, and well-being of their pets. Pets may even occupy a position comparable to children.

Unlike children, however, pets have specific needs that are not shared with their owners. Common household pets, such as dogs and cats, may live mostly indoors, but go outside to relieve themselves, exercise, or avoid boredom. Busy owners, however, may not be able to let their pets in and out conveniently, due to being at work, traveling, or otherwise away from home.

Family members, neighbors, or hired help often fill the pet care gaps. These solutions, however, rely on humans, who are prone to forgetting about their obligations, leaving the pets stranded inside or outside. Pet doors, on the other hand, allow pets to let themselves in and out, but present a potential security risk and allow access to undesired animals. Pet doors also let the pets in and out regardless of the owner's wishes. For example, if workers are in the yard in the afternoon, the owner may wish to allow the pets to access the yard in the morning but keep them in the house in the afternoon to be sure they do not bother or harm the workers or possibly escape through an open gate in the yard. To meet this need, the owner again requires human on-site assistance.

BRIEF DESCRIPTION OF DRAWING FIGURES

A more complete understanding of the present technology may be derived by referring to the detailed description and claims when considered in connection with the following illustrative figures. In the following figures, like reference numbers refer to similar elements and steps throughout the figures.

Figure 1:
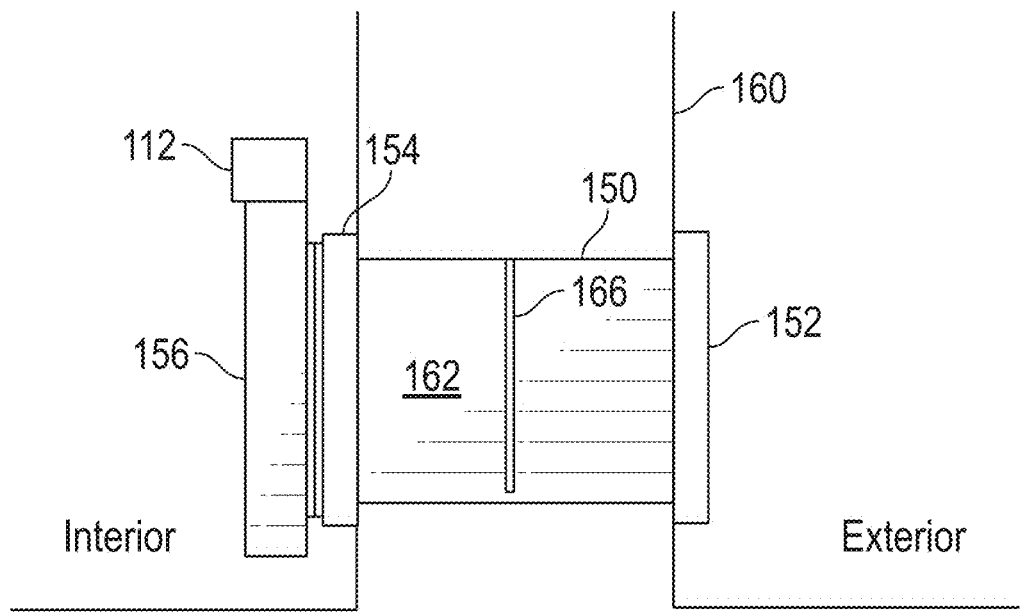
Figure 2:
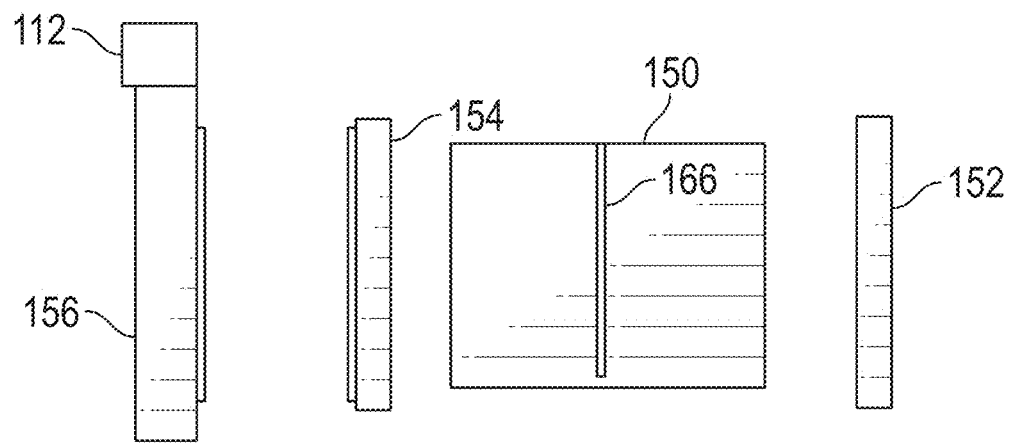
Figure 3:
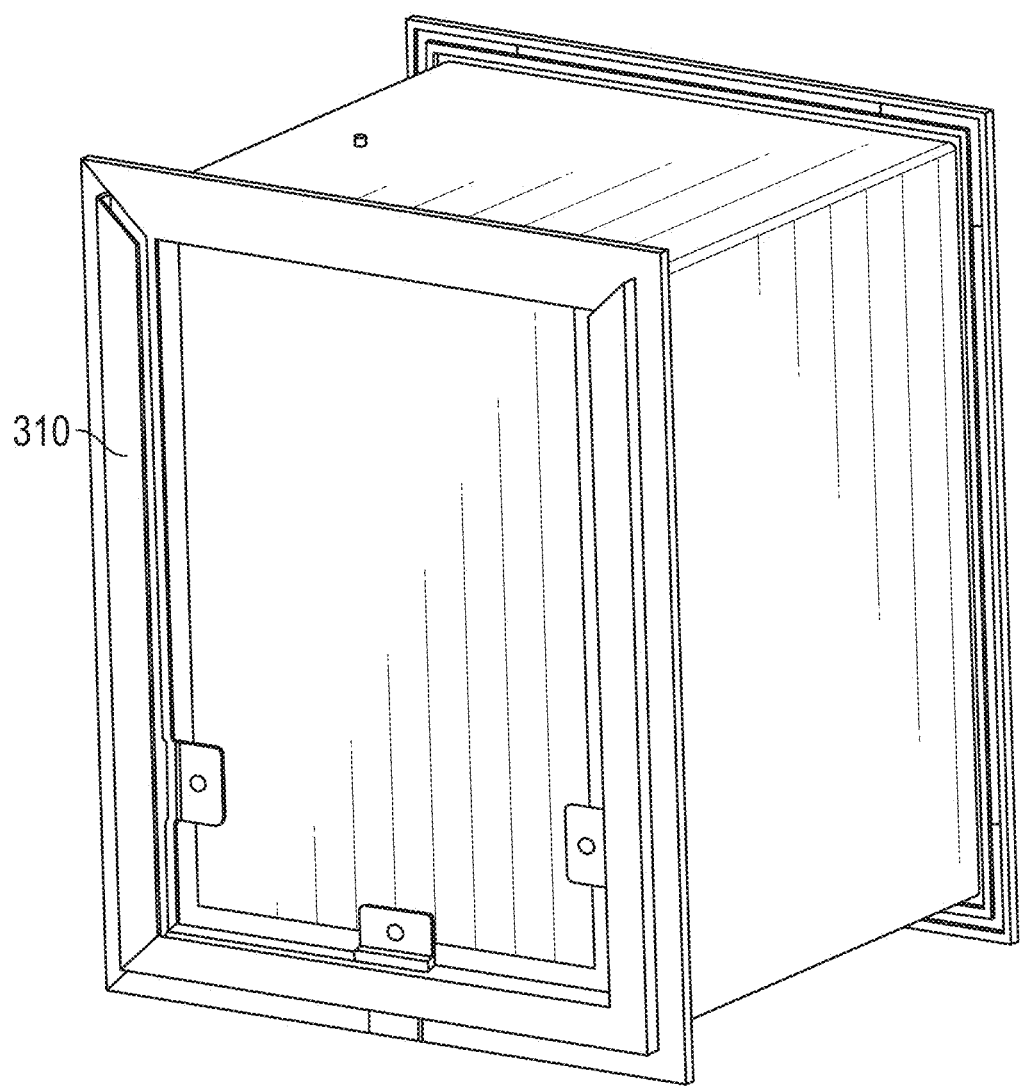
Figure 4:
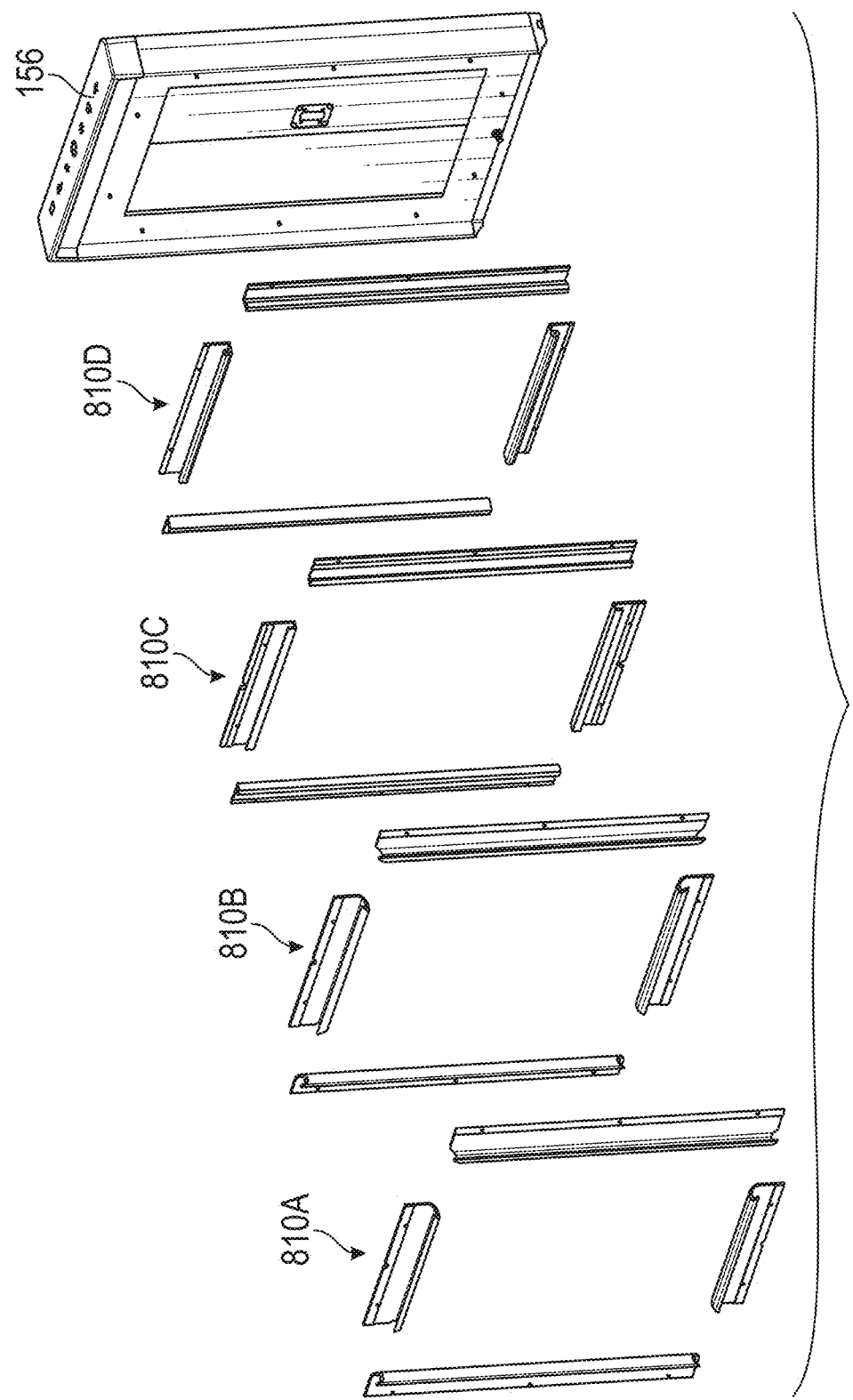
Figure 6:
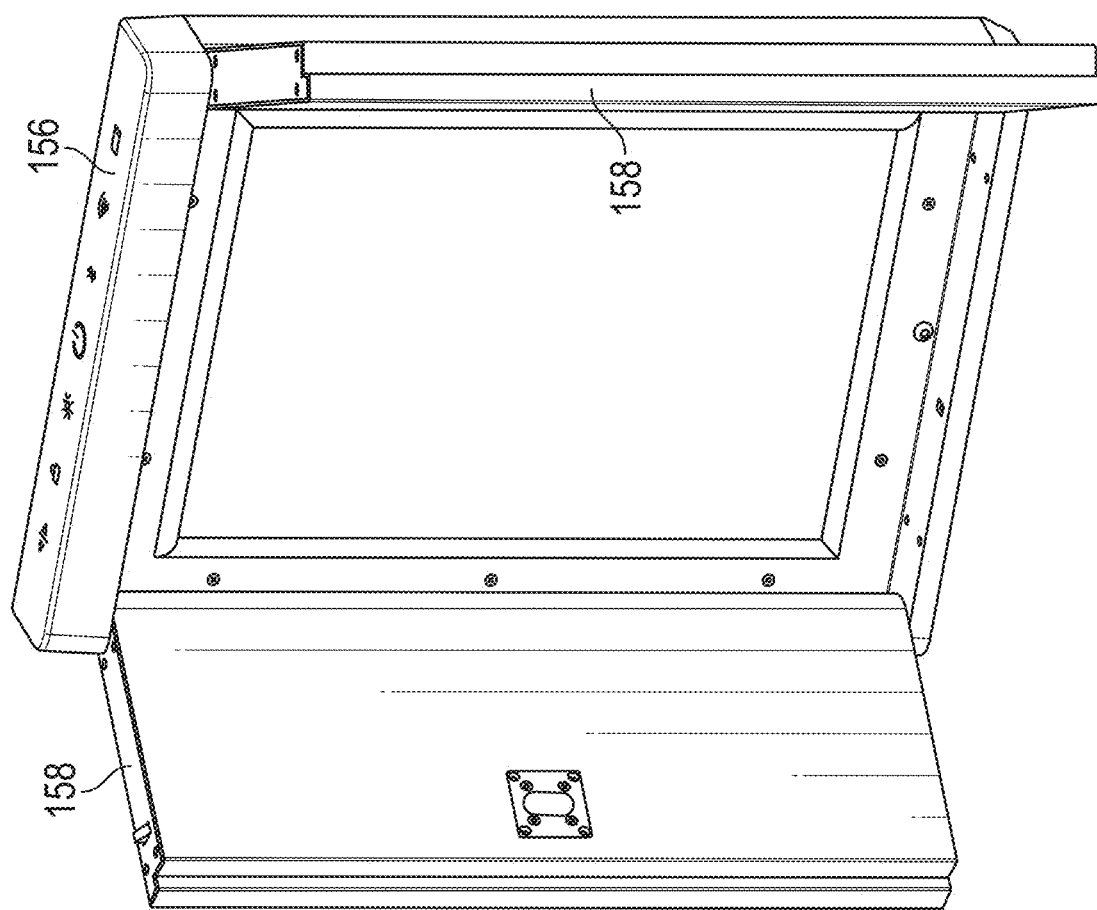
Figure 5:
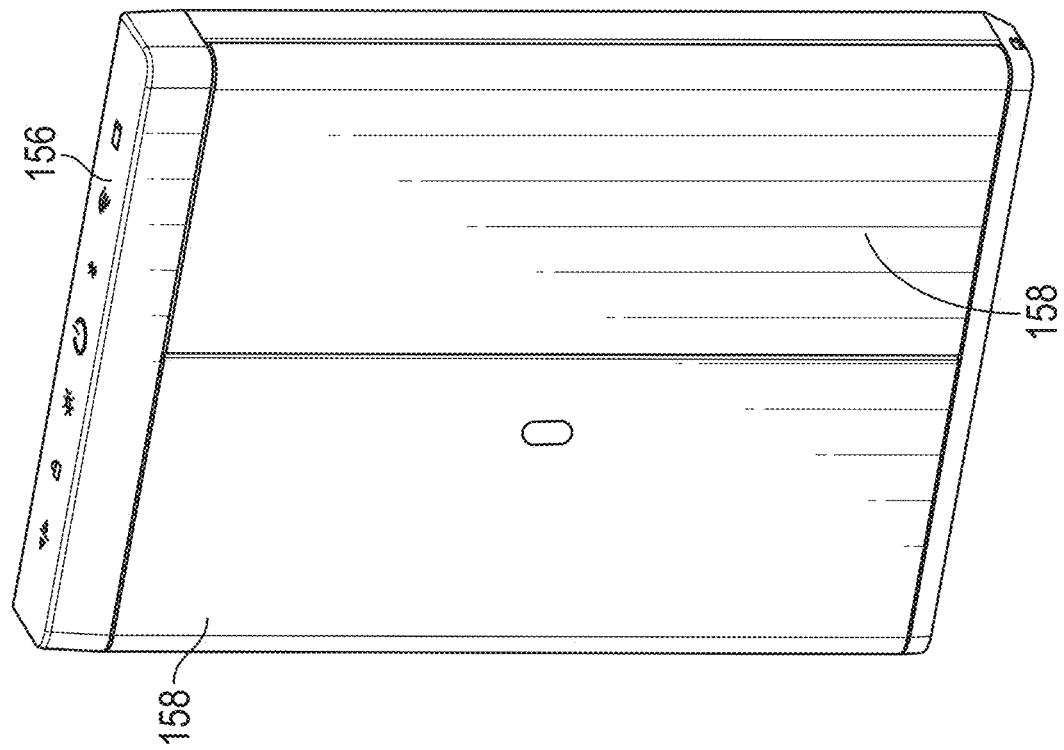
Figure 7:
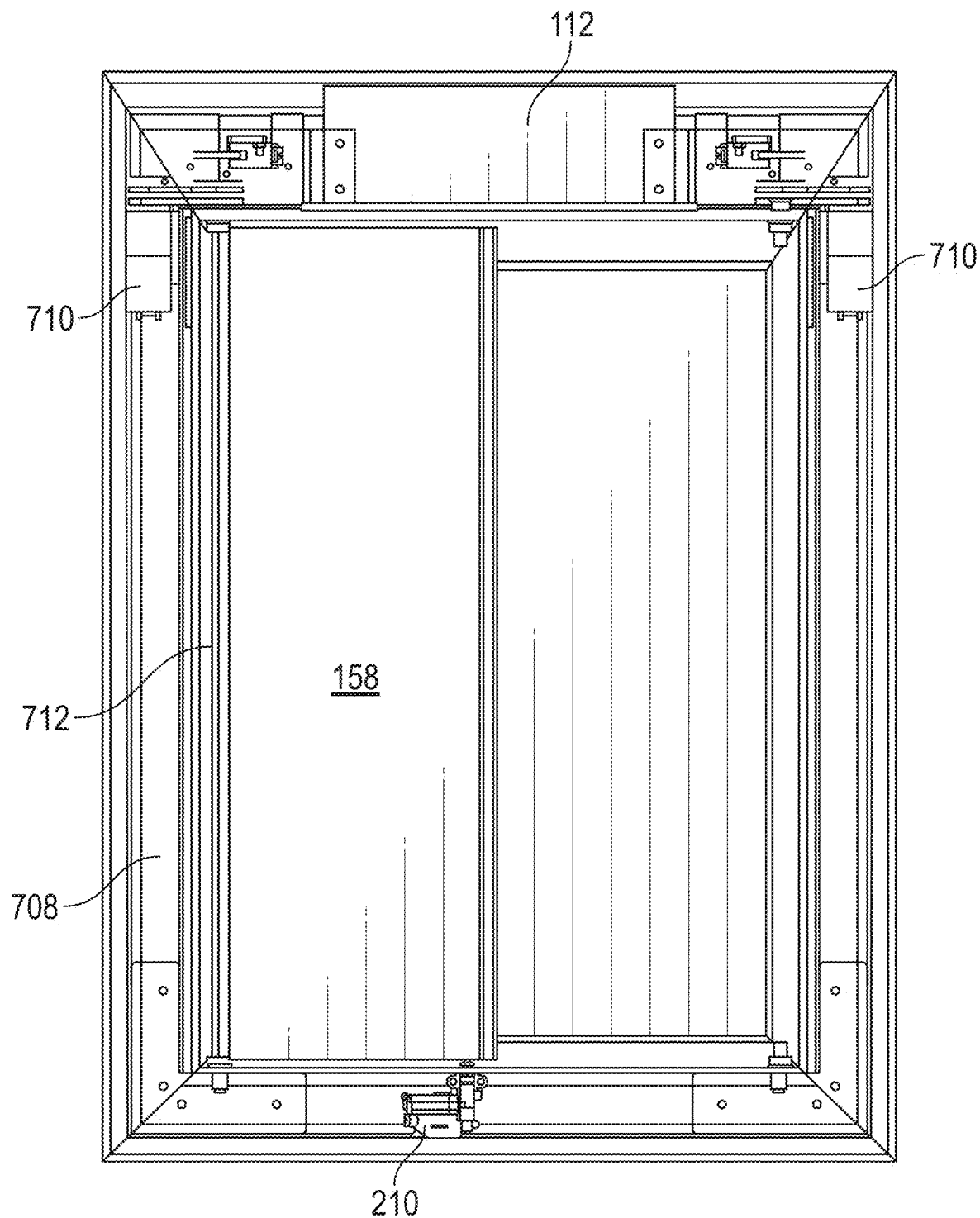
Figure 8:
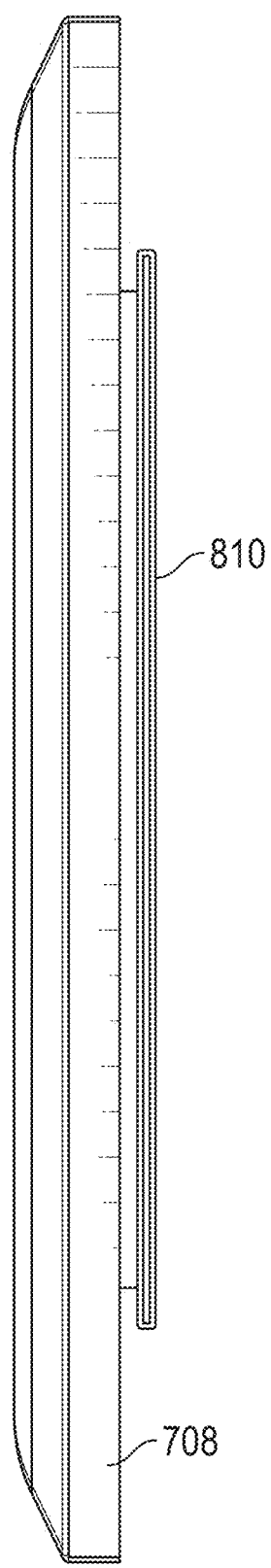
Figure 9:
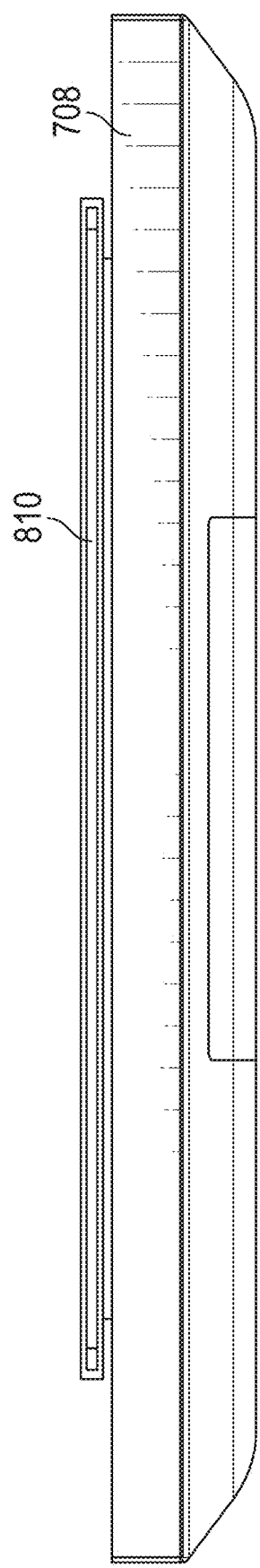
Figure 10:
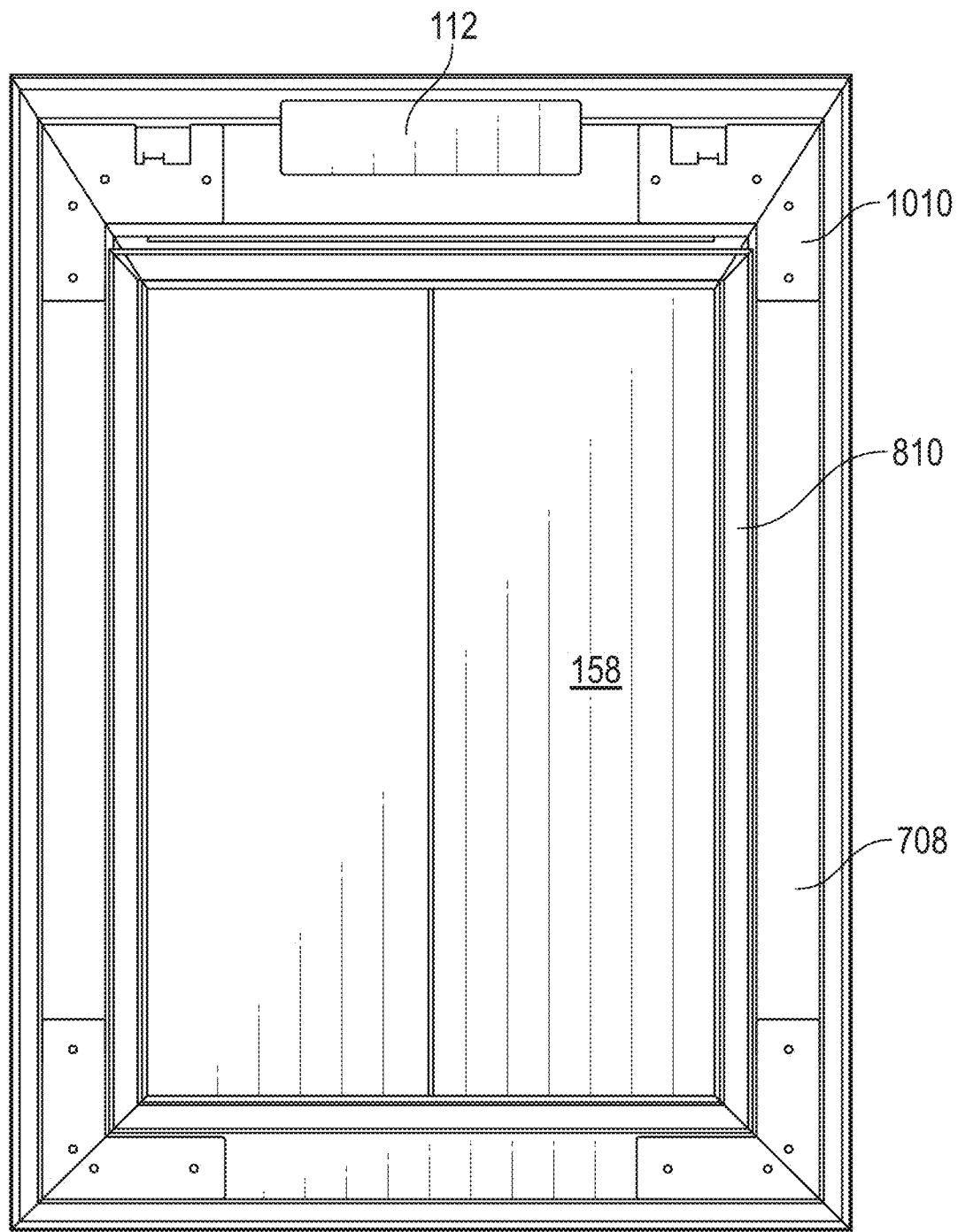
Figure 11:
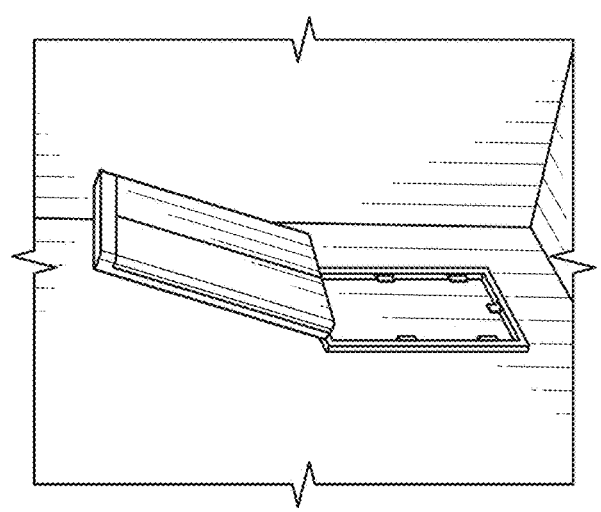
Figure 12:
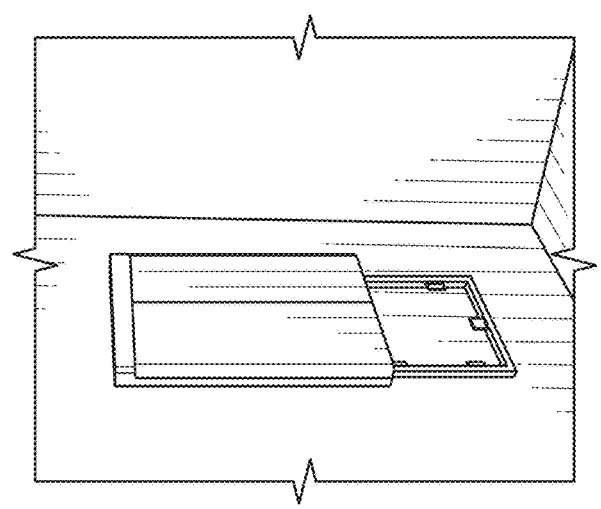
Figure 13:
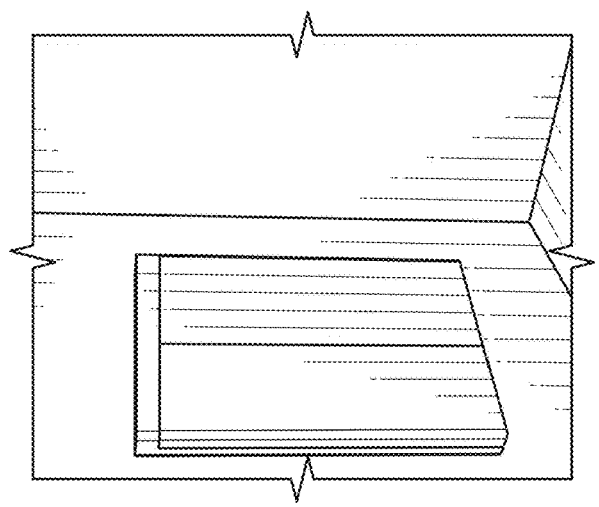
Figure 14:
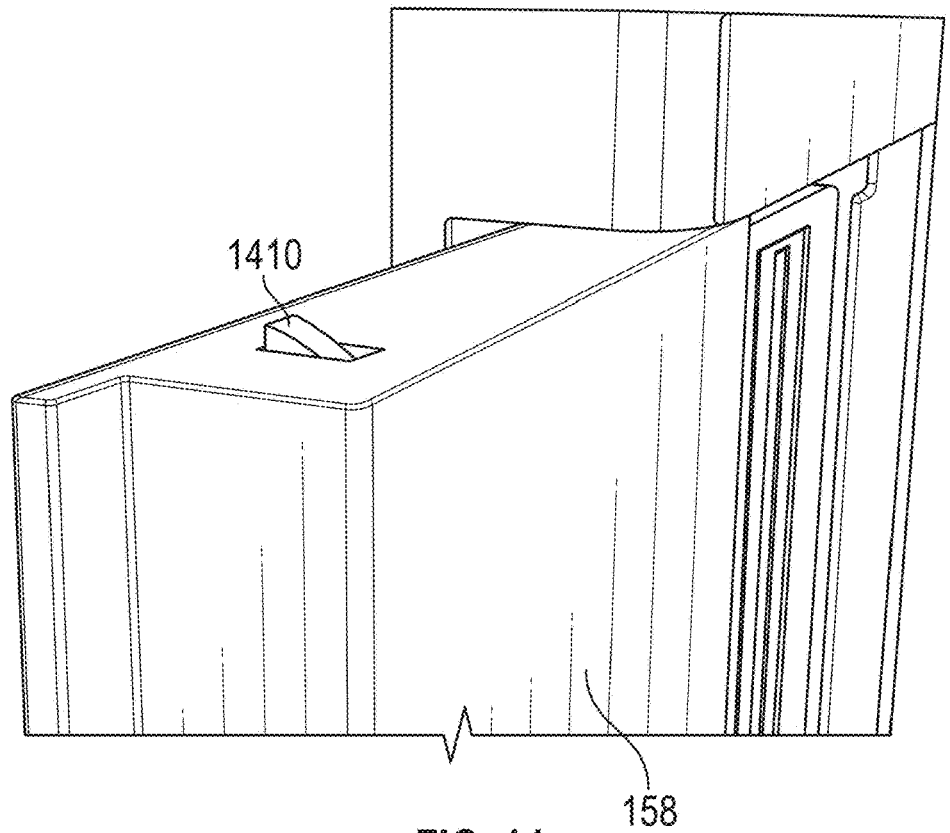
Figure 15:
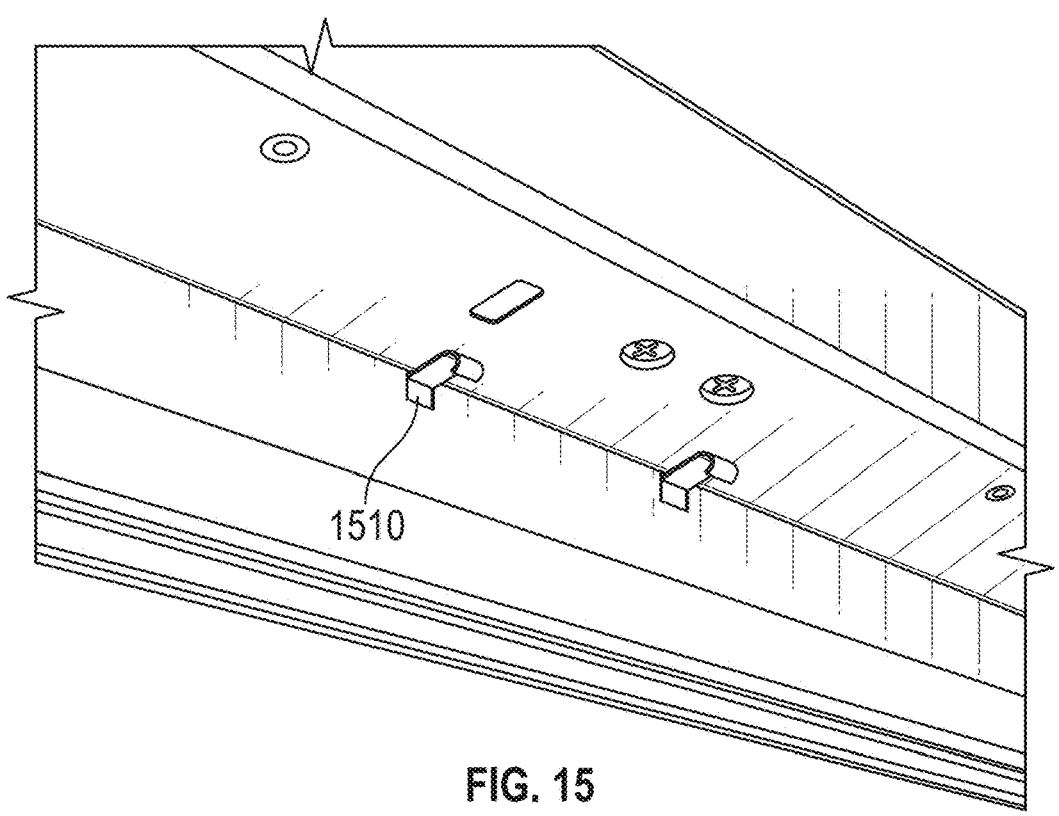
Figure 16:
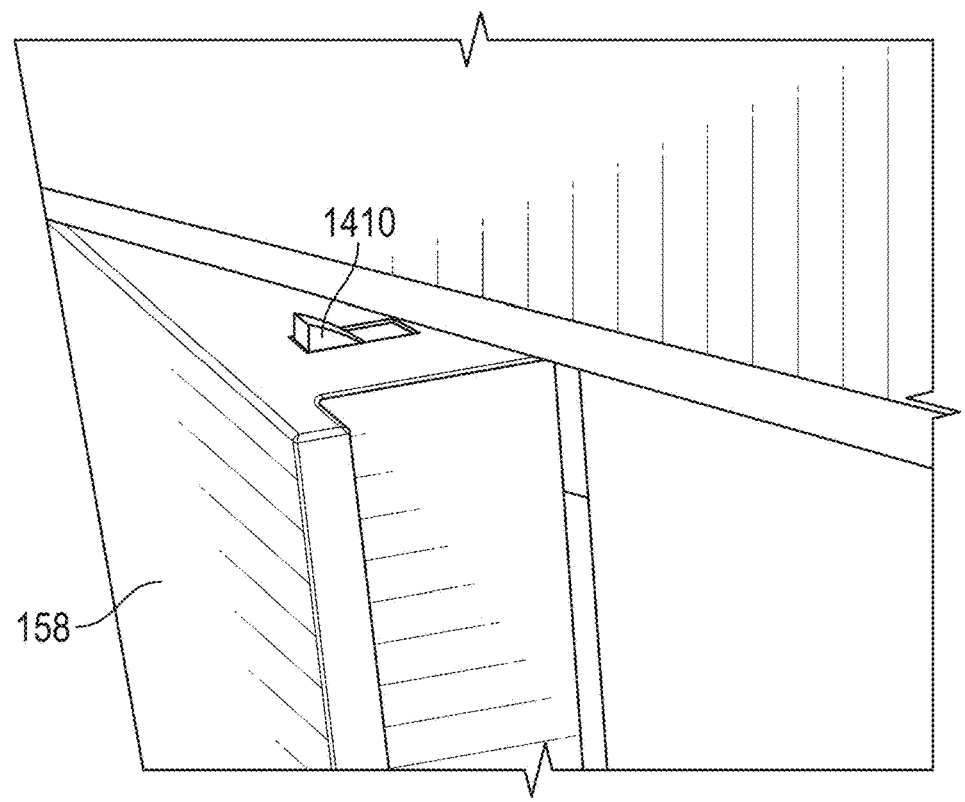
Figure 17:
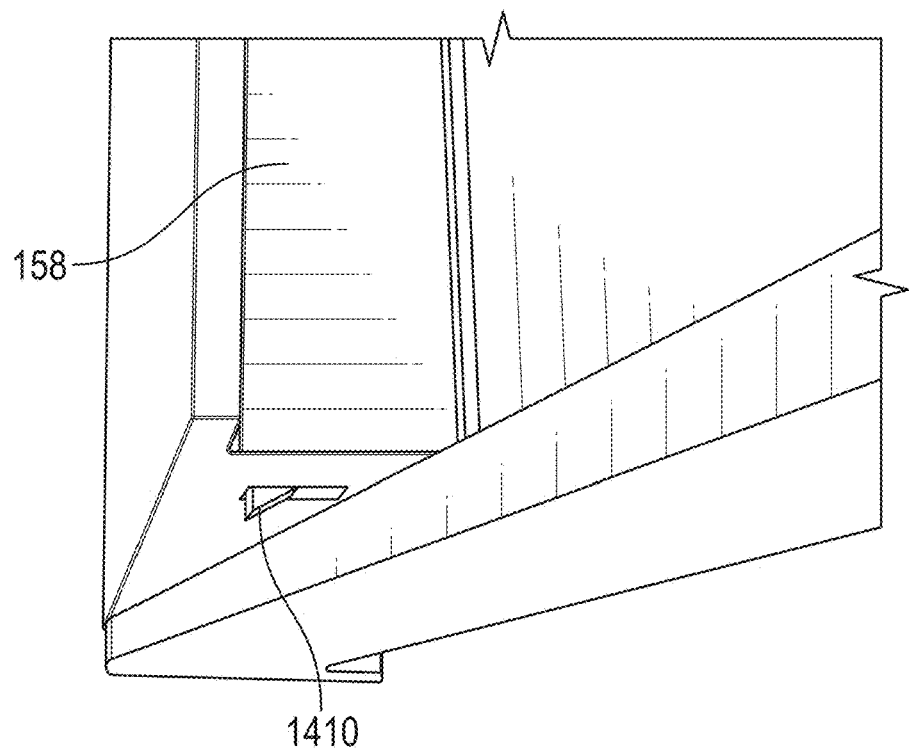
Figure 18:
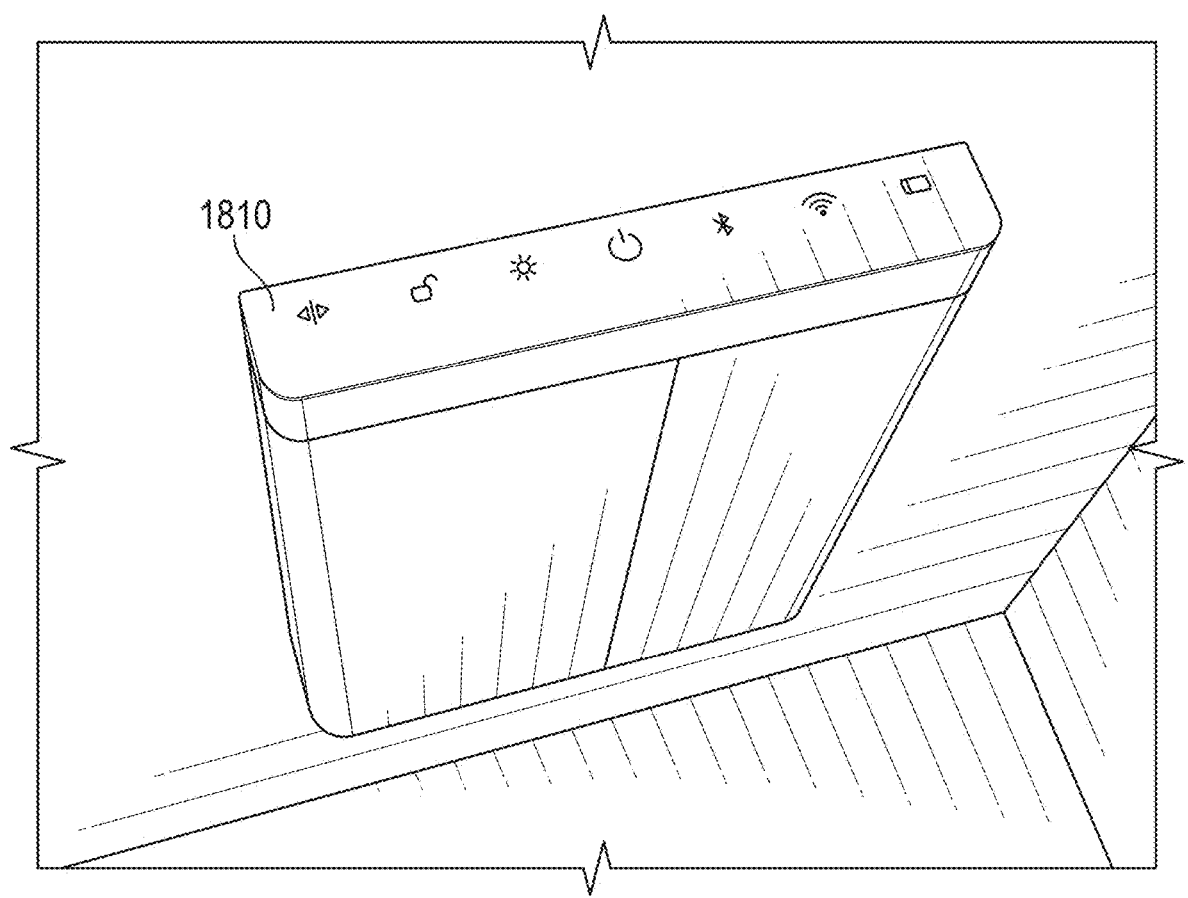
Figure 20:
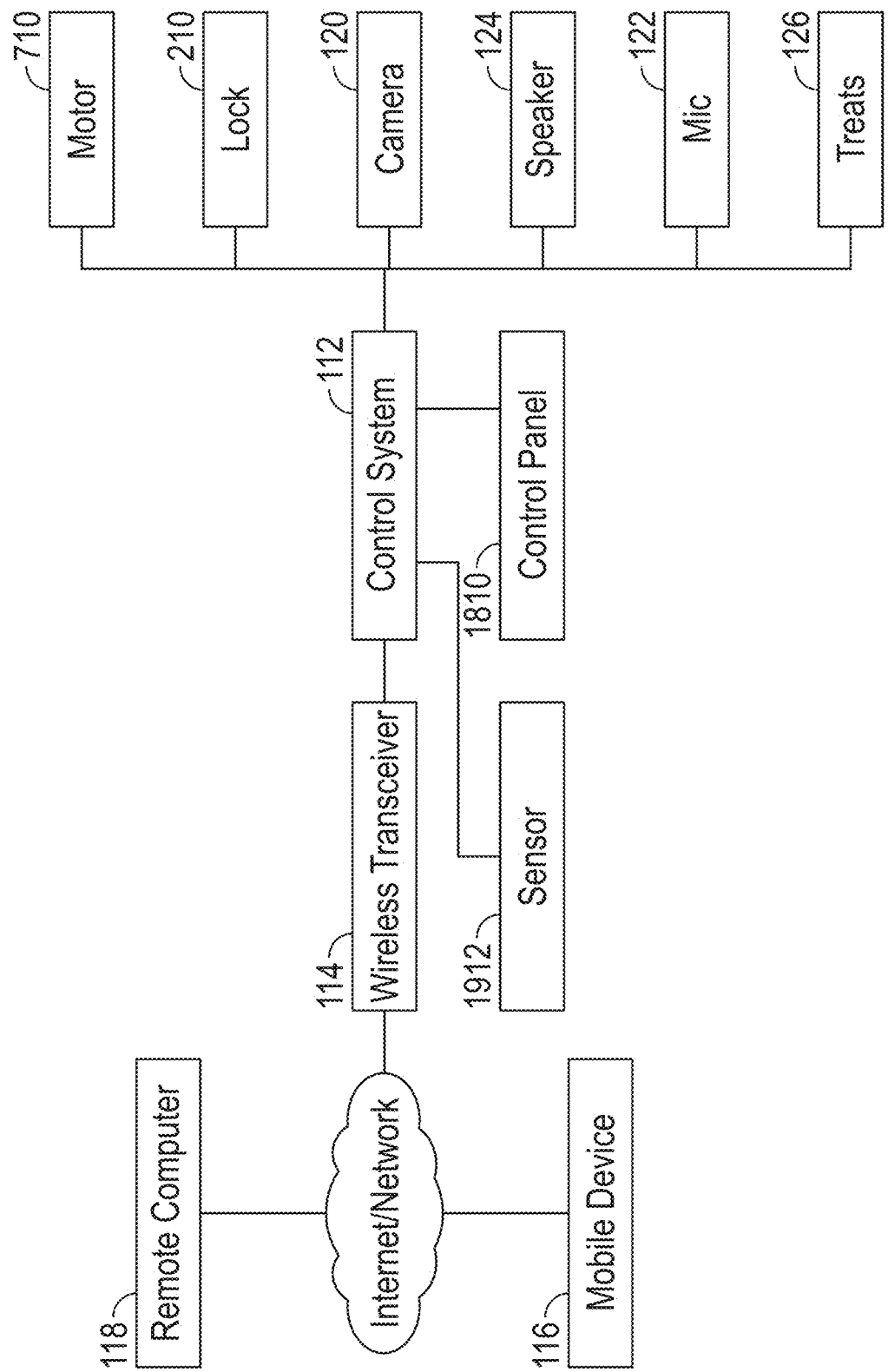
Figure 21A:
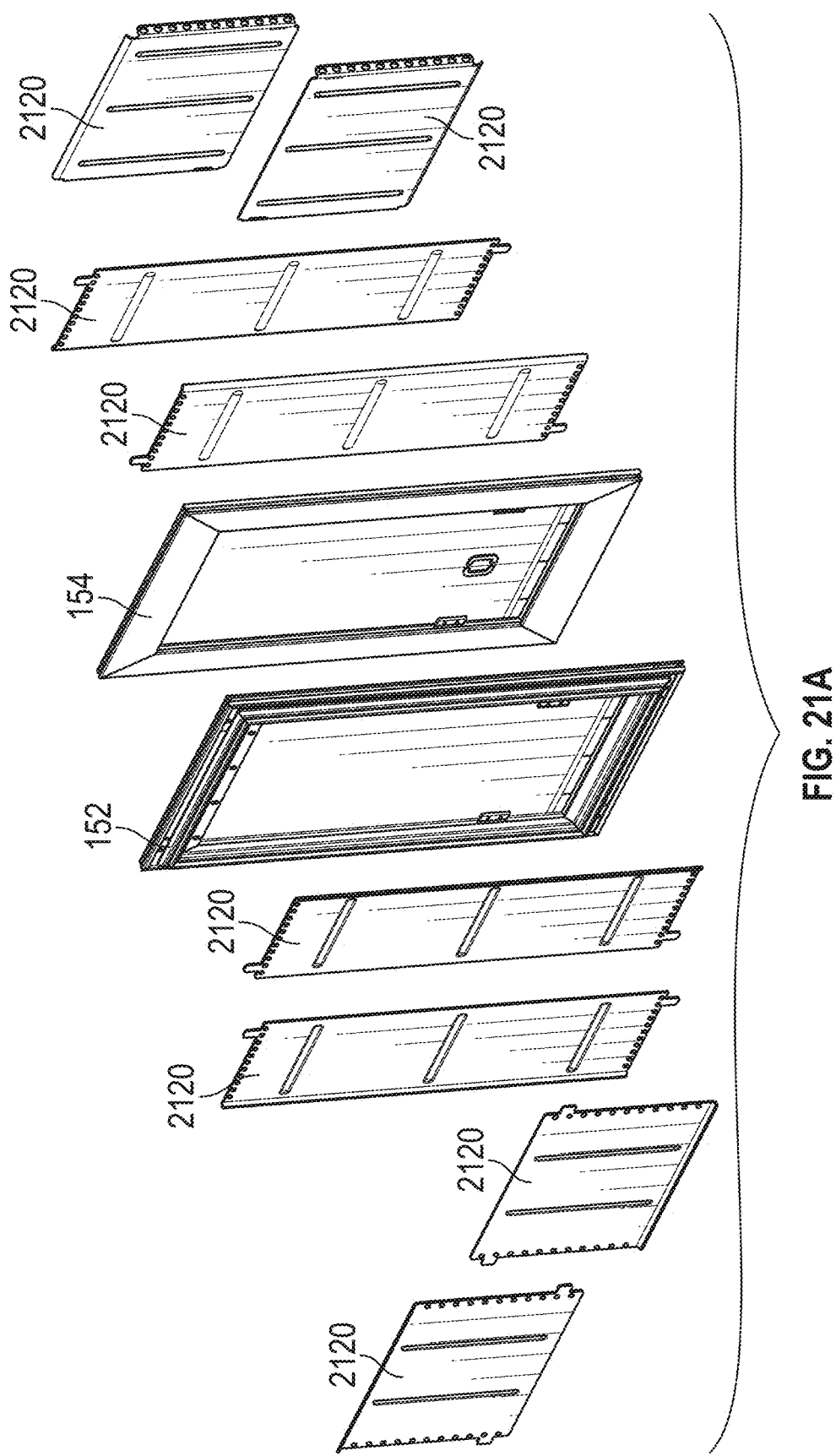
Figure 21B:
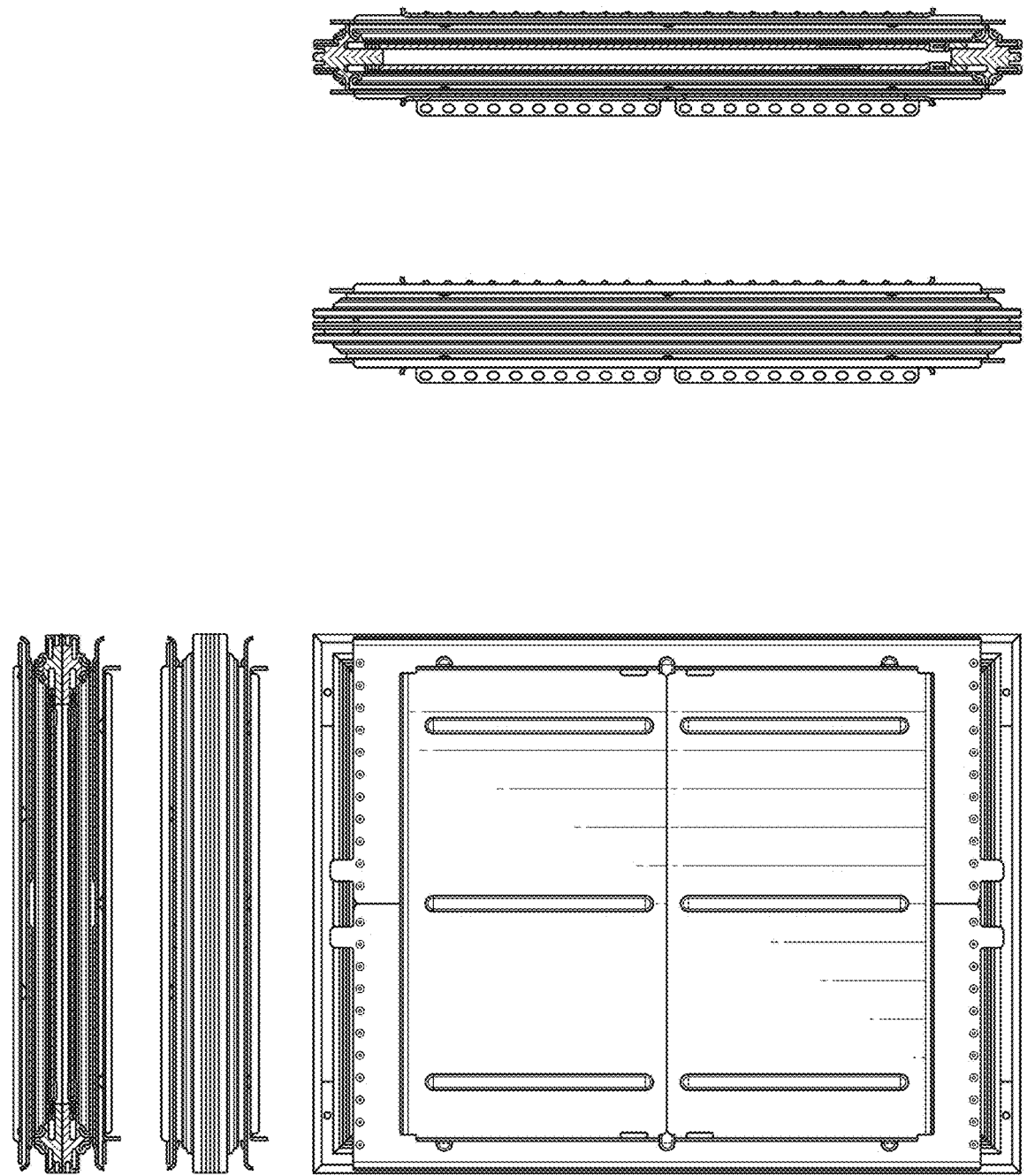
Figure 21D:
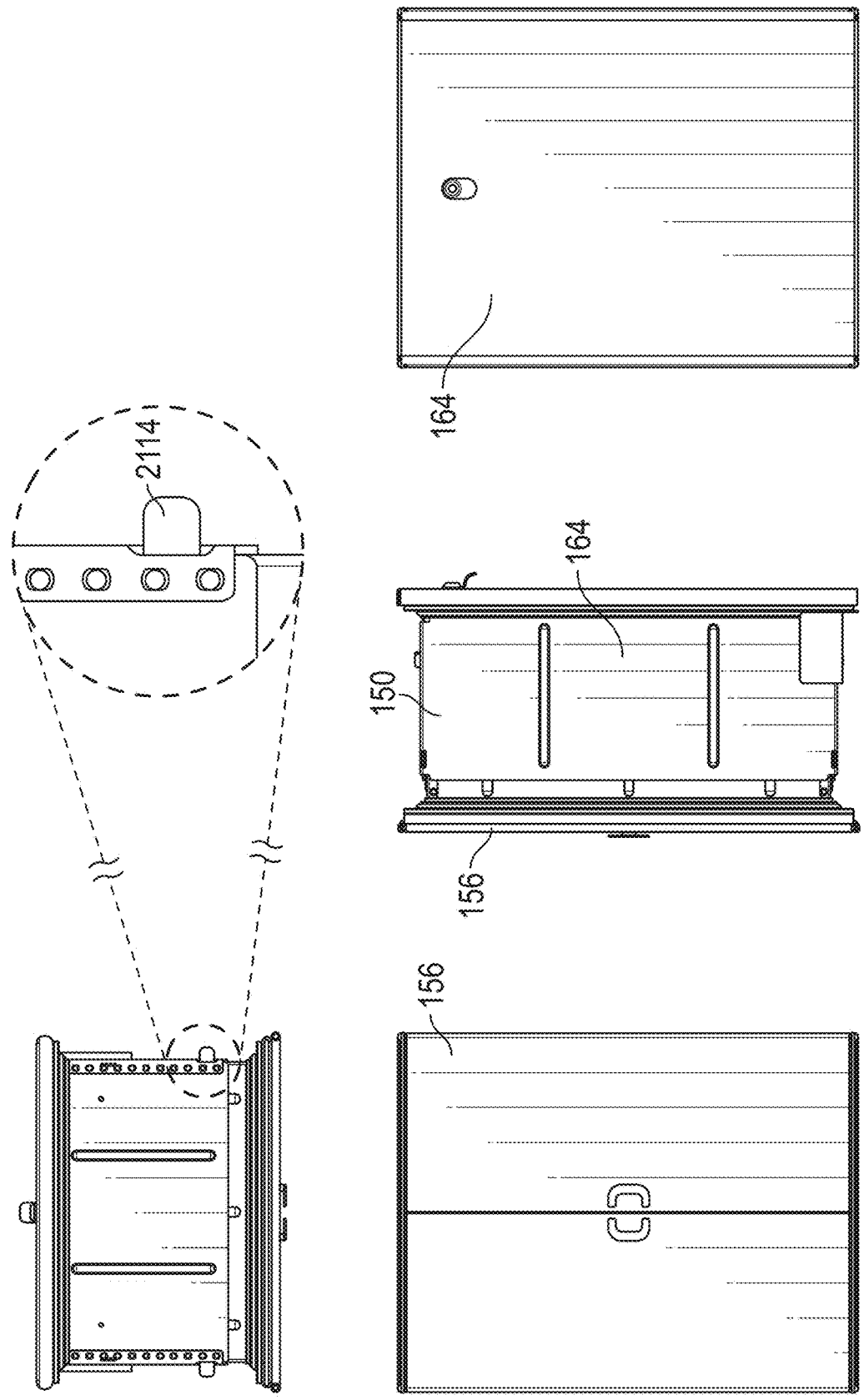
Figure 21E:
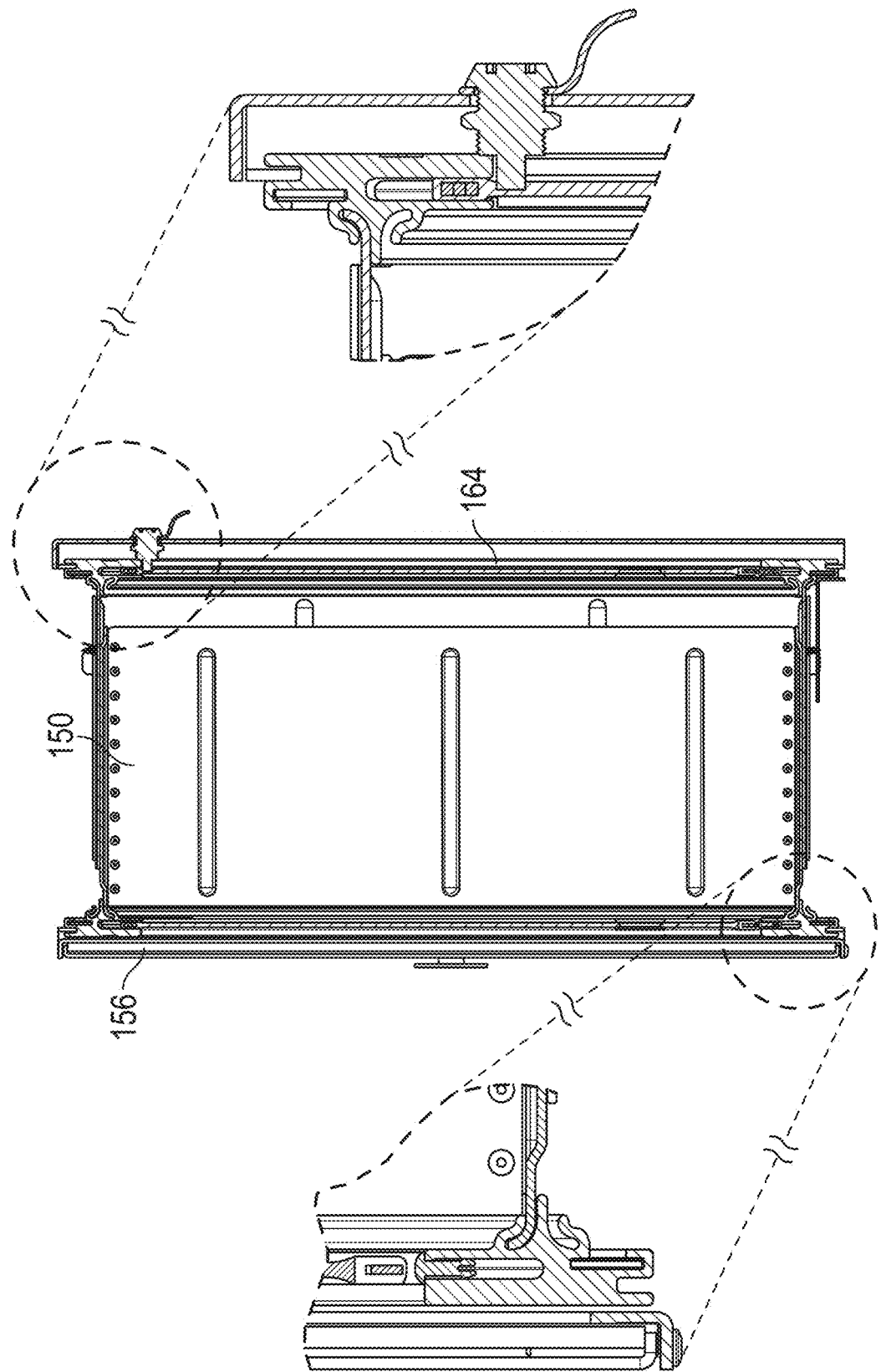
Figure 21F:
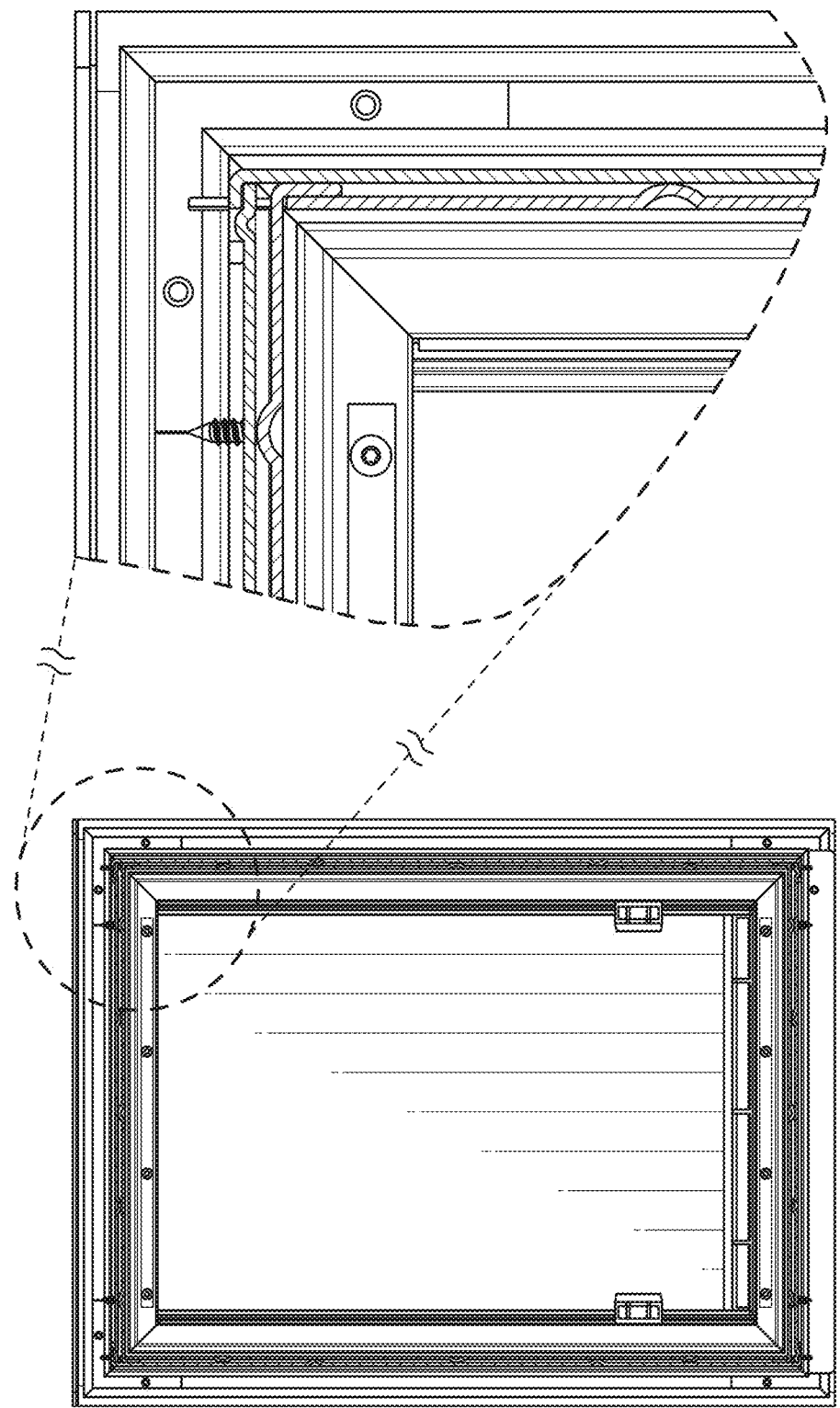
Figure 22:
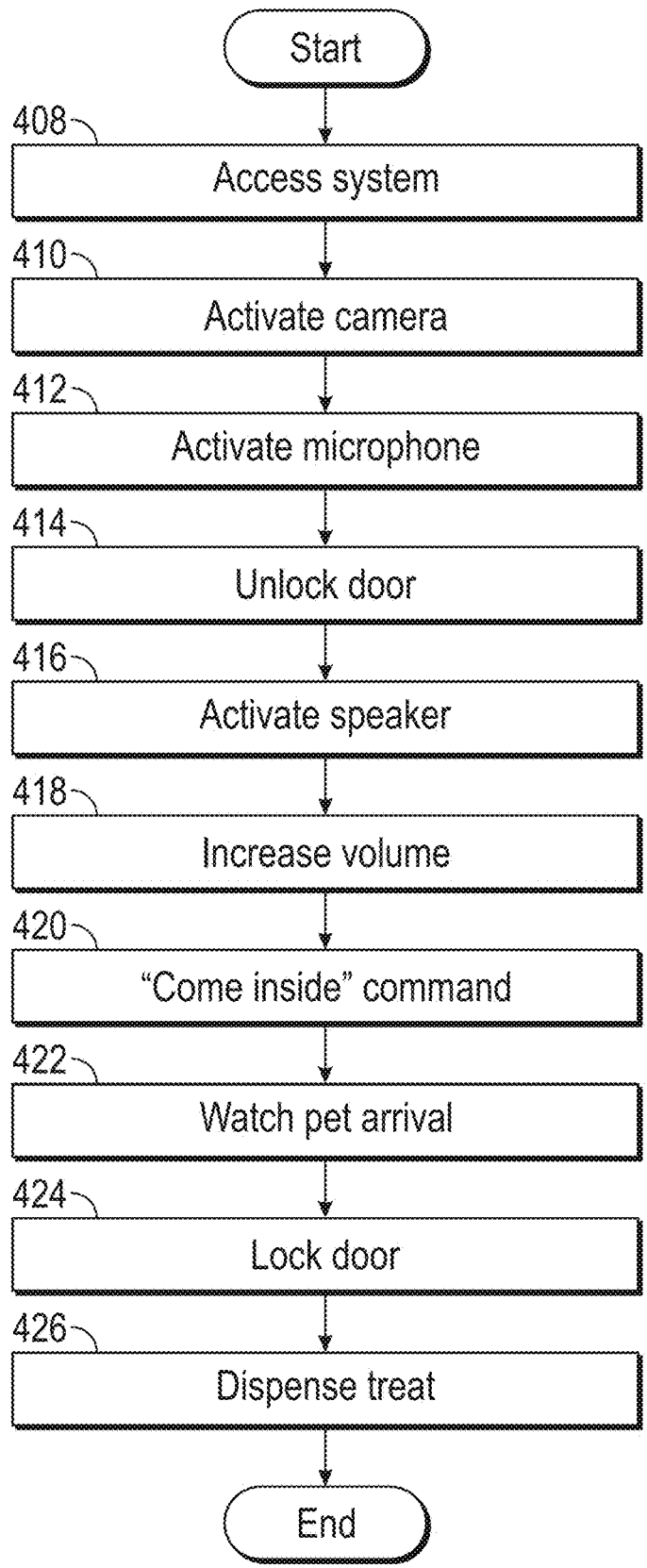
Figure 23:
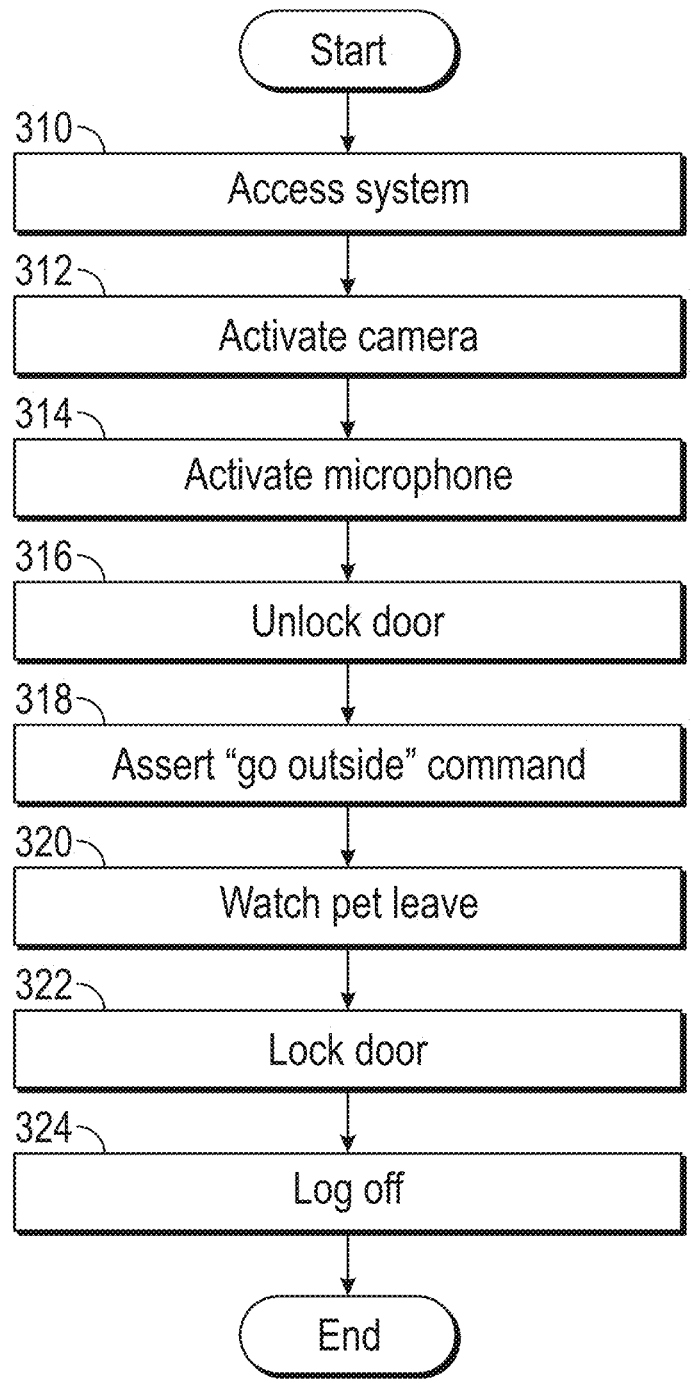
Figure 25:
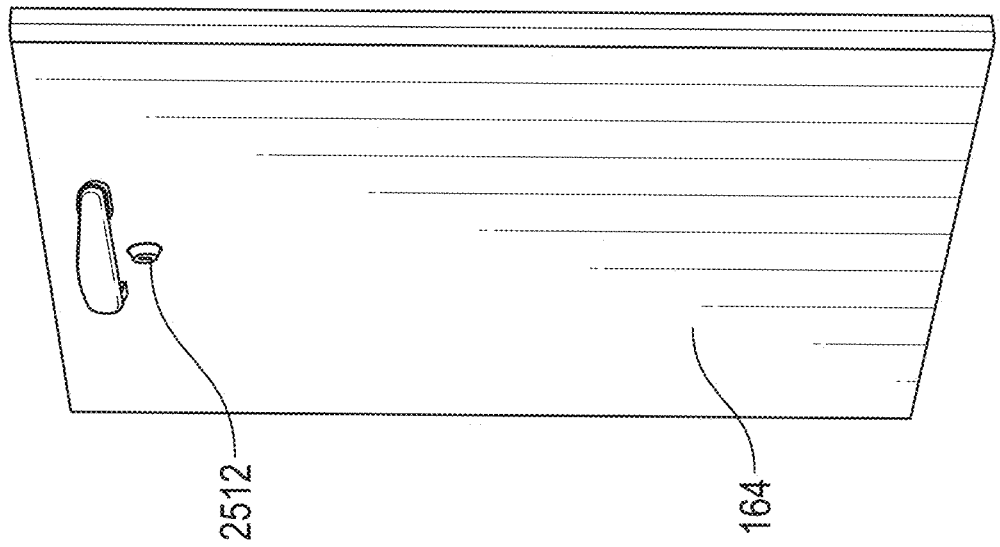
Figure 24:
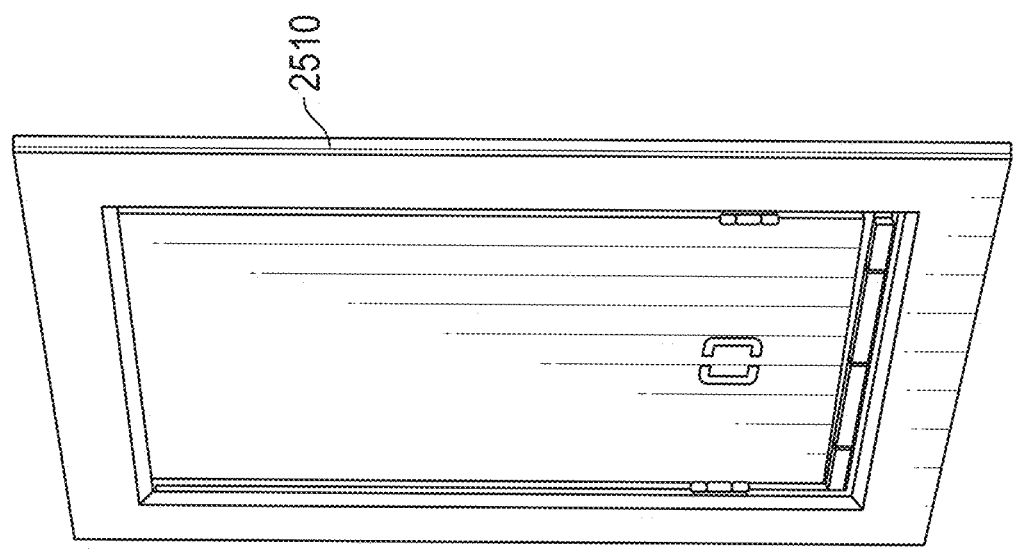
Figure 27:
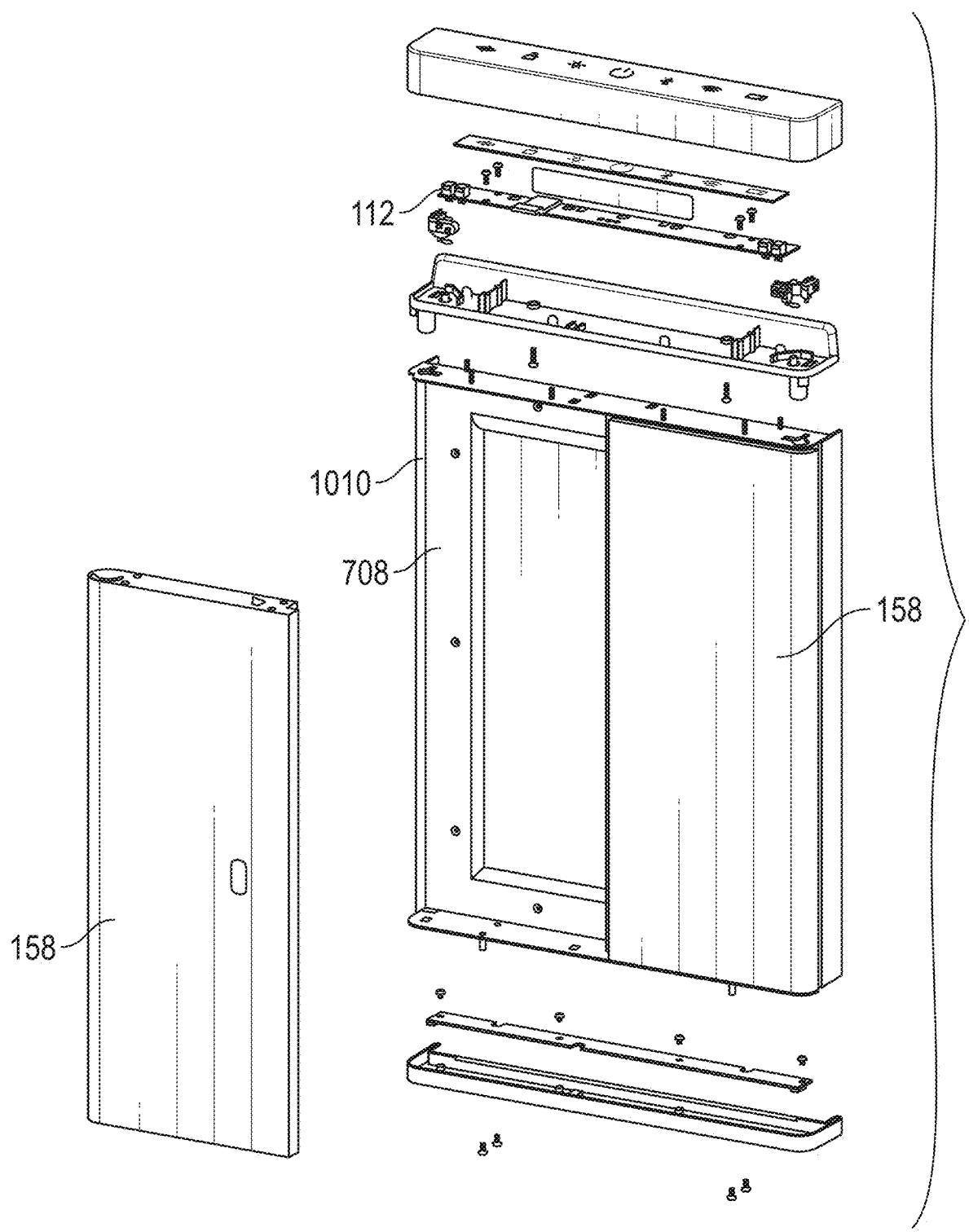
Figure 28B:
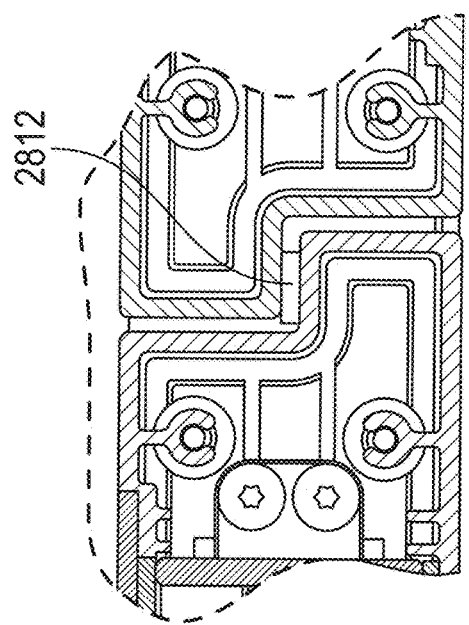
Figure 28C:
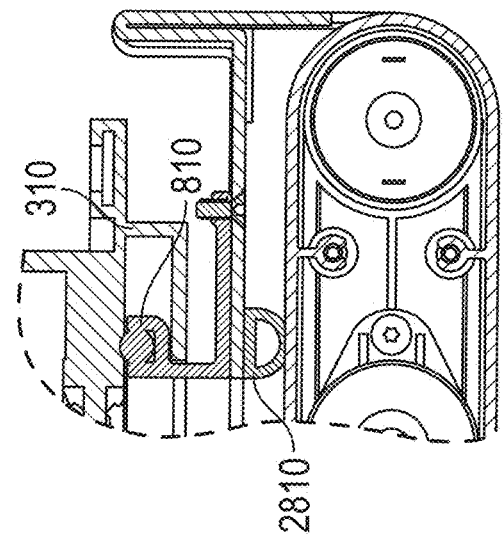
Figure 28A:
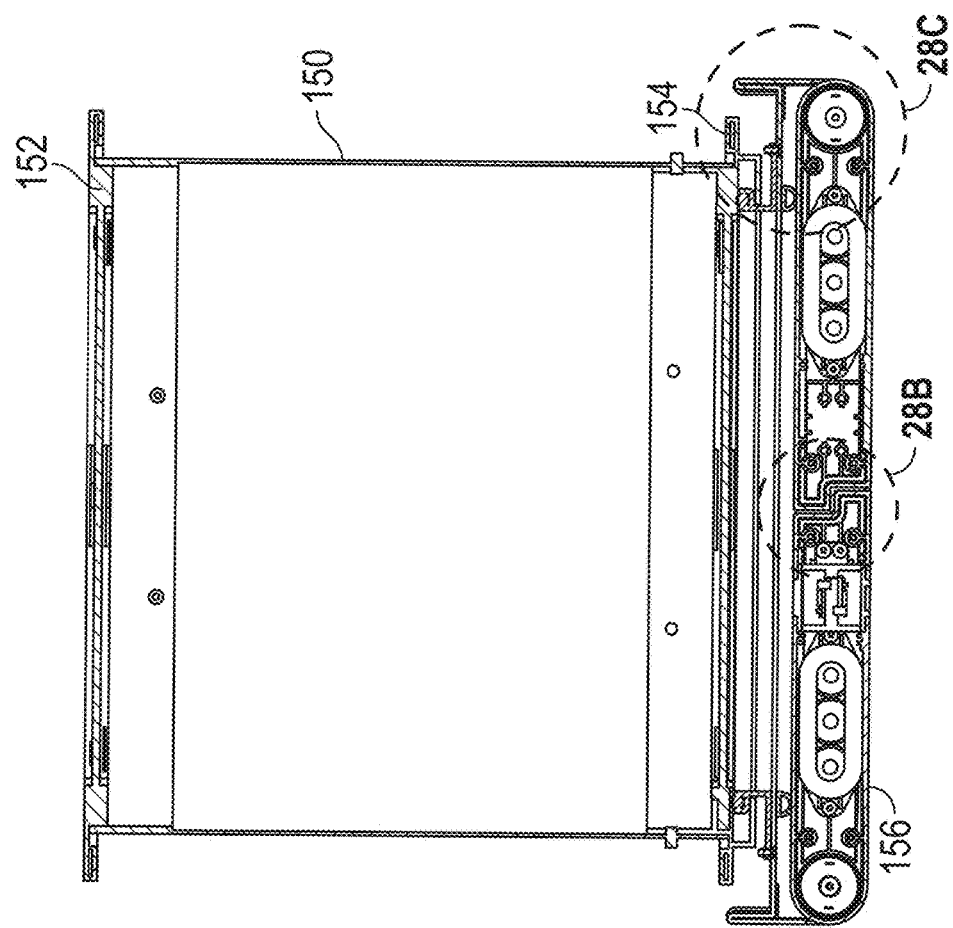
Figure 29:
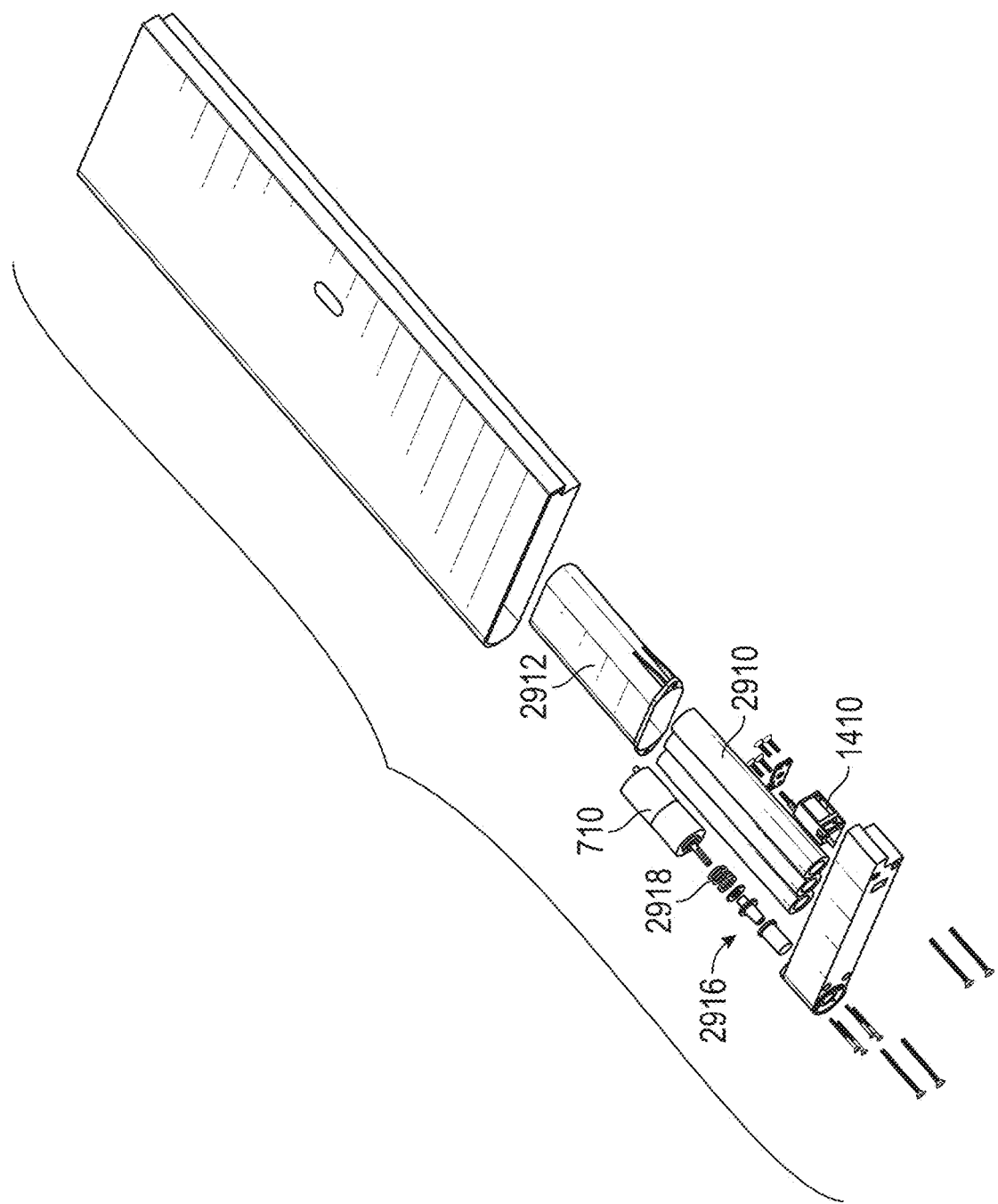
Figure 30:
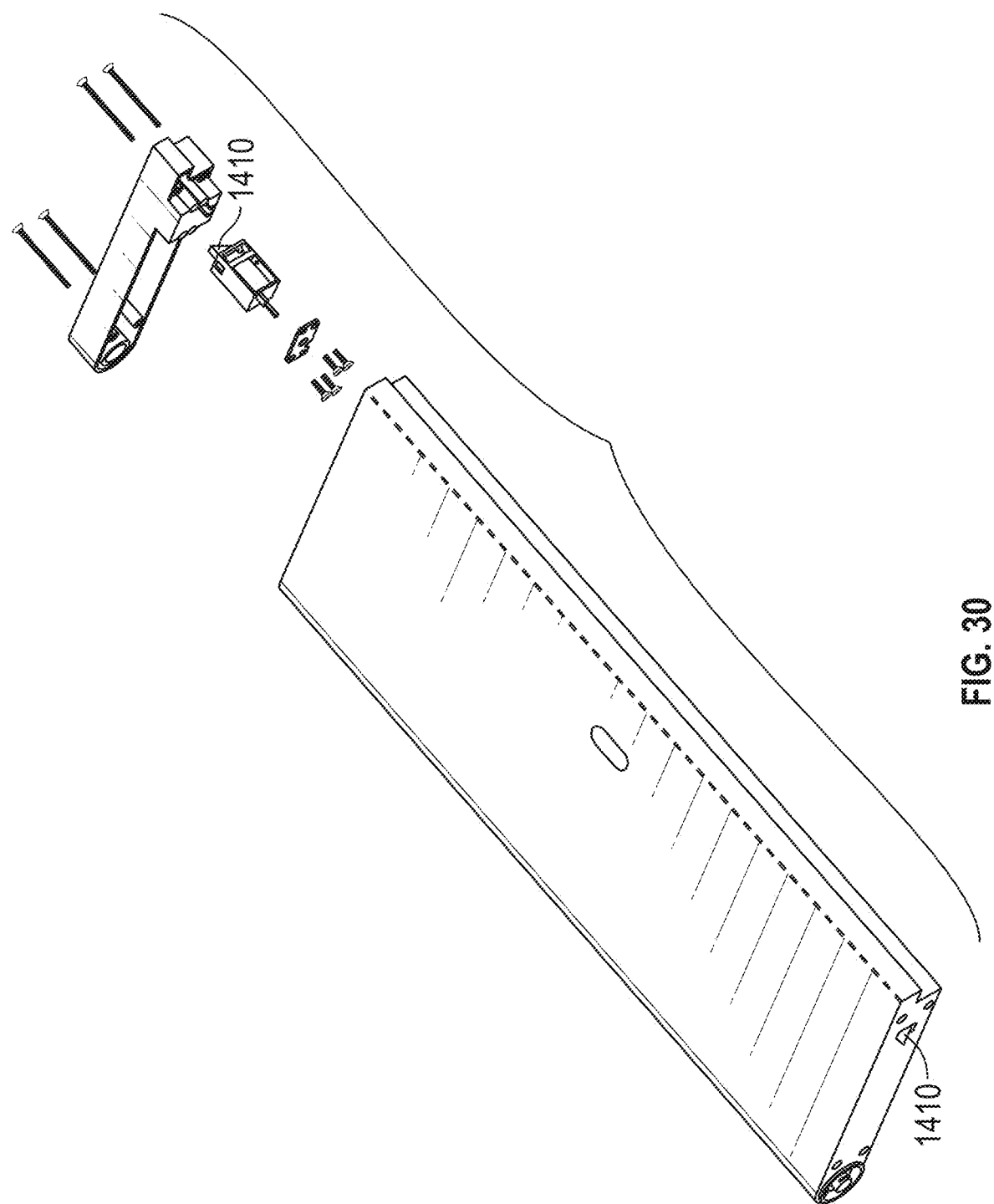
Figure 31A:
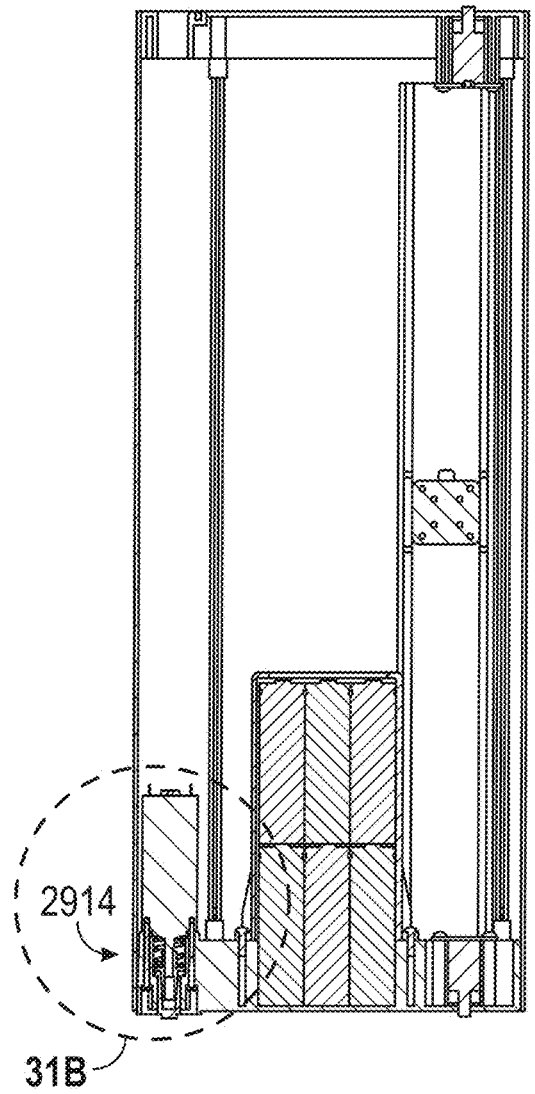
Figure 31B:
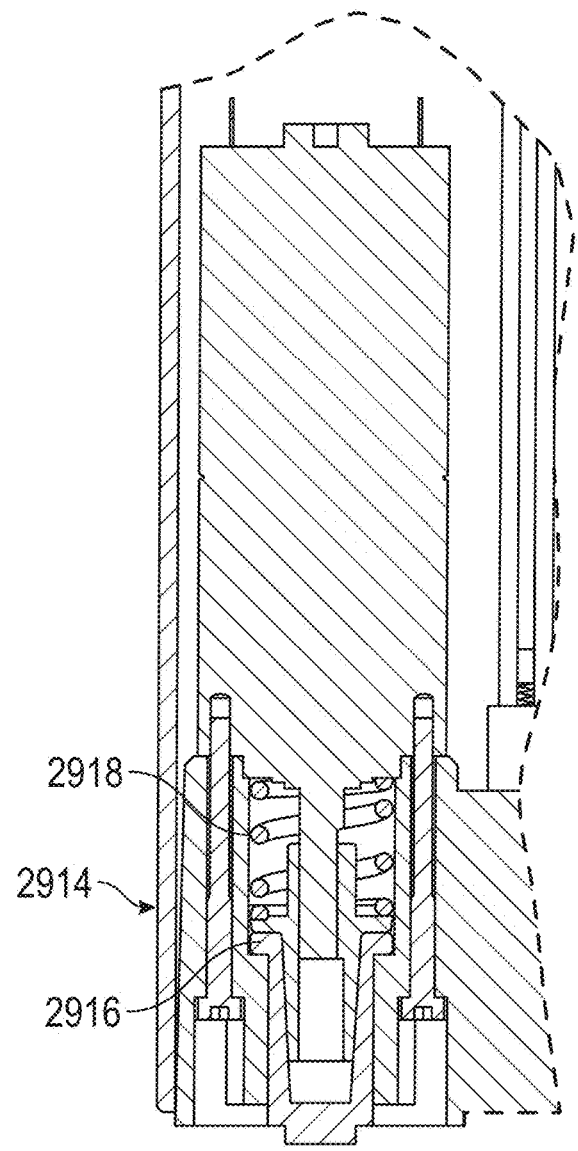
Figure 33:
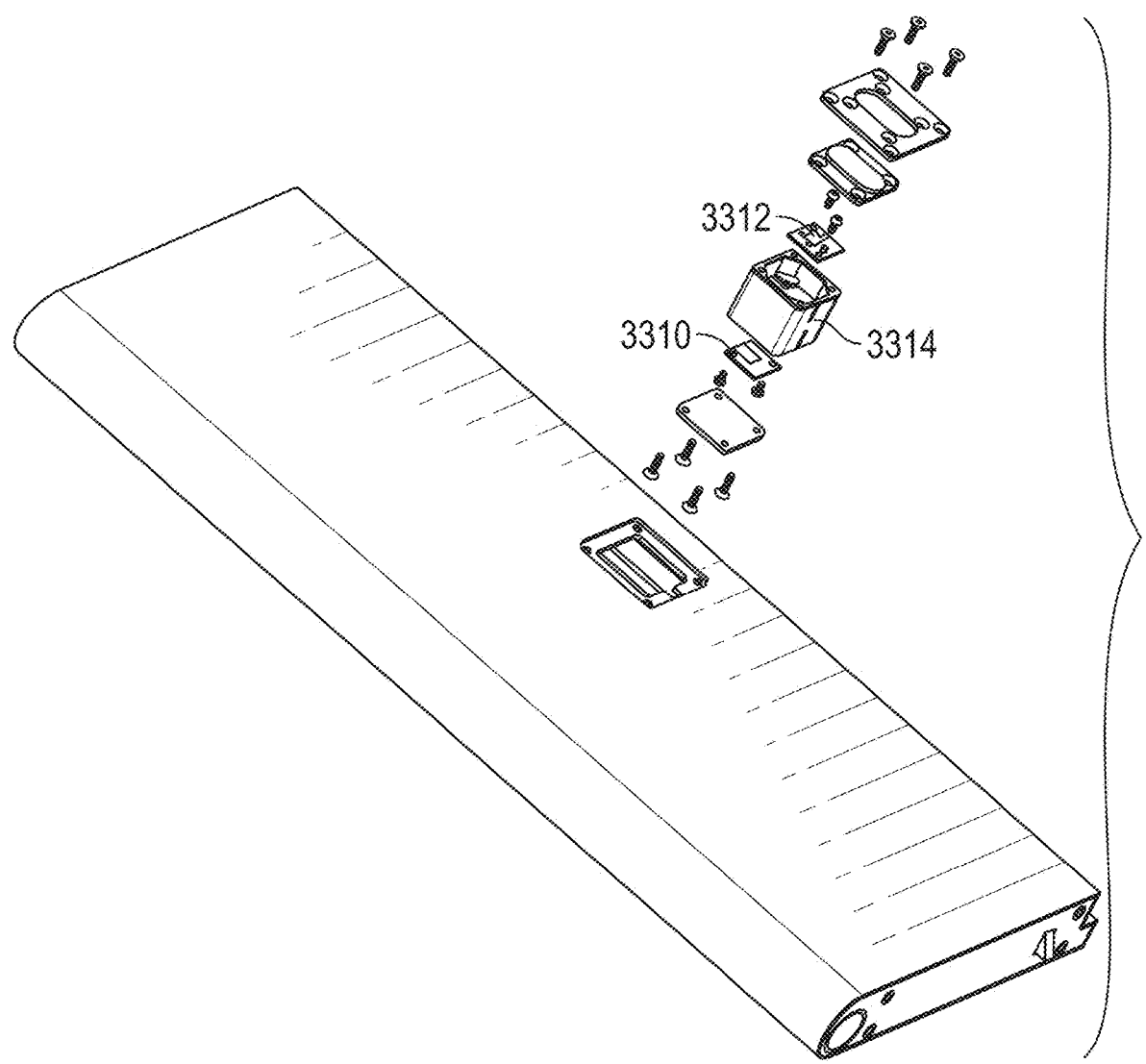
Figure 34A:
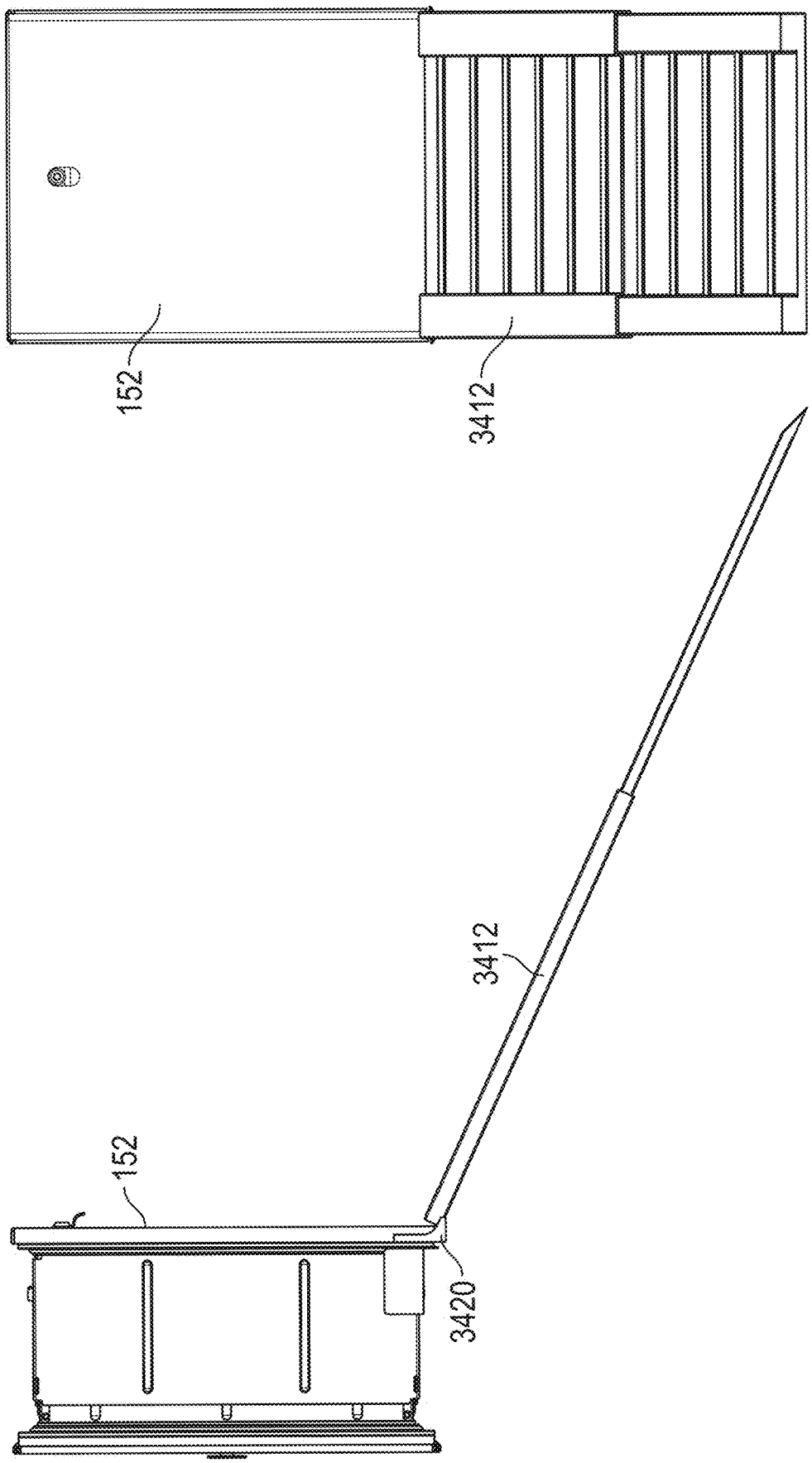
Figure 35:
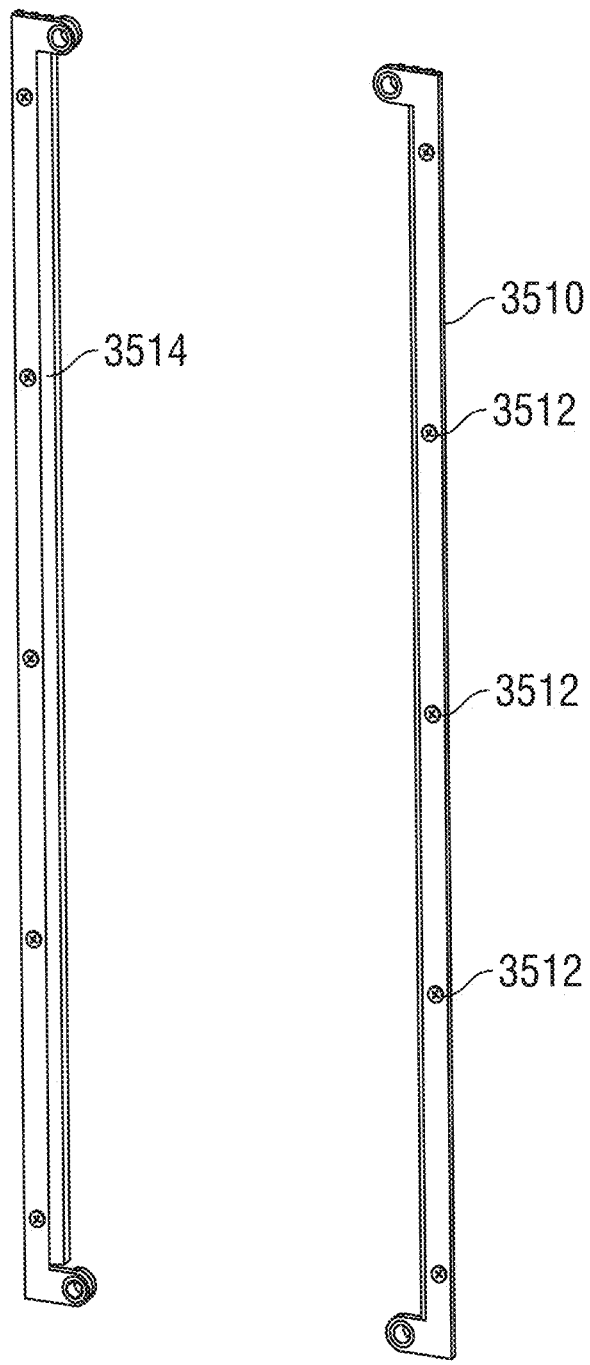
Figure 36:
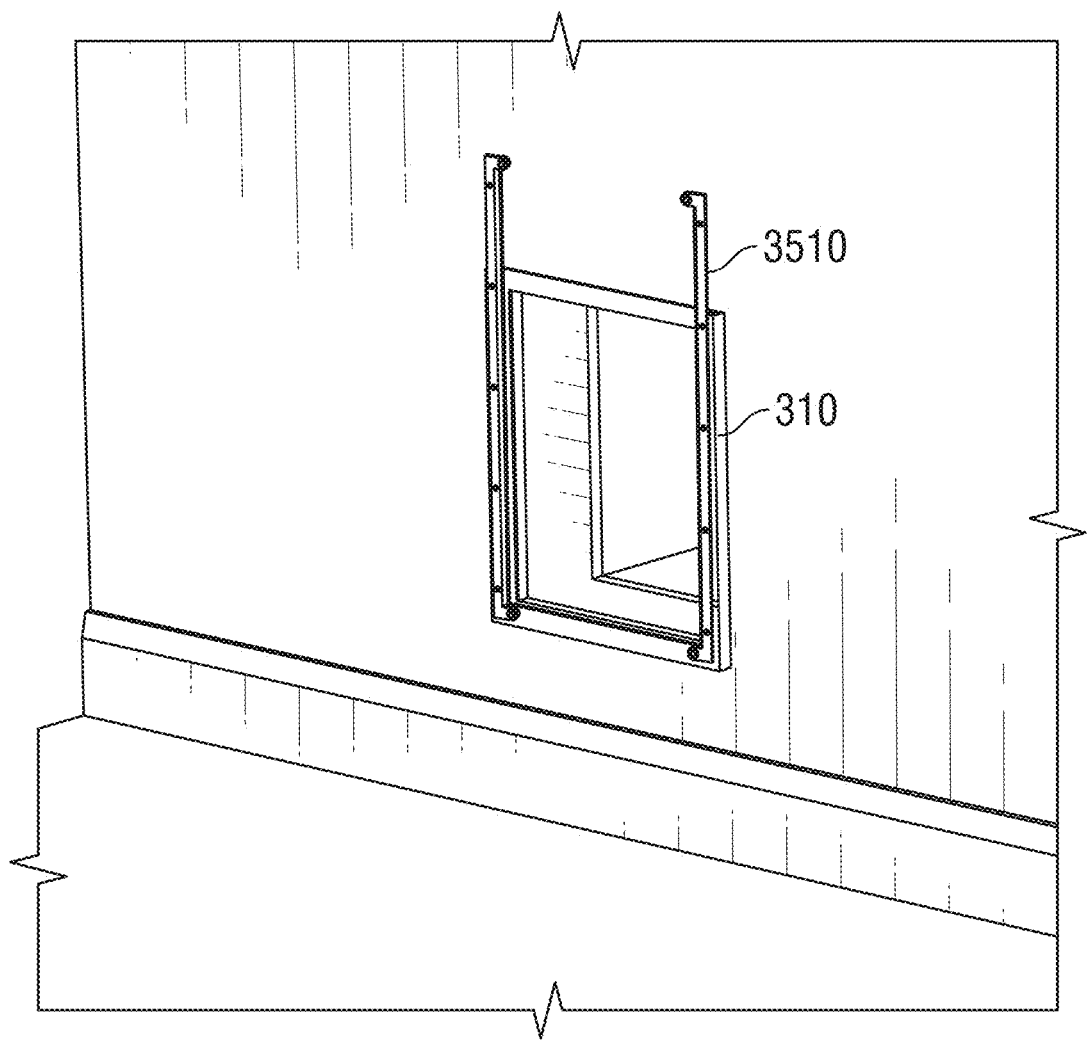
Figure 37:
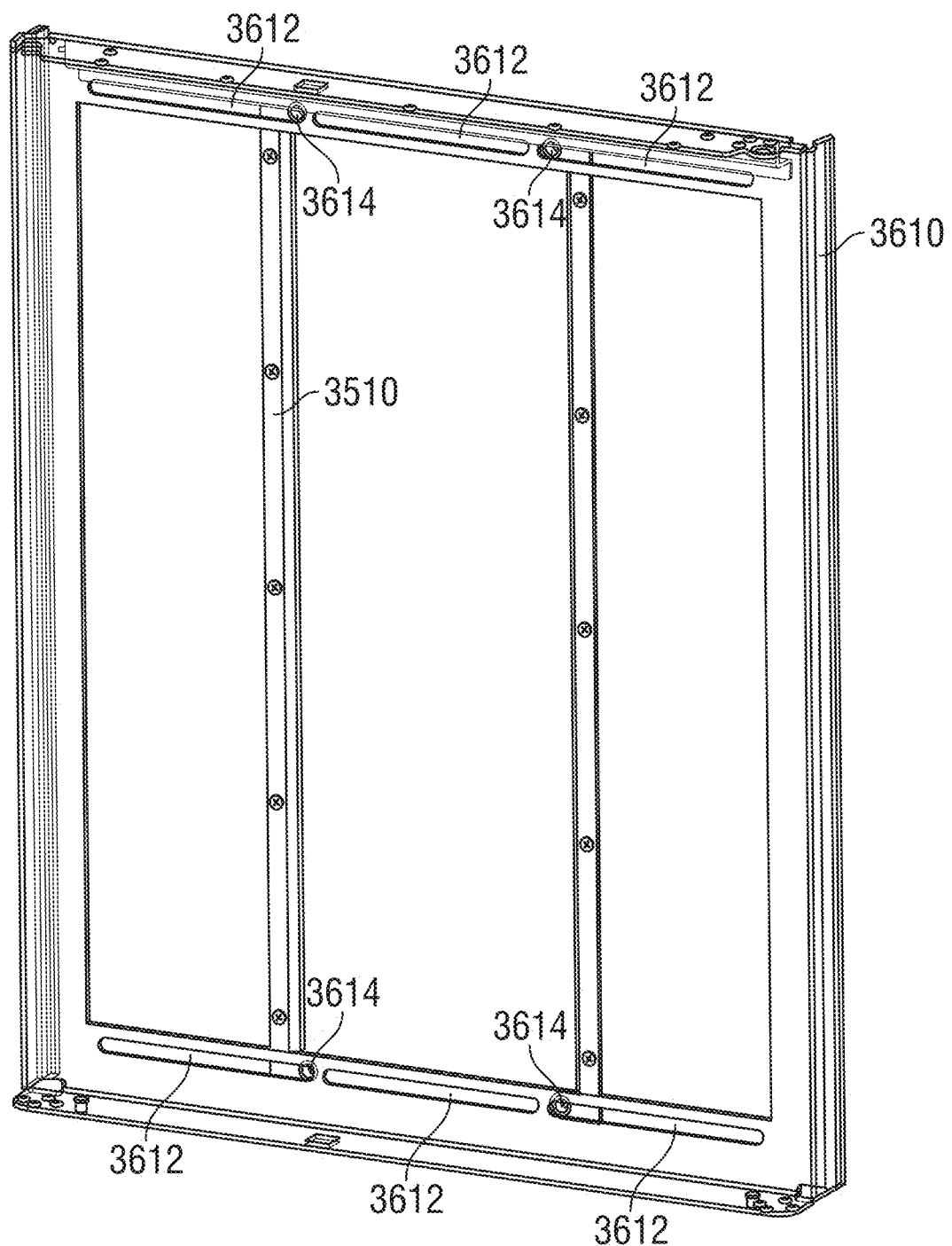
Figure 38:
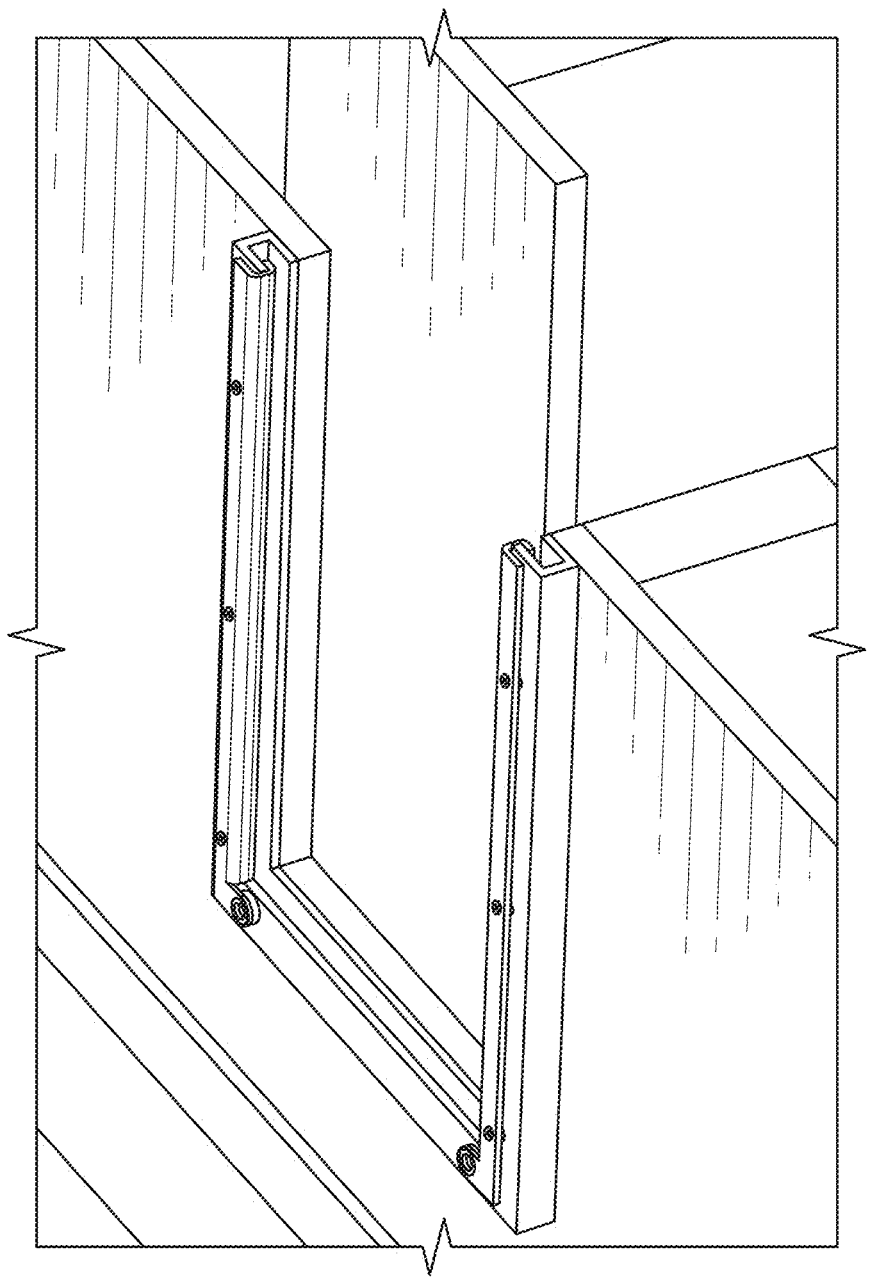
Figure 39:
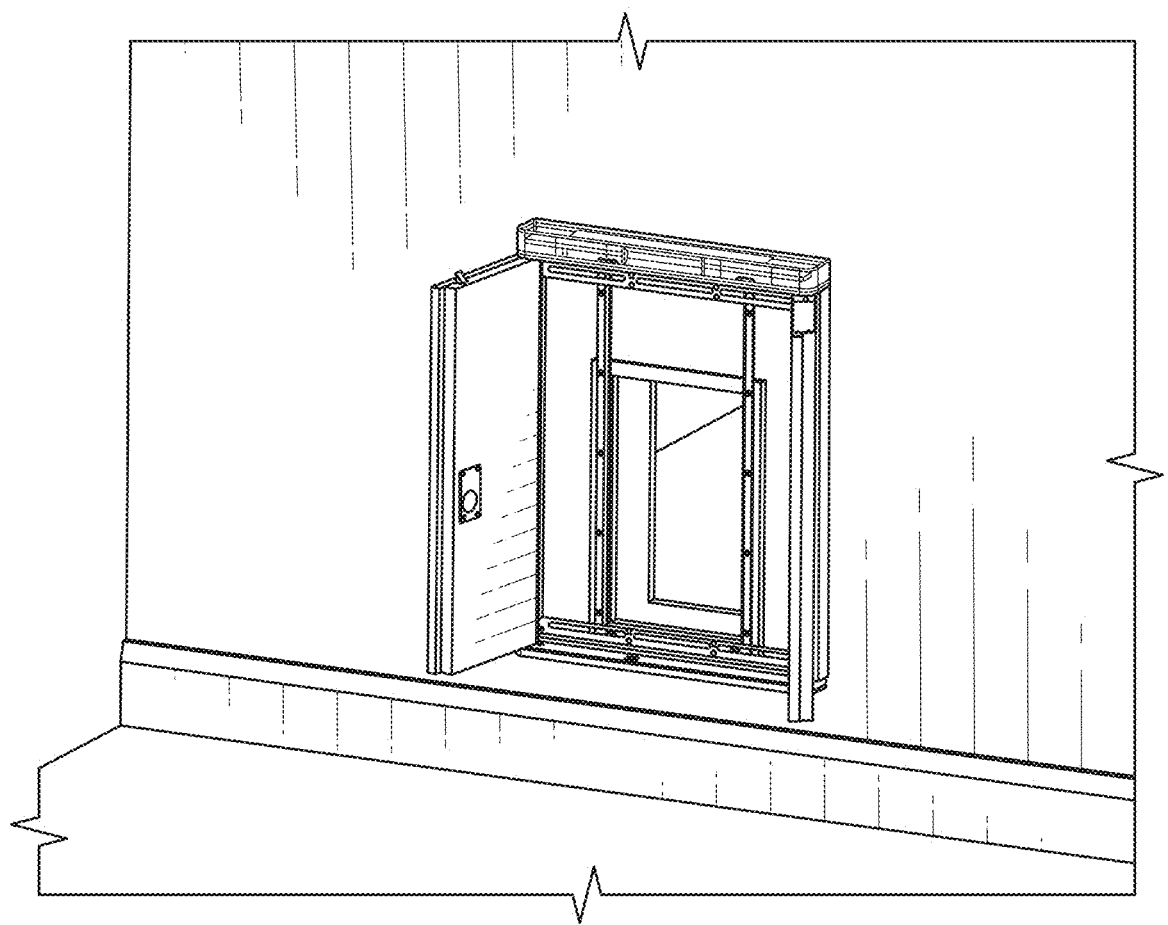
Figure 40:
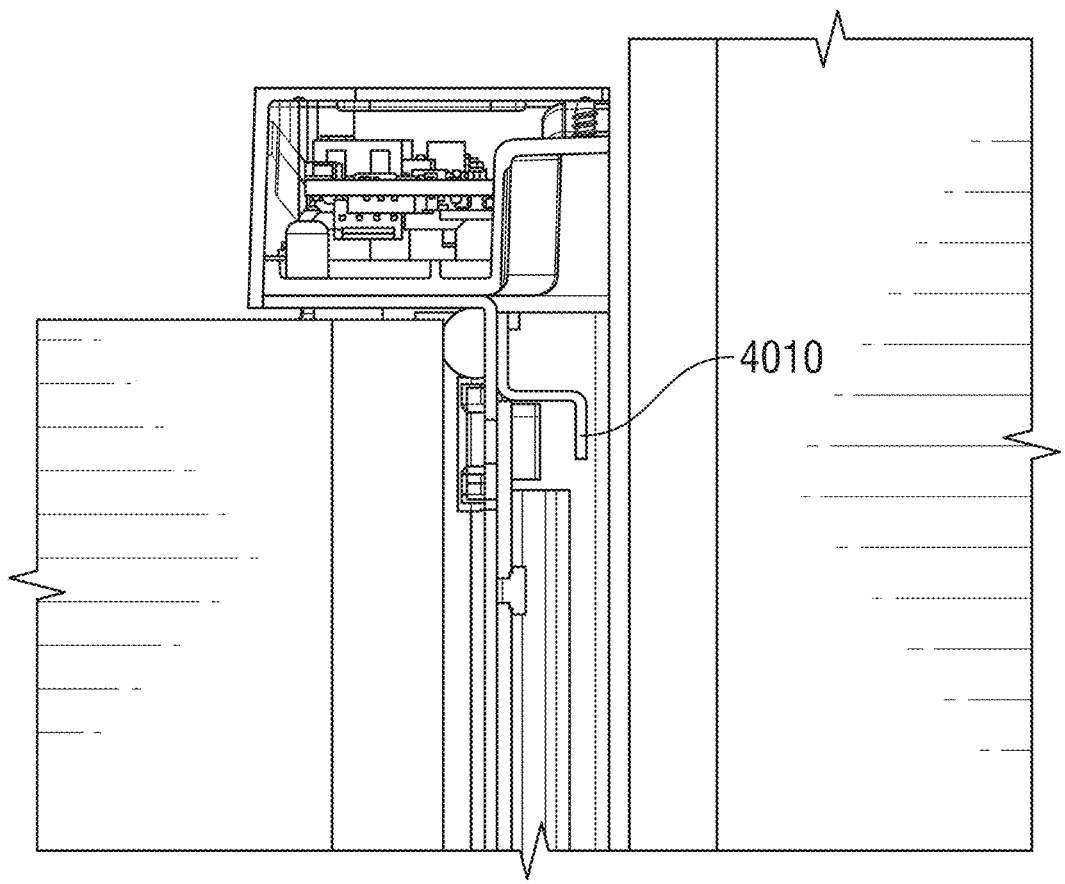
Figure 41A:
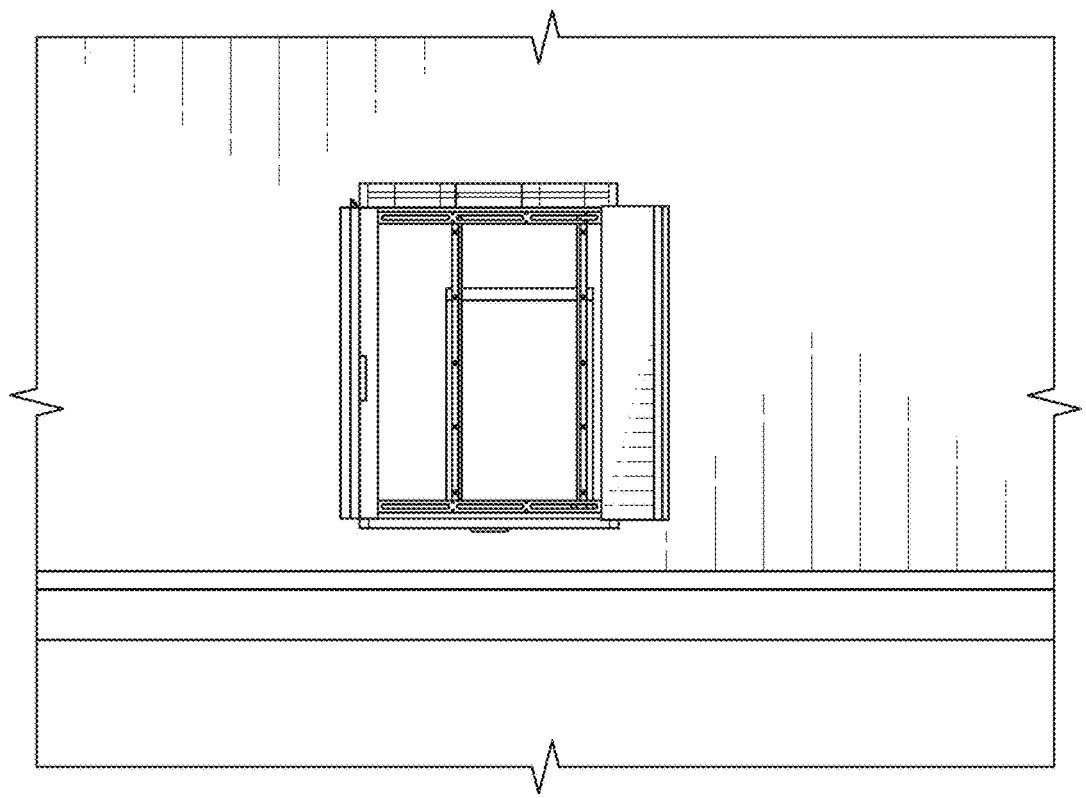
Figure 41B:
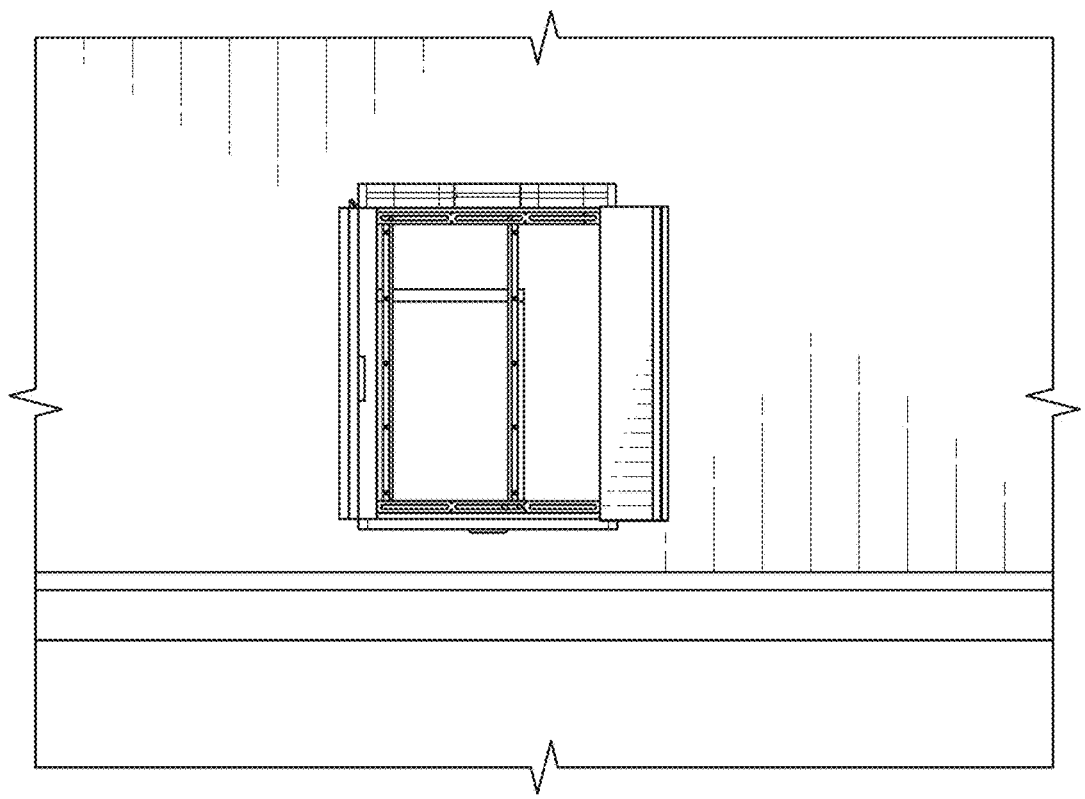
Figure 42:
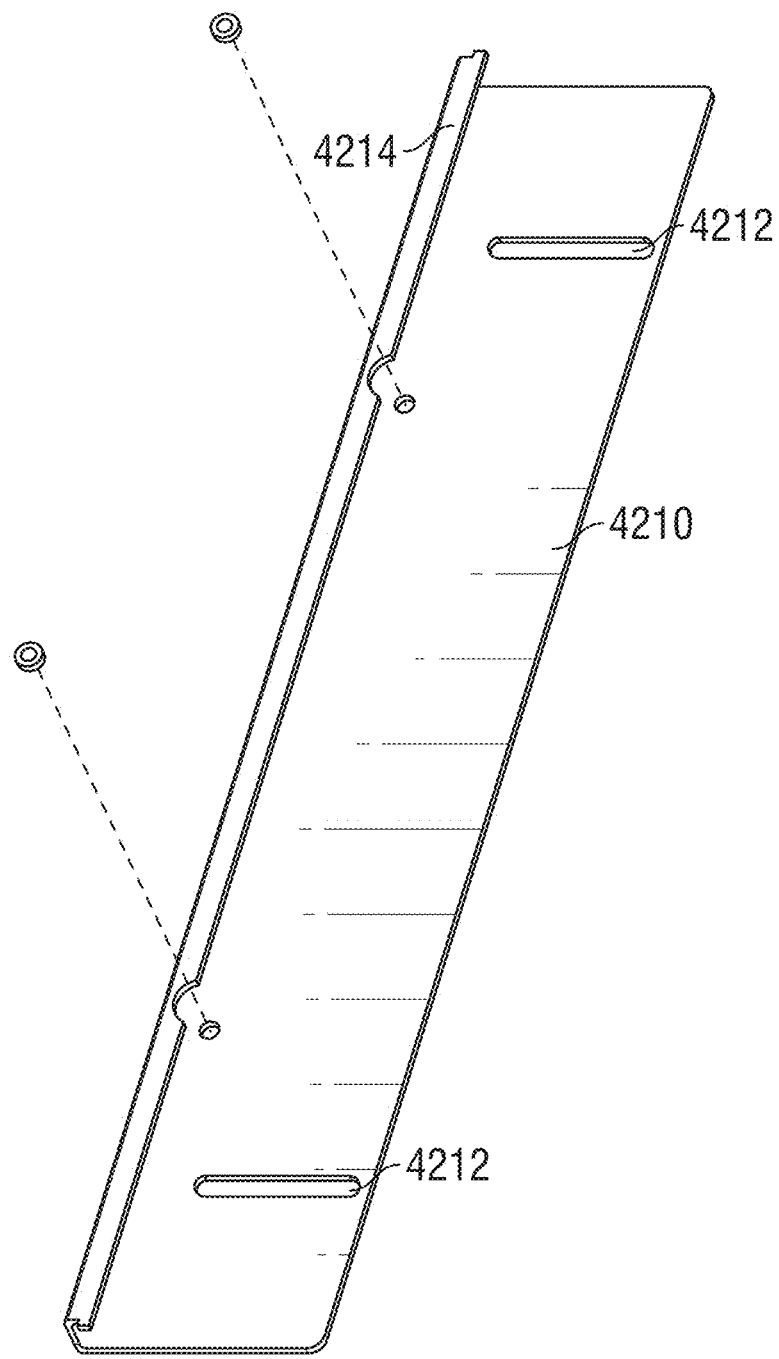
Figure 43:
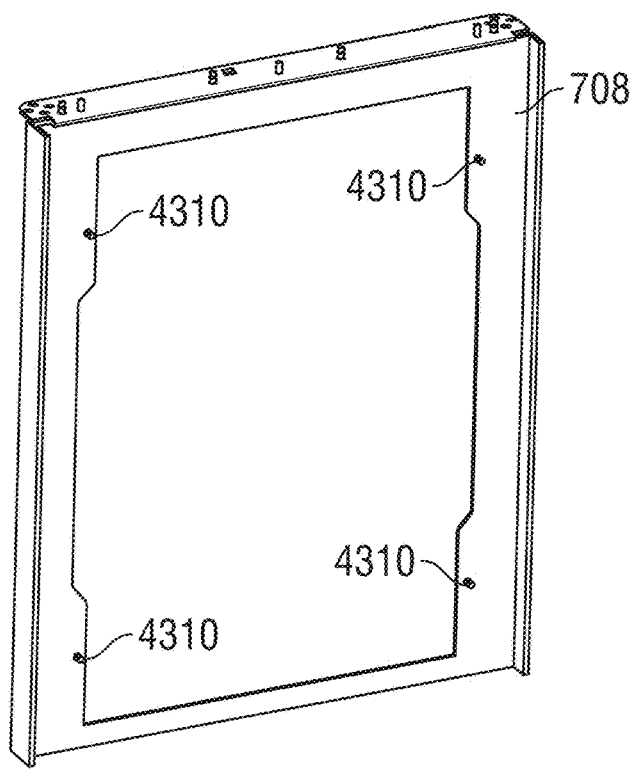
Figure 44:
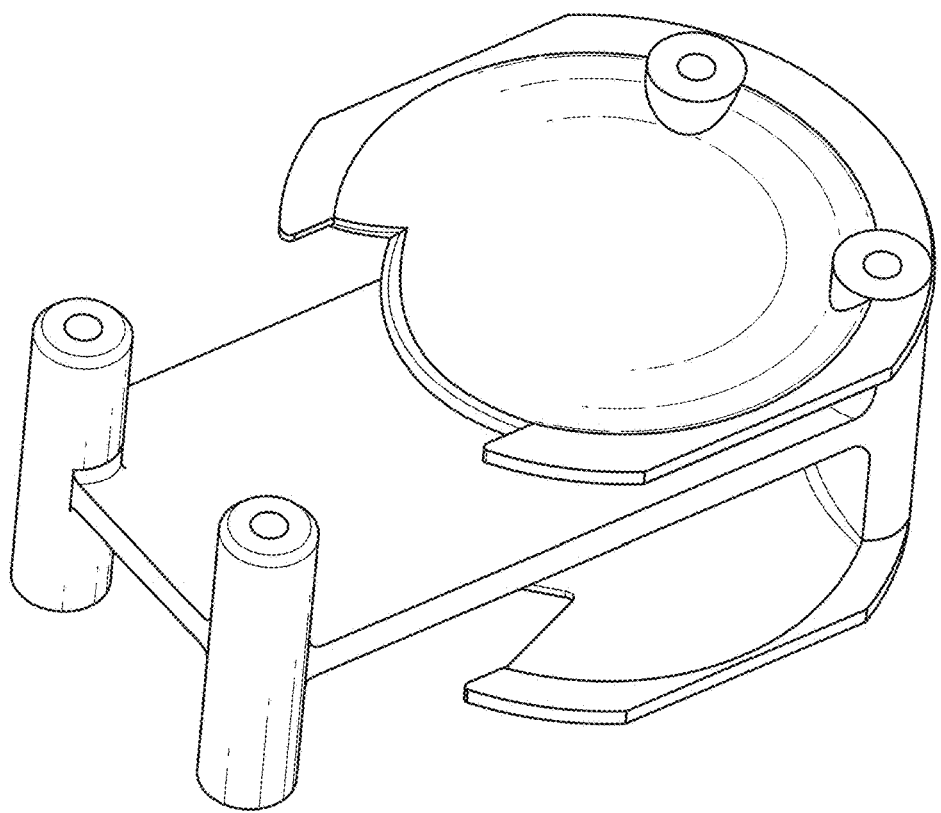
Figure 45:
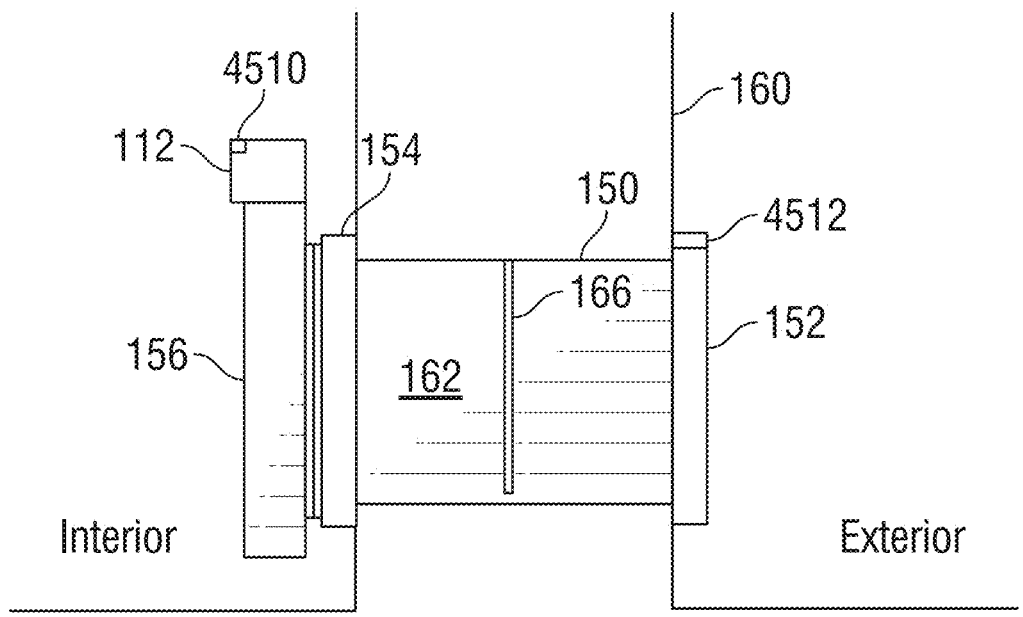
Figure 46:
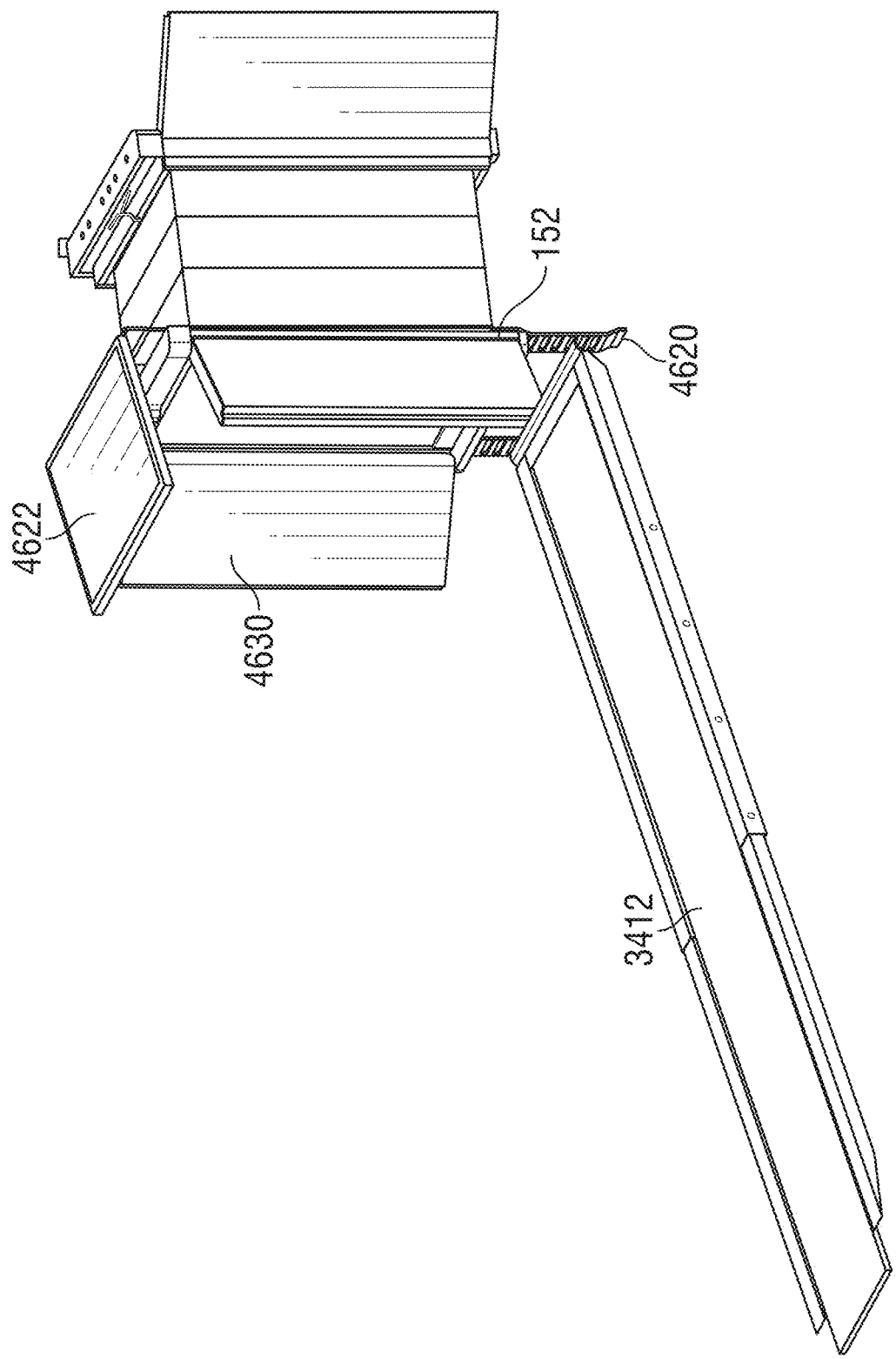
Figure 47:
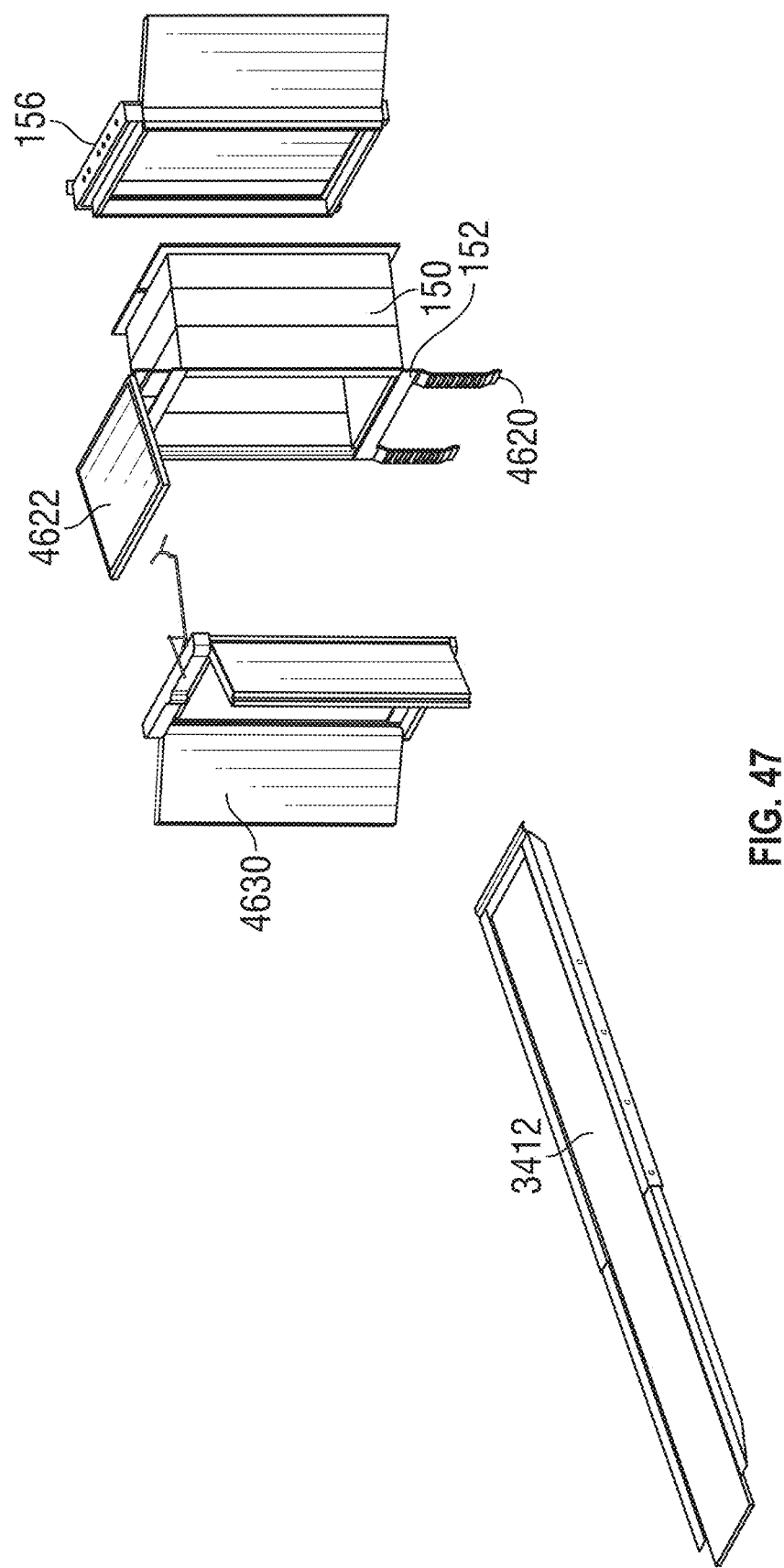
Figure 48:
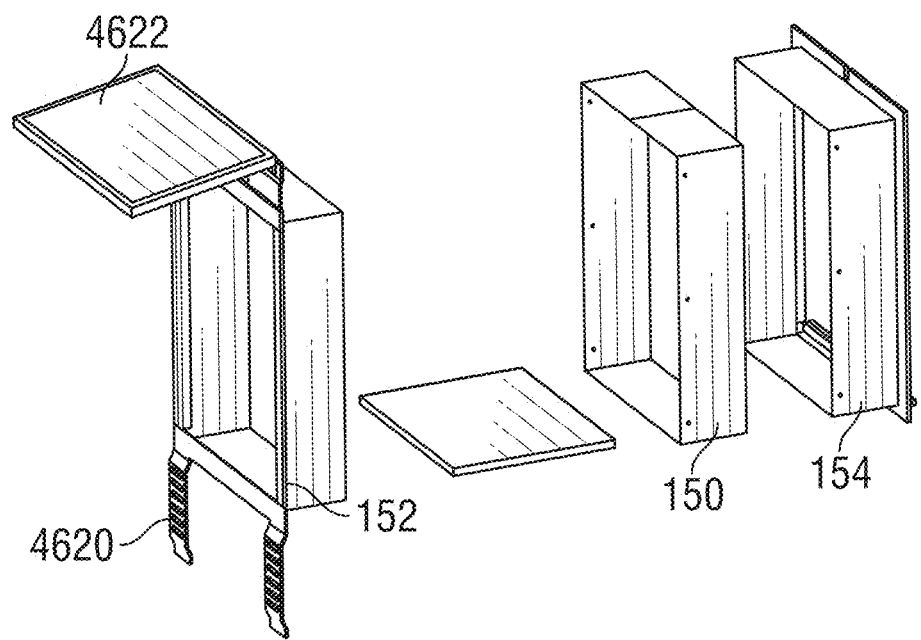
Figure 49:
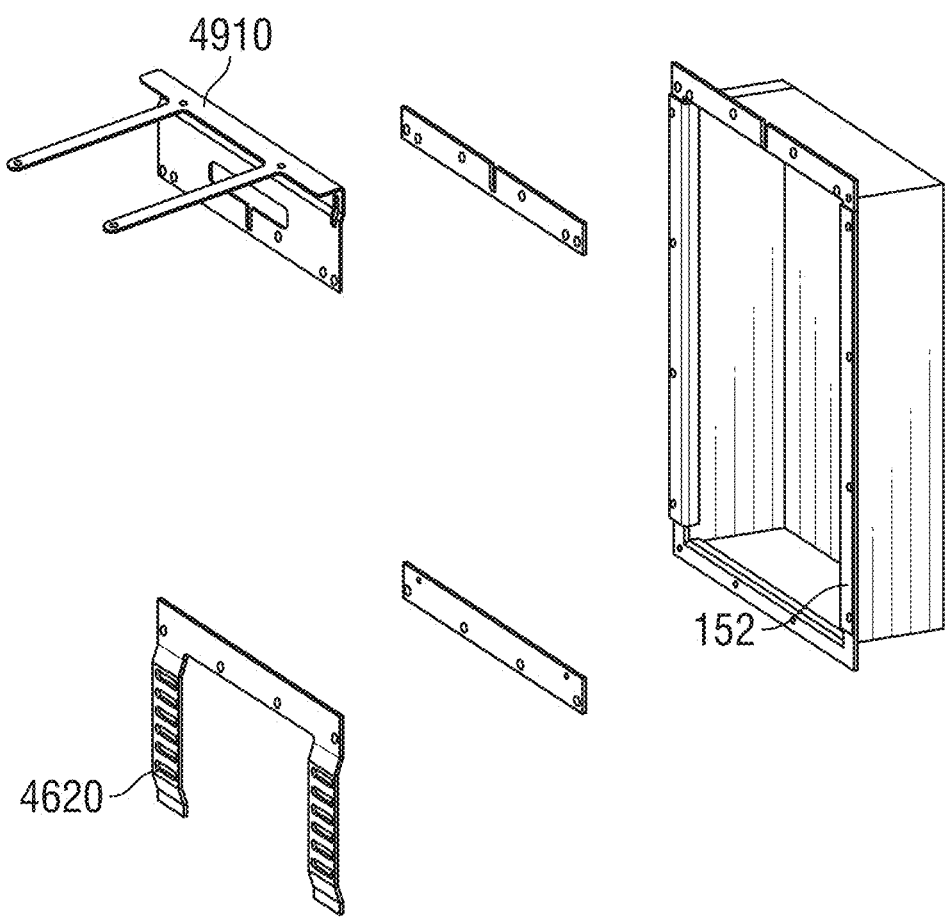
Figure 50:
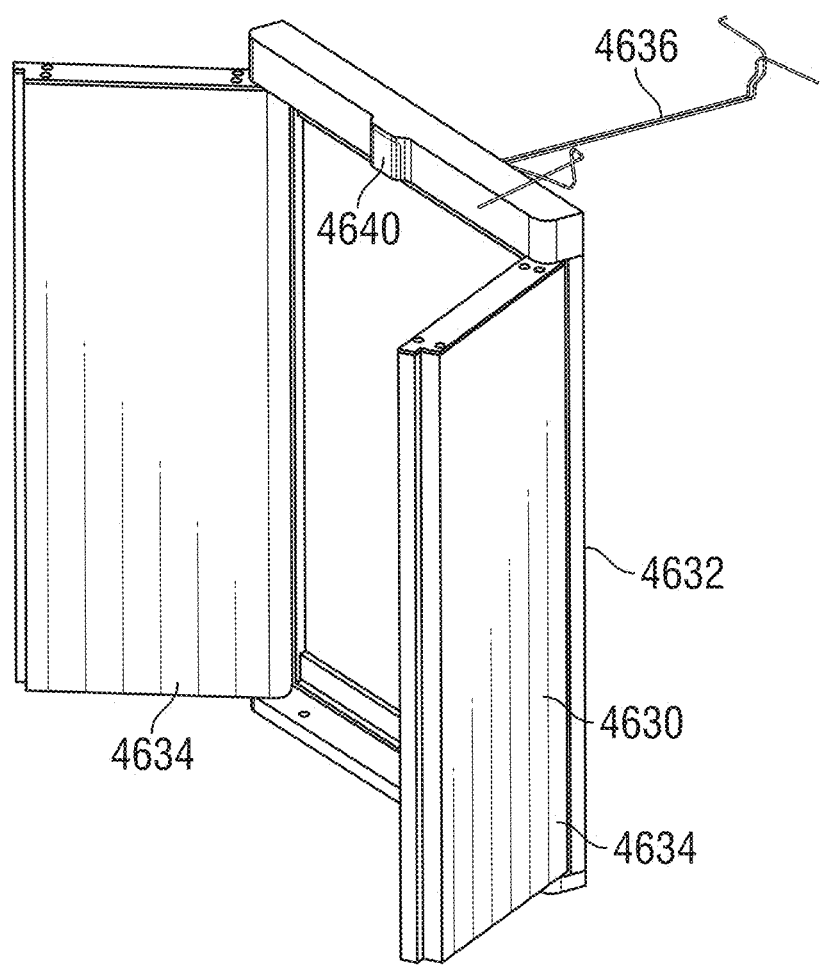
Figure 51:
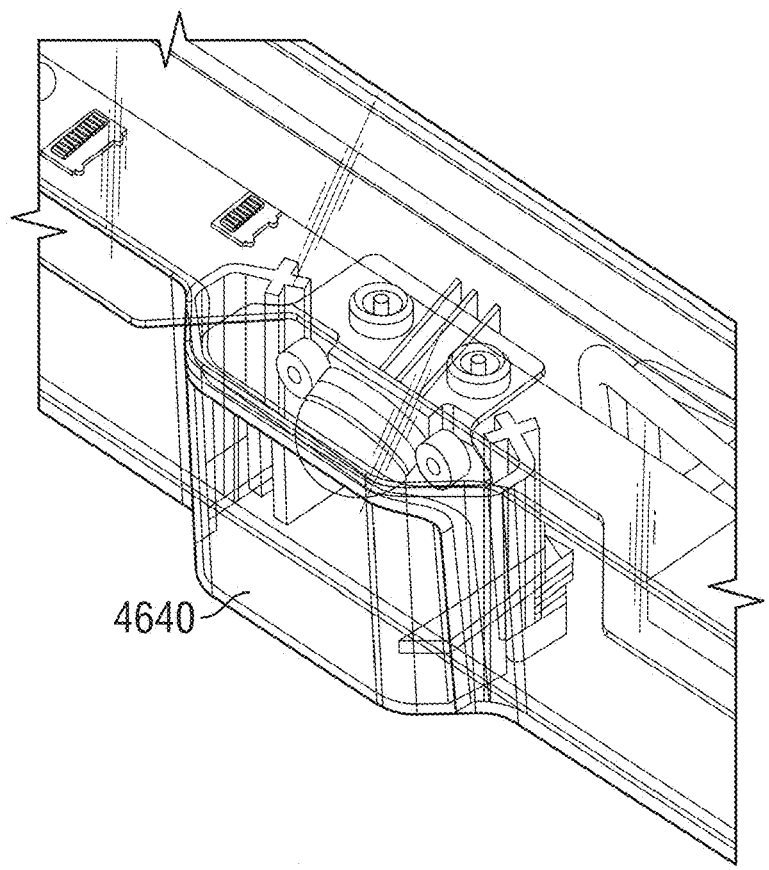
Figure 52:
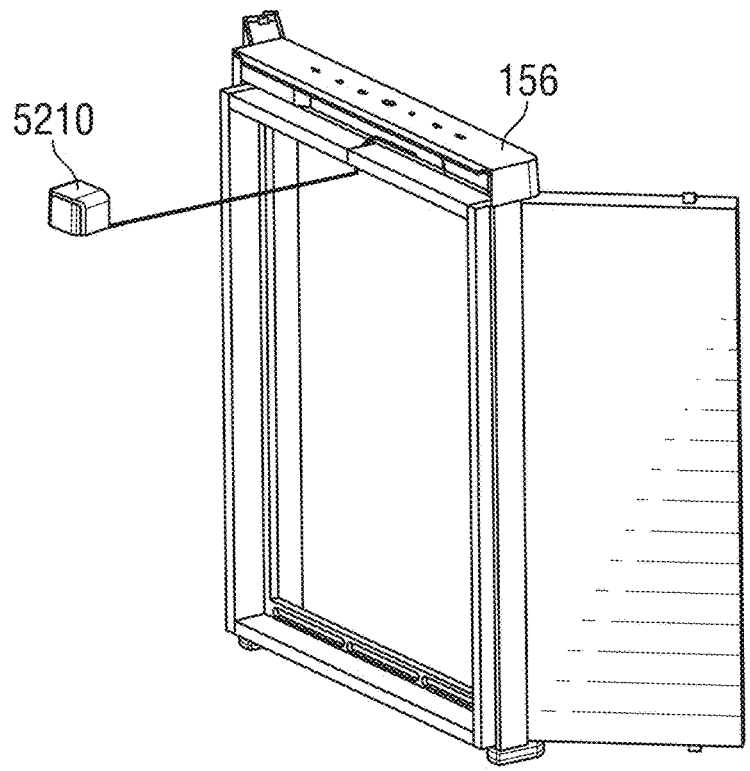
Figure 53:
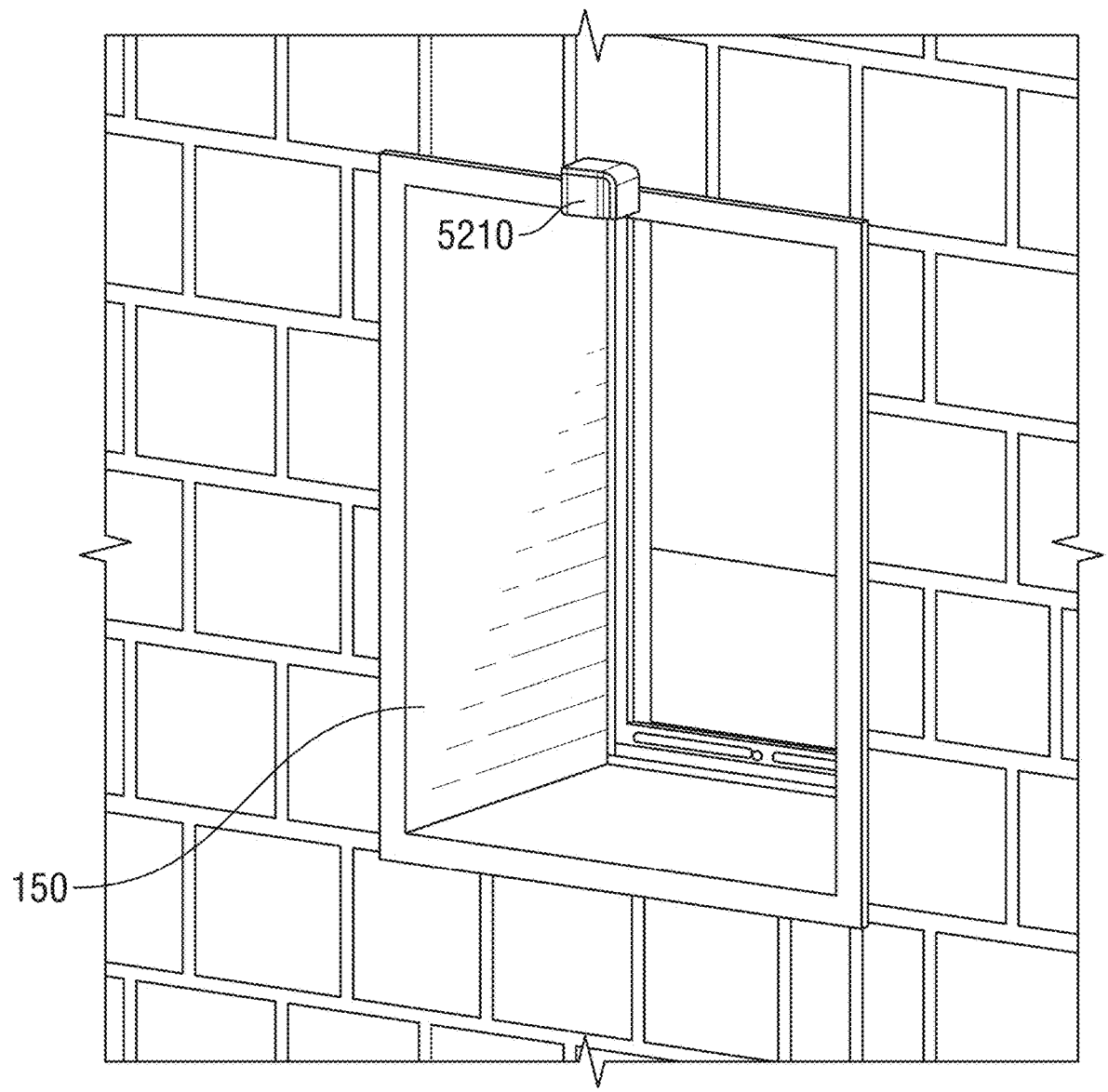
Figure 54:
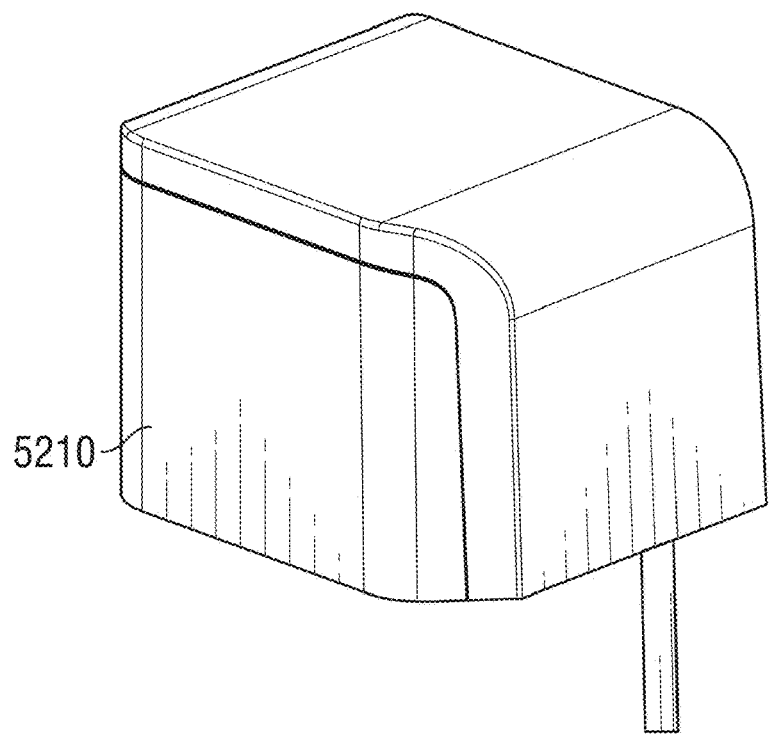
Figure 55:
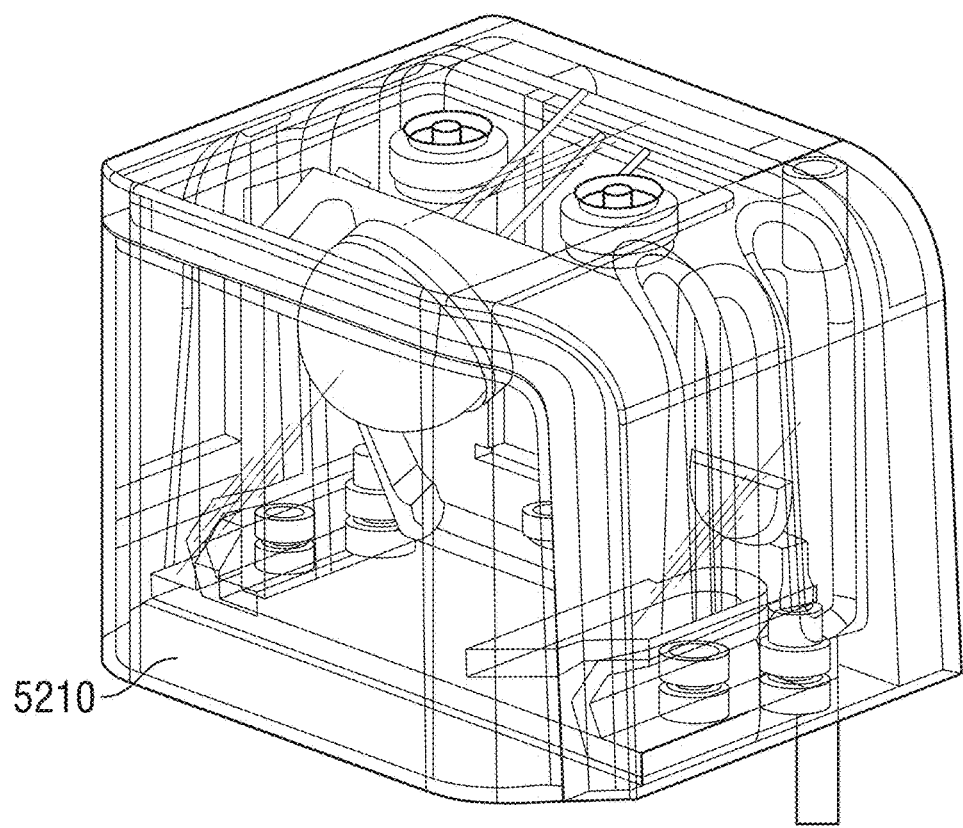

FIG. 1 representatively illustrates a conceptual side cross-section view of a pet access control system according to various aspects of the present technology;

FIG. 2 is an exploded side view of the pet access control system;

FIG. 3 illustrates a security panel holder;
FIG. 4 illustrates multiple hang structures;
FIG. 5 is a front view of a door unit with doors closed;
FIG. 6 is a front view of a door unit with doors open;
FIG. 7 is an exposed view of the back of a door unit;
FIG. 8 is a side view of a door unit with a hang structure;
FIG. 9 is a top view of a door unit with a hang structure;
FIG. 10 is a back view of a door unit;
FIGS. 11-13 illustrate a door unit sliding onto a security panel holder;
FIG. 14 illustrates a latch on top of a door;
FIG. 15 illustrates a detent of a door unit;
FIG. 16 illustrates a latch on top of a door;
FIG. 17 illustrates a latch on the bottom of a door;
FIG. 18 is a view of a control panel;
FIG. 19 illustrates a tag sensor communicating with a tag;
FIG. 20 is a conceptual diagram of a control system and various elements that communicate with and/or are controlled by the control system;
FIGS. 21A-F illustrate various aspects of a tunnel;
FIG. 22 is a flow chart for inviting a pet into a structure and through a pet door;
FIG. 23 is a flow chart for inviting a pet to leave a structure and through a pet door;
FIG. 24 illustrates an interior frame with a security panel holder with an outer slot;
FIG. 25 illustrates a security panel mounted on a security panel holder of FIG. 24;
FIGS. 26A-E are views of a door unit;
FIG. 27 is an exploded view of a door unit;
FIGS. 28A-C are views of a door unit, tunnel, and interior and exterior frames and details;
FIG. 29 is an exploded view of a door;
FIG. 30 is an exploded view of a door;
FIGS. 31A-B are cross-section views of a door with a clutch mechanism;
FIGS. 32A-H illustrate a tag;
FIG. 33 is an exploded view of a door with a sensor;
FIGS. 34A-B illustrate a ramp;
FIG. 35 is a perspective view of two rails;
FIG. 36 is a view of rails on a security panel holder;
FIG. 37 illustrates a mounting bracket engaging rails;
FIG. 38 shows a cross section of rails;
FIG. 39 illustrates a door unit mounted centrally over the passage;
FIG. 40 is a cross-sectional view of a hanger bracket;
FIGS. 41A-B show a door unit mounted offset from a passage;
FIG. 42 is a perspective view of an adapter;
FIG. 43 is a perspective view of a frame with pegs; and
FIG. 44 illustrates a sensor holder.
FIG. 45 is a cross-section view of a pet access control system with a motion sensor.
FIG. 46 is a perspective view of an exterior door unit with a ramp.
FIG. 47 is an exploded view of an exterior door unit with a ramp.
FIG. 48 is a view of a solar panel and a ramp mount and other elements.
FIG. 49 is a view of a solar panel mount and a ramp mount and other elements.
FIG. 50 is a perspective view of an exterior door unit with a sensor system.
FIG. 51 is a transparent view of a sensor system.
FIG. 52 is a perspective view of an auxiliary sensor system connected to an interior door unit.
FIG. 53 is a perspective view of an auxiliary sensor system mounted on a wall above a tunnel.
FIG. 54 is a perspective view of an auxiliary sensor system.
FIG. 55 is a transparent view of an auxiliary sensor system.

Elements and steps in the figures are illustrated for simplicity and clarity and have not necessarily been rendered according to any particular sequence. For example, steps that may be performed concurrently or in different order are illustrated in the figures to help to improve understanding of embodiments of the present technology.

DESCRIPTION OF EXEMPLARY EMBODIMENTS

The present technology may be described in terms of functional block components and various processing steps. Such blocks and steps may be realized by any number of hardware or software components configured to perform the specified functions and achieve the various results. For example, a system according to various aspects of the present technology may employ transmitters, receivers, doors, control elements, motors, and the like, which may carry out a variety of functions. In addition, the present technology may be practiced in conjunction with any number of access systems and animal control systems, and the systems described are merely example applications. Further, a system according to various aspects of the present technology may employ any number of conventional techniques for wireless communications, door control, and the like.

Methods and apparatus for controlling pet access according to various aspects of the present technology may operate in conjunction with a pet access control system, for example to control a pet door. The pet access control system may comprise or operate in conjunction with a tunnel through an opening in a structure. The system may include a door and a control system. The control system may control the movement of the door via a locking mechanism and/or actuator. The control system may receive signals, such as from electronically readable tags on pets, to open the door only for authorized pets, and/or may be remotely controlled, such as via a phone app or web interface.

The pet access control system may enhance security from intruders. In various embodiments, the pet access control system includes unique pet recognition to allow only authorized pets and to facilitate curfews or other schedules. Conventional pet doors allow intruders, such as insects, raccoons, coyotes, bobcats, neighbors' pets, and even burglars to enter. To block intruders, conventional pet doors utilize a security panel that must be manually installed.

The pet access control system may also provide environmental protection. Conventional pet doors are not effective barriers against the weather. Most pet doors have one or two flexible flaps that offer minimal protection against wind, heat, cold, and debris. Pet owners may spend considerable sums in additional heating and cooling costs due to inefficient pet doors.

The pet access control system may be configured in any appropriate size or set of sizes to accommodate varied sizes of pets. For example, one size may operate in conjunction with a tunnel opening that is 11 inches wide and 19 inches tall, and another size would cover openings that are 9 inches wide and 13 inches tall. In various embodiments, a single size may be used in conjunction with multiple sizes of openings. For example, a single size may be used for any passage opening that is smaller than the opening defined through the pet access control system.

Various aspects of the present pet access control system may also be adapted for other configurations. For example, the pet access control system may be configured as an interior pet gate for use inside a home or other structure. The pet access control system may be configured to prevent a pet from getting through a gate while allowing people through it. In addition, various aspects of the system could be implemented in an automatic baby gate that would prevent babies from getting through the gate but allow adults or others through the gate. In another embodiment, various aspects of the present technology may be implemented in conjunction with an indoor dog kennel, such as to remotely lock or unlock it.

In various embodiments, methods and apparatus for controlling pet access may operate in conjunction with a pet access control system. Referring to FIGS. 1 and 2, one embodiment of the pet access control system 100 may comprise a door unit 156 at one end of a passage 162 through a structure 160. The door unit 156 may be secured to the structure 160, such as via a security panel holder, a frame 152, 154, or a wall or door. In various embodiments, the door unit 156 operates in conjunction with other dedicated elements, such as a dedicated tunnel 150 and interior and exterior frames 152, 154, but may also function with legacy pet door systems, such as a pre-existing and unrelated passage 162 and a legacy security panel holder around the passage 162. In various embodiments, the door unit 156 is configured to connect to the pet door security panel holder to support the door unit 156 over the passage 162 entrance.

For example, the legacy pet door system's security panel holder may comprise a slotted security panel holder having a geometric shape, such as rectangular, to support a security panel. The security panel holder is a component that holds a security panel in place, and a security panel is a substantially rigid panel, such as a rectangle of substantially rigid material, which may be held in place by the security panel holder to block the passage 162. In various embodiments, referring to FIGS. 3 and 4, the security panel holder 310 is configured to engage the lower and at least one lateral edge of a security panel. For example, the security panel holder 310 may include a grooved mounting structure configured to engage the security panel, such as a grooved mounting structure extending away from the opening and forming a rectangle with an open top or side. The grooved mounting structure may comprise a wall protruding substantially perpendicularly from the vertical surface of the wall surrounding the opening with a groove that is open toward the interior of the mounting structure.

The legacy security panel holder 310 may be substantially rectangular to receive a substantially rectangular security panel. The security panel may be secured to the security panel holder 310 by sliding the security panel into the groove through the open top or side of the mounting structure until it rests on the bottom or opposite side of the groove along the bottom or opposite side of the rectangle.

The door unit 156 provides pet access through the passage 162 and may be mounted on the legacy security panel holder 310. Referring to FIGS. 5 and 6, the door unit 156 may comprise one or more doors 158 to be disposed at one end of the passage 162. The door unit 156 may be mounted directly or indirectly on the structure 160 to provide access to the passage 162. The door unit 156 may be mounted in any suitable manner using secure and/or removable mounting systems. For example, the door unit 156 may be adapted to connect to the security panel holder, such as via a security panel interface engaging the security panel holder.

In various embodiments, the door unit 156 slides over legacy security panel holders to obscure the tunnel, flap, and other elements and effects of the legacy pet door. In addition, the door unit 156 may be secured to the security panel holder or other structure without sliding into the security panel holder.

In one embodiment, the door unit 156 may include a security panel interface configured to mate with the security panel holder, for example by hanging the frame on the security panel holder or otherwise connecting the frame to the security panel holder. The selected security panel interface may be secured to the door unit 156, such as by integrating the security panel interface into the frame 708 or otherwise connecting the security panel interface to the frame 708. In the present embodiment, referring to FIGS. 4 and 8-13, the security panel interface may comprise a hang structure 810 extending from the door unit 156, such as from the back of a frame 708, which has a primary hole to be aligned with the passage 162 through which the pet may pass. The hang structure 810 may substantially match the geometric shape of the slotted security panel holder. The hang structure 810 is attached to the frame 708 and allows the frame 708 to be hung on the security panel holder. The hang structure 810 includes a lip extending outwardly from the protruding edge of the hang structure 810, forming a groove in the exterior of the hang structure 810 to engage the slotted security panel holder 310 by sliding into the groove of the security panel holder 310 (FIGS. 11-13). The hang structure may comprise any suitable material, such as extruded aluminum, which slides into the existing pet door security panel grooves.

The security panel interface may comprise a nondedicated structure, for example the hang structure 810 may be adapted to hang on multiple legacy security panel holders of different origins. Thus, the nondedicated security panel interface is not adapted for a particular security panel holder, but is instead capable of hanging on multiple legacy security panel holders of different origins. In one embodiment, a nondedicated hang structure 810 may comprise a modular system comprising multiple different interchangeable hang structures 810A-D configured to match varied sizes and types of security panel holders 310. Each hang structure 810A-D may be configured to be removably mounted on the frame 708, such as on the back of the door unit 156. The user may select the appropriate hang structure 810 that matches the particular legacy security panel holder 310 and mount the selected hang structure on the back of the door unit 156.

In another embodiment, the security panel interface comprises an adjustable mounting system that may be adjusted to fit a legacy security panel holder 310. Thus, instead of a modular system where the user selects an appropriate mounting system to fit the legacy security panel holder 310, the user adjusts the mounting system to fit the legacy security panel holder 310. The adjustable mounting system may comprise any suitable adjustable system for fitting the mounting system to the legacy security panel holder 310. For example, the mounting system may comprise one or more adapters that may engage any legacy security panel holder 310 and support the door unit 156.

The adapter may engage the security panel holder 310 and connect to the door unit 156, such as by connecting to the frame 708. The adapter may comprise any suitable mounting system for connecting the door unit 156 to the security panel holder 310, such as brackets, connectors, and sliding elements. In various embodiments, the adapter comprises a connector that mounts on the security panel holder 310 and connects to the frame 708. For example, in one embodiment, the adapter may include rails that may be moved to fit the width of the legacy security panel holder 310. Referring to FIGS. 35-39, the rails 3510 may be fastened to the vertical sides of the security panel holder 310. The rails 3510 may be fastened with any appropriate fastener, such as via friction fit, set screws, adhesive, hanging, or clips. In the present embodiment, each rail 3510 includes one or more set screws 3512 and a groove 3514. The rails 3510 are positioned with an interior edge of the security panel holder 310 within the groove 3514. The set screws 3512 are then driven against the exterior of the security panel holder 310.

The mounting system may further comprise a mounting bracket to couple the other elements of the door unit 156 to the security panel holder 310 and/or the rails 3510. In various embodiments, the mounting bracket may be attached to the frame 708 and/or integrated into the frame 708. The mounting bracket may comprise any appropriate elements for connecting to the security panel and/or the rails 3510, such as hangers, mounting screws, bolts, clips, adhesives, or other appropriate connectors. In the present embodiment, the mounting bracket 3610 may be attached to or form a part of the frame 708 and includes a set of supports, such as pins, screws, rods, or mounting bolts 3614 to support the mounting bracket 3610 on the rails 3510. To install, the doors 158 may be opened to expose the mounting bracket 3610. The mounting bolts 3614 may then be driven through the holes in the mounting bracket 3610 into corresponding holes on the rails 3510. To secure the door unit 156 in position, the mounting bolts 3614 may be tightened against the mounting bracket 3610 and the rails 3510.

In the present embodiment, a connection point for the support (e.g., the mounting bolt 3614) is proximate to the bottom of the rail and a bottom end of the groove 3514. By substantially co-locating the bottom of the groove and the connection point, the bottom of the primary hole in the frame 708 is substantially aligned with the bottom of the passage 162.

The mounting system may be configured to be installed in different positions, for example relative to the passage 162. In one embodiment, the holes in the mounting bracket 3610 comprise slots 3612, such as horizontal slots, which may allow the door unit 156 to be installed in different positions relative to the passage 162. For example, referring to FIGS. 39 and 41A-B, the door unit 156 may be installed in a centered position relative to the passage 162, or may be installed offset to the left or right, such as to accommodate nearby walls, doors, windows, furniture, or other obstacles. In other embodiments, the mounting system may facilitate other positions, such as using vertical slots formed in the rails and/or mounting bracket 3610 to allow different vertical positions.

The mounting system may hang from the security panel holder, for example to maintain the position of the frame 708 temporarily (such as during installation) or longer. Referring to FIG. 40, in various embodiments, the mounting system includes a hanger bracket protruding from the back of the frame 708, such as an L-shaped bracket 4010, that receives the top of one or more of the adapters, such as a top surface of the rails 3510. The hanger bracket may allow the installer to hang the door unit 156 temporarily on the adapters while the mounting bolts 3614 are secured.

In various embodiments, the mounting system comprises a rigid structure attached to the back of the frame 708 or forming the back of the frame 708. The mounting system may comprise any suitable material for supporting the door unit 156 and connecting to the rails, such as steel.

In other embodiments, the adapter may comprise one or more rails slidably mounted on the frame 708 and including grooved protrusions to engage security panel holders of different widths. For example, referring to FIGS. 42-43, the rails may comprise substantially flat and rigid sliders 4210 with slots 4212. The sliders 4210 may also include grooved protrusions 4214 defining grooves to engage security panel holders. The sliders 4210 may be attached to the frame 708 via pegs 4310, screws, or the like disposed through the slots 4212 such that the sliders may be moved laterally into position to engage a particular security panel holder. The rails may then be fixed in position, such as by tightening screws, bolts, or nuts.

The door unit 156 may operate in conjunction with legacy pet door systems, and the door unit 156 may also be configured to operate with dedicated elements. For example, referring again to FIGS. 1 and 2, the pet access control system 100 may include a tunnel 150, an exterior frame 152, and an interior frame 154 as dedicated interoperable elements. The tunnel 150 defines a passage 162 for the pet through the hole in the structure 160, such as through a wall or door. The passage 162 may comprise a legacy passage or a new opening through the structure 160. The tunnel 150 separates the interior of the passage 162 from the rough interior surfaces of the structure 160, such as drywall, insulation, and wall studs, and provides a finished interior surface defining the passage 162. The tunnel 150 may also engage one or both frames 152, 154. The tunnel 150 may comprise a substantially rigid and smooth material, such as metal, plastic, or wood.

In one embodiment, the tunnel 150 comprises a collapsible reinforced aluminum tunnel 150 that requires no cutting to install. For example, referring to FIGS. 21A-F, the tunnel 150 may comprise two main sections 2110, 2112 that may be joined. In various embodiments, one main section 2110 slides into the opening from the interior, and the second main section 2112 slides into the opening from the exterior. One main section may slide into the other in a telescoping manner so that the length of the tunnel may be adjusted according to the wall thickness (FIG. 21C). The two sections 2110, 2112 may then be joined together in position, such as using one or more fasteners 2114, to form a single continuous tunnel 150.

In addition, the tunnel 150 may comprise subsections to be assembled on site. In one embodiment, each tunnel section comprises multiple wall sections 2120, such as eight sections, which snap into a receiving portion of the interior frame 154 and exterior frame 152, respectively (FIGS. 21E-F). Thus, the tunnel 150 may break down into individual pieces and a relatively flat package for shipping, assembly, and storage (FIG. 21B). The tunnel 150 may, however, comprise any appropriate elements and materials for defining the passage 162.

The exterior frame 152 defines a perimeter around the exterior end of the passage 162. In various embodiments, the exterior frame 152 comprises a rigid weather resistant material, such as metal, plastic, or wood. In one embodiment, the external frame comprises a composite material that is resistant to outdoor elements, such as humidity, water, heat, cold, and ultraviolet exposure, such as steel reinforced aluminum. The exterior frame 152 may attach to the tunnel 150 and may obscure the end of the tunnel 150 and the surrounding edges of the hole in the structure 160. The exterior frame 152 may also provide structures for mounting other elements of the system 100, such as a solar panel, a ramp, or a shade/shelter.

The interior frame 154 defines a perimeter around the interior end of the passage 162. In various embodiments, the interior frame 154 comprises a substantially rigid material, such as metal, plastic, or wood. The interior frame 154 may attach to the tunnel 150 and may obscure the end of the tunnel 150 and the surrounding edges of the hole in the structure 160. In various embodiments, the interior frame 154, the exterior frame 152, and/or the tunnel 150 comprise extruded aluminum, which may facilitate assorted sizes by cutting various lengths of the frame and tunnel pieces. The interior frame 154 may also provide structures for mounting other elements of the system 100, such as a solar panel or a ramp.

The pet access control system 100 may also include one or more security panels to selectively block the passage 162 with a physical barrier, such as in addition to or instead of the door unit 156. The security panel provides a barrier that can securely disable the passage 162, such as when the owner is departing for an extended time and/or removing the door unit 156 from the interior frame 154. The security panel may comprise any appropriate barrier for blocking the passage 162. For example, the security panel 164 may comprise a rigid and sturdy panel that may be secured across the passage 162 to form a barrier. In one embodiment, the security panel 164 comprises a rectangular panel of metal, wood, or plastic that engages the interior frame 154 and/or the exterior frame 152 to block access through the tunnel 150.

The exterior frame 152 and/or the interior frame 154 may be configured to engage the security panel 164. In various embodiments, the frame 152, 154 may include a mounting structure, such as a structure like the security panel holder 310, configured to engage the lower and lateral perimeter of the security panel and/or a corresponding mounting structure on the back of the door unit 156. In the present embodiment, referring to FIGS. 24 and 25, at least one of the frames 152, 154 includes a grooved security panel holder 2510, such as grooves on the lateral edges of the frame. The groove is open to the exterior edge of the frame. The security panel 164 may be secured to the frame 152, 154 by sliding the security panel 164 into the lateral grooves through the open top of the groove. The security panel 164 may include a lock, such as a keyed lock 2512 or a manual pin lock, to secure the security panel 164 in place and inhibit removal.

In various embodiments, the pet access control system 100 includes an exterior security panel near the exterior end of the tunnel 150, such as an exterior security panel that slides onto the exterior frame 152 on the outside of the home or other structure. The exterior security panel may cover most or all the exterior frame 152. In some embodiments, the exterior security panel may be locked from inside the tunnel 150, and may be locked without a need for a key. Other embodiments may use a key-operated lock. The exterior security panel may secure the home or structure for relatively long periods, such as by securing the tunnel 150 to deter intruders and inhibit rain, snow, leaves, and/or other debris from entering the tunnel 150.

In various embodiments, the pet access control system 100 includes an exterior door unit that covers the exterior opening of the tunnel 150 and selectively opens and closes to allow the pet to enter and exit the tunnel 150. The exterior door unit may operate in unison with the interior door unit 156 such that each door unit opens and closes at about the same time. The exterior door unit may comprise many of the same elements as the interior door unit, such as one or more doors, motors, security panel interfaces, mounting systems, and sensors.

For example, referring to FIGS. 46, 47, 50, and 51, an exterior door unit 4630 may comprise an exterior door unit frame 4632 upon which two doors 4634 are mounted. The doors may be motorized, and the motors may respond to signals from the control system 112 (FIGS. 7 and 10), such as via one or more wires 4636. The exterior door unit 4630 may also receive power from the interior door unit 156, or the exterior door unit 4630 may receive power independent of the interior door unit 156. The exterior door unit 4630 may be mounted in any appropriate manner, such as via an external security panel holder and security panel interface on the exterior door unit frame 4632, connectors to the external frame 152, or directly on the structure. In various embodiments, the exterior door unit 4630 may be mounted in the same manner as an interior door unit 156.

Referring again to FIG. 1, the pet access control system 100 may include one or more flaps 166, for example to provide a barrier to the elements without inhibiting passage of the pet. The flap 166 may comprise any appropriate system for limiting airflow, dust, dampness, and the like through the passage 162 while still permitting the pet to pass through. In various embodiments, the flap 166 may comprise a tear-resistant flexible material hanging from the top of one or both of the frames 152, 154, and/or the tunnel 150 or a rigid, lightweight material hanging via a hinge.

The flap 166 may include features to enhance its functionality. For example, the flap 166 may engage weatherstripping, such as a low-profile fuzzy weatherstripping, attached to the edges of the frame to inhibit airflow around the flap. The flap 166 may also comprise an opaque or translucent material to reduce visibility of smudges and dirt. In the present embodiment, the flap 166 comprises translucent or opaque vinyl with metal strikes molded into the vinyl to reduce noise as the flap 166 closes. The bottom of the flap 166 may include a metal strike to enhance the seal, such as a metal strike along the entire bottom edge of the flap 166.

The door unit 156 provides access through the passage 162. Referring to FIGS. 5-7 and 10, the door unit 156 may comprise one or more doors 158 disposed over the primary hole in the door unit 156 and mounted on the frame 708. The doors 158 may respond to electronic signals. In various embodiments, the doors 158 are operated by one or more motors 710, and the motors 710 are controlled by the control system 112. The control system 112 responds to commands received from a user, such as via a manual control panel, a wireless signal (such as a wireless router signal, an RF signal, an RFID signal, and/or an NFC signal), an app running on a mobile device, and/or an Internet web-based user interface. The operation of the motor 710 via a control system 112 provides a variety of conditions and parameters for opening and closing the doors 158. For example, the door unit 156 may be configured to open the doors 158 upon the approach of an authorized pet and/or to allow an owner to remotely open, close, or lock the doors 158.

The door unit 156 may provide a barrier against weather in addition to the flap(s). To enhance the barrier, the door unit 156 may include weatherstripping around the door. For example, referring to FIGS. 28A-C, the door unit 156 may include a resilient rubber-like sealing bumper 2810 surrounding the tunnel entrance and abutting the door when closed, to keep out wind, heat, and cold. The door unit 156 may also include a second resilient rubber-like sealing bumper 2812 where the doors 158 overlap to provide an additional seal. The door 158 may allow the pet access control system 100 to work with existing legacy flaps and other elements that had previously been installed, such as by swinging away from the legacy systems or sliding open and closed.

The door unit 156 may include the frame 708 supporting a housing 1010 and various other elements of the door unit 156. The door unit frame 708 may comprise a sturdy material, such as extruded aluminum. Various parts of the door unit frame 708 may comprise stronger material, such as steel where the door unit frame 708 supports the locking mechanism. The frame 708 defines the primary hole through which a pet may pass.

The housing 1010 may contain various elements of the door unit 156, such as to obscure them from sight. For example, referring to FIGS. 5-7, 10, 26A-E, and 27, the housing 1010 may contain a power supply for the door unit 156. The power supply may comprise any suitable system for providing power to the various elements of the door unit 156, such as a converter to be connected to a conventional power outlet, a battery, and/or an alternative power source like a solar charger. In various embodiments, the housing 1010 may support a power inlet that connects to an AC adapter for a wall outlet. A battery back-up may also be included to allow functionality if power fails or as a main power source. In some embodiments, the housing 1010 includes two AC power ports at the bottom of the door unit 156, one on each side of the door unit 156. The power supply may also include a rechargeable battery and/or a connection to a photovoltaic source. The rechargeable battery may be recharged from any suitable source, such as via the AC adapter and/or the photovoltaic source.

The door unit 156 may be mounted directly or indirectly on one of the frames 152, 154 as well as on a legacy security panel holder, and may be removably or permanently installed. In various embodiments, the door unit 156 slides over a corresponding support mounted on the wall (FIGS. 11-13), such as on the interior frame 154 or a legacy security panel holder 310 from a previously installed pet door. The door unit 156 may also be fixed to the security panel 310 or one of the frames 152, 154.

In one embodiment, referring to FIGS. 8-13, the door unit 156 is configured to mount on the interior frame 154 via the groove of a mounting structure that can also receive a security panel 164. The mounting system may not only permit the door unit 156 to engage the frame 152, 154, but may also permit the door unit 156 to engage other conventional pet door systems that use such a groove to accommodate security panels.

The door unit 156 may be configured to connect to any legacy element, such as the security panel holders provided by unrelated pet door systems. By interfacing with existing security panel holders, the door unit 156 facilitates easy and fast installation and removal without tools. The door unit 156 also covers unsightly existing dog doors and flaps but does not interfere with the operation of the existing pet door. Easy removal also allows an owner to take the door unit 156 to a new or second home.

The door 158 comprises one or more doors for selectively facilitating access to a structure 160, such as a swinging rigid pet door, a rolling door, or a one- or two-way door. In the present embodiment, referring again to FIGS. 5-7 and 10, the door 158 is disposed over the primary hole and mounted on the frame 708 and comprises double doors with two side-by-side panels. The doors 158 are pivotably mounted, such as by hinges 712. The hinges 712 allow the doors 158 to swing between open and closed positions, for example in response to force applied by the motors 710. In the present embodiment, the door 158 opens only away from the security panel holder 310. By swinging away from the security panel holder 310 around the opening, the doors 158 do not interfere with the flap(s) 166 and other components nearer the interior of the pet access control system 100, which further facilitates mounting the door unit 156 on legacy pet door elements. The doors 158, however, may comprise any suitable door(s) for facilitating access to the structure 160, such as doors that slide laterally or vertically or swing via a top-connected hinge.

In various embodiments, the door 158 provides privacy. For example, unlike transparent flaps, the door 158 may be opaque to inhibit observation through the passage. The door 158 also cannot be easily moved aside to see through the passage.

In various embodiments, the door 158 may include additional elements. For example, referring to FIG. 29, batteries 2910 in a sleeve 2912 may form a battery pack which is housed in one or both doors to supply power to the pet access control system 100. Placing the batteries in the door instead of the housing on the frame 708 reduces the space required for the housing and may reduce the overall size of the door unit 156.

The door 158 may also provide better protection from the environment by forming a relatively tight seal to inhibit the transfer of heat, cold, or air. In various embodiments, the door 158 may cooperate with weatherstripping to limit airflow around the door 158. When installed on an existing legacy door system or on a new dedicated tunnel 150 and/or frames 152, 154 like those described herein, the door 158 may provide a second or third barrier against the weather in addition to the flap(s) 166. In contrast, many conventional pet doors are not effective barriers against the weather. Conventional pet doors have one or two flexible flaps that offer minimal protection against wind, heat, and cold.

The motor 710 drives movement of the door 158 such that the motor may move the door 158 between the open and closed positions. The motor 710 may be responsive to signals from the control system 112 to control the operation of the door 158. Any appropriate system may actuate movement of the door 158, such as one or more electric motors, springs, magnets, or weights, and may interact with the door 158 in any suitable manner. In the present embodiment, referring to FIGS. 7 and 29, the motor 710 comprises two electric motors mounted on the frame 708, one of which is connected to each of the door hinges 712, to simultaneously open and close each door 158. Alternatively, the motor 710 may be disposed in the door 158, which may reduce the space required for the housing and may reduce the overall size of the door unit 156.

The housing 1010 may include one or more sensors to detect the position of the door 158, such as to determine when the door 158 panels are fully closed, fully open, or in between, and signal the control system 112 accordingly, such as to stop the motor 710. The sensors may comprise any suitable sensors for determining the position of the door. For example, various embodiments operate in conjunction with a magnetic position sensor mounted on the door 158, such as on the hinge 712. In one embodiment, the sensors comprise contactless Hall-based magnetic position sensors that provide angular measurement over the full range of motion for the door 158. The sensor may include a diametrical two-pole magnet rotating on the door 158 and an integrated circuit mounted on the frame 708. The integrated circuit may respond to detected rotation of the magnet by generating a corresponding signal, such as a pulse width modulated signal. The sensors may indicate when the door 158 is fully closed or fully open, and may also detect an obstruction inhibiting the door 158 from opening or closing.

The motor 710 may also include safety mechanisms, such as to prevent the doors 158 from closing on a pet, person, limb, or other object. For example, the motor 710 may detect increased voltage indicating resistance to closing and respond by halting and instructing the control system 112 to sound an alarm. Alternatively, the motors 710 may be selected to provide limited force, such that the motors cannot harm an animal by closing the doors on an animal's neck or leg. In various embodiments, a clutch system, such as a pulley-clutch safety mechanism, may be coupled to the motor 710 and responsive to a resistance to movement of the door, in which case the clutch system may at least partially disengage the motor 710 from the door 258 in response to resistance. For example, the clutch system may permit the drive force of the motor 710 to slip if something obstructs movement of the door 158. Referring to FIGS. 29 and 31A-B, an example clutch system 2914 may comprise a frictional clutch 2916 driven by a spring 2918. If a pet has not fully cleared the door 158, the clutch system 2914 permits the connection between the door 158 and the motor 710 to slip to avoid applying excessive force to the door 158 and potentially harming the pet and/or the door 158. In the present embodiment, the upper part of the clutch mechanism is biased by the spring against the lower part of the clutch mechanism. When the door 158 hits an obstruction, the spring force is overcome and the clutch 2916 slips. In addition, should a pet decide to push through the door 158 panels once they are unlocked when coming into the home, the clutch system may open the door with significant resistance to prevent the motors 710 and/or doors 158 from being damaged.

A locking mechanism 210 may affect movement of the door 158 and may be controlled by the control system 112. In some embodiments, the locking mechanism 210 may be controlled manually. The locking mechanism 210 controls whether the door 158 may move. The locking mechanism 210 may comprise any suitable system for selectively inhibiting movement of the door 158. For example, the hinge 212 and/or door 158 may have a locked state and an unlocked state, such that the door 158 moves or may be moved in the unlocked state, and the door 158 is substantially immobilized in the locked state. The transition between the locked state and the unlocked state may occur in response to a signal, such as an electrical signal, mechanical force, or other signal.

For example, in various embodiments, the hinge 712 includes or responds to an actuator responsive to the control system 112, such as the motor 710, to facilitate locking the hinge 712 in position to prevent rotation and inhibit movement of the door 158. The actuator may also respond to the control system 112 to unlock the hinge 712 to permit the door 158 to swing. Alternatively, the locking mechanism 210 may be separate from the hinge 212, such as a bar, clamp, bolt, or other mechanism that may selectively inhibit movement of the door 158. In another embodiment, the locking mechanism 210 may be incorporated into another system, such as the motor 710.

In the present embodiment, the locking mechanism 210 includes a latch and detent system for holding the door 158 in place. Referring to FIGS. 14-17 and 29-30, each door 158 may include an extendable latch 1410 in the top and/or bottom surface of the door 158, and the door unit 156 may include detents 1510 formed in or attached to the housing 1010 above and below the door 158. The latch 1410 catches in the detent 1510 to hold the door 158 in place. The latch 1410 or detent 1510 may extend and retract in response to signals from the control system 112, mechanical linkage to the motor 710, springs, or any other suitable system for extending and retracting the latch 1410 or detent 1510.

In the present embodiment, the latches 1410 are electronically retractable in response to signals from the control system 112 and biased to extend by springs. Thus, to open the door 158, the latches 1410 are momentarily retracted to allow the door 158 to clear the detents 1510. To close the door 158, the latches 1410 are extended by the springs, pushed down by the leading edges of the detents 1510 as the door 158 closes, and extended again by the springs within the detent 1510 when the latches 1410 pass the most prominent part of the detent 1510.

The locking mechanism 210 secures the closed doors 158 so that the doors 158 open only for authorized pets and block human intruders and unwanted animals like raccoons, coyotes, bobcats, and unauthorized pets. The door unit 156 may generate an audible alarm if the doors 158 are forced open to alert the owner and deter potential intruders. In some embodiments, the door unit 156 also sends an alert to the owner's phone if the doors 158 are forced open. For example, the door unit 156 may include sensors to recognize when the doors 158 are fully closed. If the doors 158 are forced open, the sensor signals the opening, and the control system 112 may activate the audible alarm and alert the owner's phone.

The control system 112 controls the locking mechanism 210 to control whether the locking mechanism 210 is in the locked or unlocked state. The control system 112 may also operate the door 158 using the motor 710. The control system 112 may comprise any appropriate system for controlling the locking mechanism 210 and/or the door 158. For example, the control system 112 may comprise a conventional processor, logic circuit, analog circuit, or other control system connected to the locking mechanism 210 and/or the door 158. In the present embodiment, the control system 112 includes a microprocessor connected to the locking mechanism 210 and the motor 710 to provide control signals to the locking mechanism 210 and to the door 158, such as via the motor 710. The control system 112 may also be connected to or include a wireless transceiver 114 and a manual control panel to receive instructions.

The control system 112 may also be self-contained and operate without instructions from a wireless transceiver 114 or other source, for example in conjunction with a program or a sensor, such as a light, weather, motion, or temperature sensor. The program may operate the locking mechanism 210 and/or the door 158 in any suitable manner, such as a time-based program to lock and unlock the locking mechanism 210 at selected times. For example, an owner may set a curfew such that the door unit 156 only permits authorized pets to enter, but not exit, a home between certain hours. The control system 112 may also prohibit entering the home between certain hours unless certain weather conditions occur, such as rain, lightning, or excessive cold or heat.

In various embodiments, the control system 112 may operate in conjunction with a camera, for example to allow owners to check on pets remotely, such as via a web browser or phone app. The control system 112 may also operate with smart technologies, such as Amazon's Alexa systems or Google's Home Pod and other voice recognition and web services, Nest, and Apple's Siri, to receive and/or implement commands.

In various embodiments, the control system 112 allows owners to access the door unit 156 via Bluetooth, over the Internet via Wi-Fi, and/or through an app on a smartphone. Features may include remote lock and unlock, setting schedules, setting door control modes such as only-in and only-out, receiving alerts such as when the door is used or if an intruder forces the door open, adjusting door sensor sensitivity and door open timing and speed, and pet location (e.g., inside or outside).

The control panel provides a manual user interface that is on or near the door unit 156 and facilitates various door unit 156 functions. The control panel may comprise any appropriate user interface for controlling door unit 156 functions, such as a touch panel, buttons, touch screen, keypad, switches, and the like. In the present embodiment, referring to FIG. 18, an example control panel 1810 comprises a touch panel with a series of buttons corresponding to various functions. The functions available on the control panel 1810 may be selected according to any suitable criteria for operating the door unit 156. In the present embodiment, the control panel 1810 functions include power on/off, open/close the door 158, lock/unlock the door 158, Bluetooth connection (status and/or pairing), Wi-Fi connection (status and/or connection initiation), and power condition, such as the charge state of the battery or other power source. Thus, a user may open and close the door 158; lock and unlock the door 158; activate, deactivate, and power cycle the door unit 156; check the status of wireless connections; initiate and terminate connection to wireless devices; and determine the power supply status.

The control system 112 may automatically operate the door 158 in conjunction with an access authorization system that determines whether a particular pet is authorized to pass through the pet access control system 100. The access authorization system may identify authorized pets in any appropriate manner, such as facial recognition or electronic identification. In the present embodiment, the access authorization system may respond to a signal from an authorized tag associated with a pet. Referring to FIG. 19, a tag 1910 may provide electronically readable credentials to pass through the door 158, and a tag sensor 1912 may read the tag 1910 to determine whether the tag 1910 has the appropriate authorization.

The tag 1910 may comprise any suitable mechanism for electronically providing credentials, such as an RFID, NFC, Bluetooth Classic, Bluetooth Low Energy (BLE), RF, facial recognition, magnetic, acoustic, or optical system. In the present embodiment, referring to FIGS. 32A-H, the tag 1910 comprises a BLE transmitter (and in various embodiments, a BLE receiver) that can be associated with the pet, such as by being attached to the pet's collar. In various embodiments, the tag 1910 may be recharged, such as using wired or wireless charger technology, and may be fully sealed and waterproof. In some embodiments, the tag 1910 may include a GPS locator component to track and transmit the GPS coordinates of the tag 1910.

The tag 1910 may include any suitable elements for communicating with the tag sensor 1912 and other functions. For example, a tag 1910 according to various aspects of the present embodiment may comprise a button, such as a waterproof membrane button 3210, to initiate various functions, such as to pair a tag to a door unit 156. The button may also include a light 3214, for example to convey information about the tag 1910 status and to locate a pet in the dark. Various embodiments may include an accelerometer, such as to detect movement of the dog or other pet.

In one embodiment, the tag 1910 does not include the button, and various functions of the tag 1910 may be activated and deactivated in response to the accelerometer. For example, the tag 1910 may terminate transmissions, like authorization codes and/or GPS positions, if the accelerometer indicates that the pet is not moving and has not moved for a selected period of time, such as 30 seconds. When the accelerometer indicates movement, the tag 1910 may resume transmissions. Terminating transmissions when the tag 1910 and/or pet is stationary tends to preserve battery charge. Elimination of the button may also simplify the mechanical implementation and improve water resistance.

The accelerometer may also affect the interval between transmissions. For example, the tag 1910 may emit the authorization code via a BLE signal at a selected interval, such as seven times per second. If the accelerometer indicates that the pet is running, the tag 1910 may emit the signal more frequently, such as in proportion to the detected speed of the dog. The control system 112 may respond to the interval, such as by determining the speed of the dog, opening the door 158 sooner or later than a default time, and/or opening the door 158 faster or slower according to the speed of the dog. The control system 112 may also respond according to the distance of the pet from the door 158, which may be determined in any suitable manner, such as signal strength of the authorization code signals, optical instruments, motion sensors, and/or other sensors.

The present tag 1910 includes a circuit board 3216 that implements various functions, such as Bluetooth Classic or BLE communications, light control, GPS location and position transmission. The tag 1910 may also include a wirelessly rechargeable battery 3212. For example, the battery 3212 may be recharged via a wireless power transfer using inductive charging, such as a Qi compliant charger 3218. The tag may also include other appropriate elements, such as an EMI shield 3220 and a waterproofing gasket 3222.

The tag sensor 1912 reads the credentials from the tag 1910, such as by receiving standard Bluetooth Classic or BLE signals transmitted by the tag 1910. The control system 112 may cause the motor 710 to open the door 158 when the tag sensor 1912 receives a signal from an authorized tag 1910. The tag sensor 1912 may comprise any appropriate sensor for reading the tag 1910 and may be associated with the door unit 156 in any suitable manner.

For example, referring to FIGS. 26A-E and 33, the tag sensor 1912 may be mounted on the door unit 156, such as above the door 158 or on the door 158, or multiple tag sensors 1912 may be mounted on the interior and/or exterior frames 152, 154. In the present embodiment, the tag sensor 1912 is disposed near the center of the door 158 for a clear path through the tunnel 150 to read tags 1910. When the tag sensor 1912 reads a tag 1910, the tag sensor 1912 may provide tag 1910 credentials to the control system 112, which can then open the door 158 if the approaching pet associated with the tag 1910 is authorized and according to other criteria, such as whether the door 158 is locked.

In various example embodiments, the tag 1910 may comprise a waterproof wireless tracker tag to identify specific pets. Each tracker tag 1910 may have a unique identifier so curfews and door controls can be established for each pet. The wireless tracker tag may intermittently transmit a unique standard Bluetooth Classic or BLE signal for the identifier, and the tag sensor 1912 may be configured to receive the signals.

The control system 112 may be responsive to signals from the tag sensor 1912 and sense whether the pet is inside or outside using directional wireless sensor technology. The directional wireless technology may comprise any suitable technology for determining the direction or other location information for the pet, such as two wireless sensors separated by RF shielding to detect differences in RF intensity to determine whether the pet is inside the home or outside the home.

In various embodiments, an exterior sensor may be mounted on the exterior side of the door 158 and/or frame 708 and an interior sensor may be mounted on the interior side of the door 158 and/or frame 708. The two sensors may be separated by RF shielding. In the present embodiment, the tag sensor 1912 is mounted in the door near the center and comprises an exterior sensor 3310, an interior sensor 3312, and a shield housing 3314. The sensors 3310, 3312 are mounted on opposite sides of the shield housing 3314. The shield housing 3314 may comprise an electromagnetic shielding material, such as aluminum, to inhibit transmission of electromagnetic waves to the sensors 3310, 3312, except from the open front and back of the shield housing 3314, respectively.

In various embodiments, the sensors 3310, 3312 may be mounted on sensor holder. The sensor holder may hold the sensors 3310, 3312 in position and/or reflect signals from one direction toward the appropriate sensor 3310, 3312 and away from the other sensor 3310, 3312. Referring to FIG. 44, in one embodiment, the sensor holder comprises a first cup and a second cup. One sensor 3310, 3312 is disposed within each cup. The cups may comprise a reflective material that reflects signals relevant to the sensors 3310, 3312. In the present embodiment, the sensor holder includes two opposed cups, each of which reflect and focus a signal emitted from in front of the cup and deflect degree any signal that is not in front. The inside of each parabolic cup is coated with a metallic, conductive material to enhance the signal reflection, and the outside of the parabolic cup comprises a plastic to resist conduction and potentially deflect signals.

The directional wireless sensors 3310, 3312 may monitor for signals within range and track the signal strength. The control system 112 may average the signal data to determine where the pet is in relation to the door unit 156. When the signal strength reaches an adjustable threshold, the control system 112 may unlock the door 158 and the motor 710 may open the door 158. For example, the control system 112 may collect directional wireless sensors 3310, 3312 signals at a selected rate, such as 10 times per second, and measures the signal strength at each sensor 3310, 3312. The control system 112 compares the average signal strength from each sensor 3310, 3312 and the higher average is deemed to be to correct detection.

The sensor may include other sensors, such as a proximity sensor to detect when a pet approaches the door 158. In various embodiments, the directional wireless sensors allow the owner to set a sensitivity level for inside the home and outside the home, for example to accommodate structures having different wall thicknesses and materials that may affect signal strength. In another embodiment, one or more tag sensors 1912 may operate in conjunction with one or more motion sensors, such as an interior sensor and an exterior sensor. The motion sensors may comprise any suitable motion sensors, such as active or passive acoustic, optical, or microwave sensors, including passive infrared sensors (PIR) and ultrasonic sensors. In the present embodiment, the motion sensors are PIR sensors. Upon detecting the approach of the tag 1910, the control system 112 may use signals from the motion sensors to determine the location of the tag 1910.

For example, referring to FIG. 45, if the tag sensor 1912 senses the approach of an authorized tag 1910, the control system 112 may monitor signals from an interior motion sensor 4510 and an exterior motion sensor 4512. If the interior motion sensor 4510 senses animal movement and the exterior sensor 4512 does not, then the control system 112 considers the animal to be inside, and vice versa. In another embodiment, the control system 112 operates with a single motion sensor, such as the interior motion sensor 4510. If the tag sensor 1912 senses the approach of an authorized tag 1910 and the interior motion sensor 4510 senses animal movement, then the control system 112 considers the animal to be inside. If the interior motion sensor 4510 does not sense animal movement, then the control system 112 considers the animal to be outside. A similar sensing system may employ only an exterior motion sensor. The control system 112 may also operate in conjunction with any appropriate algorithm and/or pattern recognition system to assess the actual position of the animal wearing the tag 1910.

The tag 1910 and sensor 1912 may also affect the closing of the door 158. For example, the motors 710 may close the doors after a selected time period. In some embodiments, the time before closing may be adjusted by the user, such as through the control system 112, a web interface, or an app on a phone. The motors 710 may close the doors until a sensor signals the doors are completely closed.

The tag sensor 1912, motion sensor 4510, and other sensors may be implemented in any appropriate manner to facilitate opening and closing the doors according to the movement of the pet and the operator's criteria. For example, the sensors may be placed in or on the doors 158, the frames 152, 154, 708, the structure, or elsewhere, and may comprise any suitable sensors. In various embodiments, the sensors include external sensors to detect the presence of the pet, such as the tag sensor 1912 and the motion sensor 4510. The external sensors 1912, 4510 may be placed in any appropriate location, such as at the top of the exterior door unit frame 4632. Referring to FIGS. 50-51, In one embodiment, the external sensors 1912, 4510 are integrated into a sensor unit 4640 integrated into the center of the top portion of the exterior door unit frame 4632.

The external sensors may also be implemented as an auxiliary sensor system that may be connected to the interior door unit 156. The auxiliary sensor system may include the tag sensor 1910 and/or motion sensor 4510, and may be connected to the interior door unit 156 in any suitable manner, such as via a wired connection or wireless connection. The auxiliary sensor system may be placed in any suitable location outside the structure and near the tunnel 150 external opening to improve the detection pets outside the structure. The auxiliary sensor system may be useful in many situations, such as for thick masonry walls or other difficult installations.

For example, referring to FIGS. 52-55, an example auxiliary sensor system 5210 may include the tag sensor 1910 and/or motion sensor 4510 and connect to the interior door unit 156 via a wire. The auxiliary sensor system 5210 may be mounted in any suitable position, such as over the external tunnel 150 opening. When the auxiliary sensor system 5210 is connected to the interior door unit 156, other sensors, such as any other sensors monitoring the area outside the structure, may be deactivated or overridden by signals from the auxiliary sensor system 5210. For example, when the control system 112 detects the connection of an auxiliary sensor system 5210, the control system 112 may automatically disable one or more other sensors or ignore signals from those sensors.

Referring to FIG. 20, the control system 112 may include or be connected to the wireless transceiver 114 to receive signals for controlling the pet access control system 100. The wireless transceiver 114 is configured to receive signals via a wireless connection and provide corresponding signals to the control system 112. The wireless transceiver 114 may comprise any suitable system for transmitting and/or receiving wireless signals, such as cellular, Wi-Fi, infrared, Bluetooth, RF, or acoustic signals. The wireless transceiver 114 may be implemented as a wireless receiver that only receives wireless signals and does not send them.

The wireless transceiver 114 may be controlled in any suitable manner. For example, the wireless transceiver 114 may comprise an IEEE 802.11 compliant transceiver configured to transmit and receive signals to communicate with other wireless systems, such as a wireless router. The wireless transceiver 114 may also comprise a Bluetooth system for exchanging signals with Bluetooth enabled devices, such as a cell phone or remote-control device. In the present embodiment, the wireless transceiver 114 is integrated into the housing of the door unit 156 and may include an integrated antenna.

In the present embodiment, the pet access control system 100 may operate in conjunction with a software program operating on a remote device 116, such as a conventional personal computer or smartphone, which interacts with the control system 112 via a suitable wireless connection, such as Bluetooth or a local wireless network. The user may interact with the software via a graphical user interface (GUI), which presents options for controlling the pet access control system 100. For example, the GUI may comprise a website interface that is run by the remote computer 116 and may be accessed by other computers 118, and/or the GUI may comprise an app running on a mobile device such as a smartphone. The user interface may also operate in conjunction with voice-enabled interfaces, such as Amazon's Alexa systems or Google's Home Pod and other voice recognition and web services, Nest, and Apple's Siri.

A user may use a computer 118 or remote device 116 to access the control system 112, for example via the Internet, and select operations for the pet access control system 100, such as locking and unlocking the locking mechanism 210. The computer 118 or remote device 116 provides signals to the wireless transceiver 114, for example via a router, which are used to control the locking mechanism 210 via the control system 112.

Access to the control system 112 via the wireless transceiver 114 may be performed in any suitable manner. For example, the control system 112 may include a computer that may be controlled from other computers 118 without connecting to the remote computer 116. In one embodiment, the functions of the remote computer 116 may be integrated into the control system 112.

The pet access control system 100 may also include one or more ramps to assist pets to gain access to the tunnel 150. The ramps may provide access in any suitable manner, such as by attaching one end of the ramp to the bottom of the exterior frame 152 or the interior frame 154. In various embodiments, referring to FIGS. 34A-B, 46, and 47, the ramp 3412 attaches to a ramp mount 3420 at the bottom of the external frame 152. The ramp 3412 may comprise sections that slide "telescopically," fold on hinges, or otherwise reconfigure into a shorter configuration closed over the exterior frame 152. In various embodiments, the ramp 3412 may be rotated up to cover the exterior frame 152 and locked in position, such as with a padlock, to securely block access to the passage 162. The ramp 3412 may also include padding and/or thermal protection, such as artificial turf or padded mat, for example to provide a comfortable walking surface, reduce thermal transfer to a pet's paws, and/or protect the ramp 3412 surface. The padding and/or thermal protection may also be placed on the bottom of the tunnel 150.

The ramp 3412 may attach to the external frame 152, such as via the ramp mount 3420. The ramp mount 3420 may comprise any suitable system for fixing the ramp 3412 in position for the pet to enter and exit. For example, the ramp mount 3420 may comprise an adjustable ramp mount, such as to facilitate different ramp angles and gaps between the top of the ramp 3412 and the bottom of the external frame 152. Referring to FIGS. 47-50, an adjustable ramp mount 4620 according to various aspects of the present technology comprises a support, such as a plastic or metal support, with a pair of ramp connectors extending downward from a mounting plate. The ramp connectors include a series of slots to receive corresponding tabs extending from the top of the ramp 3412. The tabs may be flanged or otherwise configured to secure the ramp 3412 to the ramp connectors. The mounting plate may be secured to the external frame 152, such as via screws, bolts, or other suitable fasteners. Alternatively, the mounting plate may be mounted on the structure or the tunnel 150.

The pet access control system 100 may also include any other suitable systems associated with pets, pet access, pet monitoring, or other functions. For example, a rain guard and/or sunshade may be removably or permanently mounted on the exterior, such as on the exterior frame 152. In one embodiment, the pet access control system 100 includes a solar panel to provide power to the pet access control system 100. The solar panel may be connected to the pet access control system 100 in any appropriate manner, such as on a separate and/or elevated mount to optimize sun exposure. In various embodiments, the solar panel may be mounted over the exterior area of the pet access control system 100.

For example, an exemplary solar panel 4622 may be mounted on the external frame 152 above the tunnel 150 via a solar panel mount 4910. The solar panel mount 4910 may include one or more supports extending approximately horizontally from a solar panel mounting plate. The solar panel 4622 may be fixed to the supports and the solar panel mounting plate may be connected to the external frame 152 or other structure, such as via screws, bolts, or other suitable fasteners.

The pet access control system 100 may further include a camera 120 connected directly or indirectly to the wireless transceiver 114. In the present embodiment, referring to FIG. 20, the camera 120 is configured to monitor one or both sides of the structure 160, such as to monitor the status of the pet. The camera 120 may monitor an area for a pet wishing to pass through. The camera 120 may be connected to the wireless transceiver 114 via the control system 112, such as to send image data to the remote device 116 and/or other computers 118 and devices via the wireless transceiver 114 so that a user may monitor an area. The camera 120 may also receive signals from the control system 112, for example to activate and deactivate the camera 120, zoom, pan, or otherwise operate the camera 120. Images from the camera may be provided to the user interface, such as a web browser or a phone app.

The pet access control system 100 may also include an audio system, such as a microphone 122 and/or a speaker 124. The audio system may be connected to the control system 112, for example to communicate with the user via the remote computer 116 and the wireless transceiver 114. The audio system may perform any suitable functions. For example, signals may be transmitted from the user to the speaker 124, such as to talk to pets or provide audible signals from the user or the control system 112. In addition, the microphone 122 may transmit signals corresponding to sounds to the control system 112 and/or user, such as to monitor a pet's condition. The speaker may also generate other sounds, such as an audible intruder alarm if the door is forced open.

The pet access control system 100 may also include a food dispenser 126, for example to provide training incentives and/or remotely feed pets. The food dispenser 126 may comprise any suitable system, such as a hopper for containing treats or other food and a dispenser for releasing the food for consumption. The food dispenser 126 is suitably connected to the control system 112 to control the food dispenser 126, for example in response to a program for regular feeding of the pet and/or signals from the user via the remote computer and/or the wireless transceiver 114.

To install the door unit 156, the frame 708 may be positioned such that the primary hole is adjacent to the opening of the passage 162 and aligned with the opening. The frame 708 may be attached to the security panel holder, such as via the security panel interface, or to another structure. For example, the rails may be attached to the security panel holder and the frame 708 may be attached to the rails. The interior vertical edge of the security panel holder may be inserted into and engage the groove of the rail, and the rails may be secured in position, such as by driving the set screws against the security panel holder. The frame 708 may be attached to the rails, such as by hanging the frame 708 on the rails and securing the frame 708 to the rails, such as by using screws.

For modular security panel interfaces, the appropriate security panel interface may be selected from the group of available options, which may match multiple legacy security panel holders. In some embodiments, the door unit 156 may slide onto the security panel holder so that the security panel holder engages the security panel interface so that the primary hole in the frame is aligned with the opening in the tunnel 150.

The tag 1910 may be paired with the door unit 156 so that the tag 1910 is authorized for the particular door unit 156, and the tag may be attached to the pet's collar or otherwise associated with the pet.

In operation, the pet access door 158 may be in a locked state with the pet inside the structure 160 on one side of the door 158. Referring to FIG. 23, the user may access the pet access control system 100 remotely, for example by accessing an Internet website via a web browser or running an app on a mobile device (310). The user may interact with the pet access control system 100 via the remote device 116 or other computer 118 in any suitable manner. For example, the user may activate the camera 120 (312) and the microphone 122 (314) to monitor the pet's condition, such as to see whether the pet wishes to be let outside or is lonely. The user may also operate the speaker 124, such as to provide commands to the pet or speak to the pet. In addition, the user may activate the food dispenser 126, such as to remotely feed the pet, reward behavior, make the pet happy, or the like.

The various functions may be integrated into one or more pages of the website or app, such as by providing buttons on the GUI to activate the microphone 122, camera 120, and food dispenser 126, a viewing area to display the transmission from the camera 120, and status displays, such as to show the state of the locking mechanism 210, fullness of the food dispenser 126, last time and date the pets were allowed outside and for how long, and the like.

To allow the pet outside, the user may change the state of the locking mechanism 210 to an unlocked state (316) via the remote computer 116, such as by pressing a corresponding GUI button. In various embodiments, the control system 112 will not open the door 158, even if an authorized tag 1910 is present, if the locking mechanism is in a locked state. In an unlocked state, the control system 112 may open the door 158 in response to an authorized tag 1910.

Instructions to change the lock/unlock state may be transmitted to the control system 112, for example from the remote device 116 via a wireless network and the wireless transceiver 114. The user and/or control system 112 may also encourage the pet to exit via the door 158 (318), for example by providing a verbal command, ringing a bell or emitting a corresponding sound via the speaker 124, or the like. The user may also confirm the exit of the pet via the camera 120 (320). When the pet exits, the control system 112 and/or the user may leave the door 158 unlocked or change the locking mechanism 210 to a locked state (322).

Referring to FIG. 22, while the pet is outside, the user may monitor the pet, for example via an outdoor camera 120 (410) and microphone 122 (412). When the pet returns, the door 158, if locked, may be unlocked to permit the pet to enter (414). Alternatively, the door 158 may remain unlocked for a selected period. The control system 112 and/or the user may also generate a signal, such as sounding a bell or buzzer or a verbal command, to signal the pet to return and enter through the door 158. For example, the user may activate the speaker 124 (416), adjust the volume (418), and command the pet to go inside (420).

When the pet enters, the user and/or control system 112 may monitor the pet's return (422) and lock the door 158 (424). The user and/or control system 112 may also provide any appropriate feedback to the pet, such as verbal rewards or a treat from the food dispenser 126 (426).

The user may leave the door 158 unlocked, in which case the door 158 remains closed until the tag 1910 on the pet approaches the sensor 1912. When the tag 1910 approaches, the sensor 1912 reads the information from the tag 1910 and the control system 112 determines whether the information corresponds to an authorized tag 1910. If so, the control system 112 activates the motor to open the door 158. When the pet passes through the door 158, the control system 112 activates the motor to close the door 158.

In the foregoing specification, the invention has been described with reference to specific exemplary embodiments. Various modifications and changes may be made, however, without departing from the scope of the present invention as set forth in the claims. The specification and figures are illustrative, rather than restrictive, and modifications are intended to be included within the scope of the present invention. Accordingly, the scope of the invention should be determined by the claims and their legal equivalents rather than merely the examples described.

For example, the steps recited in any method or process claims may be executed in any order and are not limited to the specific order presented in the claims. Additionally, the components and/or elements recited in any apparatus claims may be assembled or otherwise operationally configured in a variety of permutations and are accordingly not limited to the specific configuration recited in the claims.

Benefits and other advantages and solutions to problems have been described above with regard to particular embodiments. Any benefit, advantage, solution to problem, or any element that may cause any particular benefit, advantage, or solution to occur or to become more pronounced, however, are not to be construed as critical, required, or essential features or components of any or all the claims.

As used herein, the terms "comprise," "comprises," "comprising," "having," "including," "includes," or any variation thereof, are intended to reference a non-exclusive inclusion, such that a process, method, article, composition or apparatus that comprises a list of elements does not include only those elements recited, but may also include other elements not expressly listed or inherent to such process, method, article, composition, or apparatus. Other combinations and/or modifications of the above-described structures, arrangements, applications, proportions, elements, materials, or components used in the practice of the present invention, in addition to those not specifically recited, may be varied or otherwise particularly adapted to specific environments, manufacturing specifications, design parameters or other operating requirements without departing from the general principles of the same.

The invention claimed is:

1. A door unit configured to connect to a pet door security panel holder, comprising:
    a frame having a hole defined therethrough;
    a door disposed over the hole and mounted on the frame; and
    a security panel interface attached to the frame, wherein the security panel interface connects the frame to the security panel holder.

2. A door unit according to claim 1, wherein the security panel interface is adjustable to different widths.

3. A door unit according to claim 1, wherein the security panel interface comprises an adapter, wherein:
    the adapter engages the security panel holder; and
    the adapter connects to the frame.

4. A door unit according to claim 3, wherein the adapter comprises:
    a grooved structure, wherein the grooved structure engages an edge of the security panel holder; and
    a fastener, wherein the fastener fastens the adapter to the security panel holder.

5. A door unit according to claim 4, wherein the adapter comprises:
    a bottom end of the grooved structure; and
    a connector proximate the bottom end of the grooved structure, wherein the connector connects the adapter to the frame.

6. A door unit according to claim 5, wherein:
    the frame has a horizontal slot defined therein; and
    the connector comprises a support disposed through the horizontal slot.

7. A door unit according to claim 3, further comprising a hang structure connected to the frame, and wherein:
    the adapter includes a top surface; and
    the hang structure rests atop the top surface.

8. A door unit according to claim 1, further comprising:
    a tag sensor responsive to a wireless tag; and
    a motion sensor, wherein the door opens in response to signals from the tag sensor and the motion sensor.

9. A door unit according to claim 1, wherein the security panel interface comprises a grooved structure configured to engage the security panel holder.

10. A door unit configured to connect to a pet door security panel holder and respond to a signal from an authorized tag associated with a pet, comprising:
    a frame having a hole defined therethrough;
    a door disposed over the hole and mounted on the frame;
    a motor, wherein the motor drives movement of the door;
    a security panel interface on the frame adapted to connect the frame to the security panel holder; and
    a control system responsive to signals from the authorized tag, wherein the motor is responsive to signals from the control system.

11. A door unit according to claim 10, wherein the security panel interface is adjustable to different widths.

12. A door unit according to claim 10, wherein the security panel interface comprises a rail, wherein:
    the rail engages the security panel holder; and
    the rail connects to the frame.

13. A door unit according to claim 12, wherein the rail comprises:
    a groove, wherein the groove engages an edge of the security panel holder; and
    a fastener, wherein the fastener fastens the rail to the security panel holder.

14. A door unit according to claim 12, further comprising a hang structure connected to the frame, wherein:
the rail includes a top surface; and
the hang structure rests atop the top surface.

15. A door unit according to claim 10, wherein the rail comprises:
a bottom end of the groove; and
a connector proximate the bottom end of the groove, wherein the connector connects the rail to the frame.

16. A door unit according to claim 15, wherein:
the frame has a horizontal slot defined therein; and
the connector comprises a support disposed through the horizontal slot.

17. A door unit according to claim 10, further comprising:
a tag sensor responsive to the authorized tag; and
a motion sensor, wherein the control system controls the motor in response to signals from the tag sensor and signals from the motion sensor.

18. A door unit according to claim 10, wherein the security panel interface comprises a grooved structure configured to engage the security panel holder.

19. A method of operating a door unit configured to connect to a pet door security panel holder surrounding an opening, comprising:

positioning a frame having a hole defined therethrough adjacent the opening, wherein the hole is aligned with the opening; and
attaching the frame to the security panel holder via a security panel interface.

20. A method of operating a door unit according to claim 19, further comprising:
sensing a signal corresponding to an approach of a tag; and
opening a door disposed over the hole and mounted on the frame if the sensed signal corresponds to an authorized tag.

21. A method of operating a door unit according to claim 20, further comprising:
determining whether the sensed signal corresponds to the authorized tag; and
sensing a motion signal from a motion sensor.

22. A method of operating a door unit according to claim 19, wherein attaching the frame to the security panel holder comprises:
engaging an adapter to the security panel holder; and
connecting the frame to the adapter.

* * * * *